(12) United States Patent
Fukushige

(10) Patent No.: US 7,470,015 B2
(45) Date of Patent: Dec. 30, 2008

(54) INKJET-RECORDING INK COMPOSITION AND IMAGE-FORMING PROCESS

(75) Inventor: Yuuichi Fukushige, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 383 days.

(21) Appl. No.: 11/155,579

(22) Filed: Jun. 20, 2005

(65) Prior Publication Data

US 2006/0001719 A1    Jan. 5, 2006

(30) Foreign Application Priority Data

| Jun. 30, 2004 | (JP) | ............................. 2004-194003 |
| Jun. 30, 2004 | (JP) | ............................. 2004-194004 |
| Jul. 16, 2004 | (JP) | ............................. 2004-210692 |

(51) Int. Cl.
    *G01D 11/00* (2006.01)
(52) U.S. Cl. ...................... 347/100; 347/95; 106/31.27
(58) Field of Classification Search ................. 347/100, 347/95, 96, 101, 102; 106/31.6, 31.13, 31.27; 523/160
    See application file for complete search history.

(56) References Cited

U.S. PATENT DOCUMENTS

| 4,303,924 A | 12/1981 | Young, Jr. | |
| 5,889,084 A | 3/1999 | Roth | |
| 6,110,987 A * | 8/2000 | Kamata et al. | ................ 522/64 |
| 2002/0143079 A1* | 10/2002 | Yamanouchi et al. | ....... 523/160 |
| 2003/0128264 A1 | 7/2003 | Ishikawa et al. | |
| 2004/0106700 A1 | 6/2004 | Yamanouchi et al. | |

FOREIGN PATENT DOCUMENTS

| EP | 0438123 | 7/1991 |
| JP | A 56-157468 | 12/1981 |
| JP | A 62-241901 | 10/1987 |
| JP | A 05-59110 | 3/1993 |
| JP | A 2002-179968 | 6/2002 |
| JP | A 2003-221528 | 8/2003 |
| JP | A 2003-342503 | 12/2003 |

* cited by examiner

*Primary Examiner*—Manish S Shah
(74) *Attorney, Agent, or Firm*—Margaret A. Burke; Sheldon J. Moss

(57) ABSTRACT

A photopolymerization-curable inkjet-recording ink composition, including an ethylenic unsaturated monomer, a colorant, and a photopolymerization initiator containing an organic dye and an organic boron compound. The ethylenic unsaturated monomer is preferably a compound which polymerizes to form a polymer having an oxygen permeability coefficient at 25° C. of $2.6 \times 10^{-13}$ [$m^3(STP) \cdot m/(s \cdot m^2 \cdot kPa)$] or lower.

21 Claims, No Drawings

INKJET-RECORDING INK COMPOSITION AND IMAGE-FORMING PROCESS

CROSS-REFERENCE TO RELATED APPLICATION

This application claims priority under 35 USC 119 from Japanese patent Application Nos. 2004-194003, 2004-194004, and 2004-210692, the disclosures of which are incorporated by reference herein.

BACKGROUND OF THE INVENTION

1. Technical Field

The invention relates to an inkjet-recording ink composition and an image-forming process using the same, and in particular, to an inkjet-recording ink composition that polymerizes and hardens by irradiation with a visible to near-infrared visible light and an image-forming process using the same.

2. Description of the Related Art

UV inks which are cured by ultraviolet ray (UV) irradiation and which have UV light-blocking properties have been known as discoloration-resistant inks (see, e.g., Japanese Patent Application Laid-Open (JP-A) No. 2003-221528). The UV-curable ink compositions currently available (see JP-A No. 2003-342503) inherently have UV ray-blocking properties and are generally compatible with a light source capable of high-illumination exposure in the UV wavelength region. Therefore, the UV-curable ink compositions has problems that such a light source costs high and that it is necessary to remove the ozone and heat generated during exposure.

In the inkjet-recording process, ink is ejected to conduct recording. Recently, inkjet printers utilizing the inkjet-recording process have been more widely used for printing on paper, film, cloth, or the like in offices as well as in general households, as the use of computers spreads. Inks such as oil ink, aqueous ink, and solid ink are known as inkjet-recording inks. Among them, aqueous inks are preferable from the points of productivity, handling, odor, stability, and the like, and are used mainly.

Because most aqueous inks use water-soluble dyes dissolving in the molecular state, the inks have advantages in high transparency and high color density. However, the aqueous inks have the following problems: the aqueous inks are less resistant to water because the dye is soluble in water; when images are printed on a so-called plain paper with an aqueous ink, the printing quality of the resulting image often deteriorate significantly owing to bleeding; the aqueous inks are also poorer in light fastness; and when printing is conducted with an aqueous ink on a recording paper having an ink-receiving recording layer containing porous inorganic particles on its surface (hereinafter, referred to as "photographic quality paper"), the storability of the image often shortens markedly owing to the influence of oxidative gases ($SO_x$, $NO_x$, ozone, etc.).

To overcome the problems associated with image storage, an aqueous ink containing a pigment or a dispersible dye has been proposed (see, e.g., JP-A No. 56-157468). Such an aqueous ink has somewhat improved water resistance. However, the water resistance of the aqueous ink is still insufficient. Moreover, the aqueous ink has the problems that the ink easily causes clogging in the ink ejection nozzle because the dispersion state of the pigment or the dispersible dye in the aqueous ink is unstable during storage, and that the ink containing a pigment or a dye does not penetrate into the sheet when ejected onto a photographic quality paper, and that the pigment and the dye are separated easily from the surface when rubbed with a finger, i.e., thereby lowering the abrasion resistance of the ink.

Separately, methods of covering an oil-soluble dye with a polymer have been proposed from the point of image storability (see, e.g., JP-A No. 58-45272 and JP-A No. 62-241901). However, the inkjet-recording inks obtained by the methods give images having unsatisfactory color tone and color reproducibility. In particular, the obtained images are insufficient in image fastness upon exposure to an oxidative gas or the like as, and insufficient in abrasion resistance upon printing on a photographic quality paper. In addition, an ink superior in staining property and abrasion resistance has been proposed (see, e.g., JP-A No. 2001-123097). This ink is prepared by introducing a salt-forming group and a polyalkyleneoxide group into a polymer. Images formed with the ink are resistant to abrasion with a finger, but are not sufficiently resistant to a high-level abrasion, for example, by eraser. Methods of preventing oxidative degradation of a fluorescent dye by oxygen in the air have also been proposed (e.g., JP-A No. 2002-179968). In the methods, the fluorescent dye is covered with a resin having a lower oxygen permeability. In the methods, a fluorescent dye and a resin are simply added to a solvent so that the resin covers the fluorescent dye. However, similarly to other conventional inks, the methods fail to achieve satisfactory color tone and color reproducibility.

As described above, a technology has not been established which can form an image by using an inexpensive device that does not emit ozone or heat and which can record an image superior in light fastness, ozone resistance, and abrasion resistance through curing of an ink composition by irradiation with light from such a device.

SUMMARY OF THE INVENTION

The invention has been made in consideration of the above problems of the conventional techniques. According to the invention, an inkjet-recording ink composition is provided which is:

superior in ink ejection property upon ejection through an ejection nozzle, capable of photo-curing in a wide wavelength range (in particular, curing by a visible to near-infrared light), and capable of recording an image superior in light fastness, ozone resistance, and abrasion resistance (hereinafter, collectively referred to as "image fastness" in some cases).

According to the invention, an image-forming process is also provided which uses the inkjet-recording ink composition and which can easily and inexpensively record an image especially superior in image fastness.

Specifically,

The invention provides a photopolymerization-curable inkjet-recording ink composition. The ink composition comprises an ethylenic unsaturated monomer, a colorant, and a photopolymerization initiator. The photopolymerization initiator comprises an organic dye and an organic boron compound. The ethylenic unsaturated monomer may be a compound which polymerizes to form a polymer having an oxygen permeability coefficient at 25° C. of $2.6 \times 10^{-13}$ [$m^3$ (STP)·m/(s·m²·kPa)] or lower. The colorant may be an oil-soluble dye having an oxidation potential which is higher than 1.0 V (vs. SCE). The organic dye may be one or more dyes selected from cationic dyes, anionic dyes, and nonionic dyes. The colorant may be the same compound as the organic dye. The inkjet-recording ink may be prepared by emulsifying, in an aqueous medium, a solution including the ethylenic unsaturated monomer, the colorant, and the photopolymerization initiator containing an organic dye and an organic boron compound.

The invention also provides a method for producing an inkjet-recording ink composition, the method comprising emulsifying, in an aqueous medium, a solution including an ethylenic unsaturated monomer, a colorant, and a photopolymerization initiator containing an organic dye and an organic boron compound.

The invention further provides an image-forming process comprising recording an image on a record medium by using the above inkjet-recording ink composition and curing the recorded image by irradiation with visible to near-infrared light.

DESCRIPTION OF THE PREFERRED EMBODIMENTS

In the present invention, after inkjet recording, the fastness of the image is improved by polymerization-curing caused by irradiation with a light in a wide wavelength range. The image fastness is improved particularly when the ink includes an ethylenic unsaturated monomer which polymerizes to form a polymer having an oxygen permeability coefficient at 25° C. of $2.6 \times 10^{-13}$ [$m^3(STP) \cdot m/(s \cdot m^2 \cdot kPa)$] or lower. Hereinafter, the inkjet-recording ink composition according to the invention and the image-forming process using the same will be described in detail.

<Inkjet-Recording Ink Composition>

The inkjet-recording ink composition according to the invention comprises an ethylenic unsaturated monomer, a colorant, and a photopolymerization initiator containing an organic dye and an organic boron compound. The inkjet-recording ink composition may further include other optional components such as various additives in accordance with the necessity. The inkjet-recording ink composition polymerizes to cure when irradiated with a light in a wide wavelength range (in particular, visible to near-infrared light)

[Ethylenic Unsaturated Monomer]

The inkjet-recording ink composition of the invention contains at least one ethylenic unsaturated monomer. The ethylenic unsaturated monomer is cured through addition polymerization by the action of the photopolymerization initiator described below when irradiated with light, whereby the composition constituting the image is cured to improve resistance to light, ozone, scratching, and the like.

The ethylenic unsaturated monomer (hereinafter, referred to simply as "monomer" in some cases) is a compound having at least one ethylenic double bond (hereinafter, occasionally referred to as "polymerizable group") as a polymerizable group, and may be properly selected from monofunctional monomers having one polymerizable group and bi- or higher-functional compounds having 2 or more polymerizable groups (multifunctional monomers). In an exemplary embodiment, a bifunctional monomer is used in combination with a monofunctional monomer, for the purposes of adjusting the viscosity and crosslinking density and of controlling the physical properties (strength, adhesiveness, etc.) of the post-curing composition.

Examples of the polymerizable group include an acryloyl group, a methacryloyl group, an allyl group, a vinyl group, and a group having an internal double bond (e.g., maleic acid). Among them, an acryloyl group and a methacryloyl group are preferable; and an acryloyl group is particularly preferable from the viewpoint of curing at lower energy.

Examples of the multifunctional monomer include: a vinyl-group-containing aromatic compound; an acrylate which is an ester between a bi- or higher-hydric alcohol and acrylic or methacrylic acid; an acrylamide which is an amide between a bi- or higher-valent amine and acrylic or methacrylic acid; a polyester acrylate prepared by introducing acrylic or methacrylic acid into polycaprolactone or into an ester between a polybasic acid and a bihydric alcohol; a polyether acrylate prepared by introducing acrylic or methacrylic acid into an ether between an alkylene oxide and a polyhydric alcohol; an epoxy acrylate prepared by introducing acrylic or methacrylic acid into an epoxy resin or by reaction of a bi- or higher-hydric alcohol with an epoxy-containing monomer; an urethane acrylate containing an urethane bond; an amino resin acrylate; an acryl resin acrylate; an alkyd resin acrylate; a spirane resin acrylate; a silicone resin acrylate; and a reaction product of an unsaturated polyester with a photopolymerizable monomer (e.g., acrylic acid, methacrylic acid, etc.). An acrylate, a polyester acrylate, a polyether acrylate, an epoxy acrylate, an urethane acrylate, an acryl resin acrylate, a silicone resin acrylate, a reaction product of an unsaturated polyester with a photopolymerizable monomer are preferable. An acrylate, a polyester acrylate, a polyether acrylate, an epoxy acrylate, and an urethane acrylate are particularly preferable.

Specific examples of the multifunctional monomer include: divinylbenzene; 1,3-butanediol diacrylate; 1,6-hexanediol diacrylate; pentaerythritol triacrylate; trimethylolpropane triacrylate; dipentaerythritol hexaacrylate; 1,6-acryloylaminohexane; hydroxy pivalic acid ester neopentylglycol diacrylate; a polyester (meth)acrylate having a polyester with a molecular weight of 500 to 30,000 (formed of a bibasic acid and a bivalent alcohol) and a (meth)acryloyl group (generic term for both methacryloyl and acryloyl groups) at a molecular chain terminal thereof; polyethylene glycol diacrylate; an epoxy acrylate containing a bisphenol (A, S, or F) skeleton and having a molecular weight of 450 to 30,000; an epoxy acrylate containing a phenol novolak resin skeleton and having a molecular weight of 600 to 30,000; a reaction product of a polyvalent isocyanate having a molecular weight of 350 to 30,000 with a (meth)acrylic acid monomer having a hydroxyl group; and an urethane-modified polymer having an urethane bond therein.

Examples of the monofunctional monomer include a substituted or unsubstituted (meth)acrylate, a substituted or unsubstituted styrene, a substituted or unsubstituted acrylamide, a vinyl-group-containing monomer (a vinyl ester, a vinyl ether, an N-vinyl amide, etc.), and (meth)acrylic acid. A substituted or unsubstituted (meth)acrylate, a substituted or unsubstituted acrylamide, a vinyl ester, and a vinyl ether are preferable. A substituted or unsubstituted (meth)acrylate and a substituted or unsubstituted acrylamide are particularly preferable. Examples of the substituent on the monofunctional monomer include a hydroxy group, a glycidyl group, an alkyl group, an alkoxy group, an aryl group, a halogen, and a polymer residue.

Specific examples of the monofunctional monomer include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethylaminopropyl acrylamide, N-butoxymethyl acrylamide, acryloylmorpholine, 2-hydroxyethylvinylether, N-vinyl formamide, N-vinylacetamide, 2-cyclohexylcarbamoyloxyethyl acrylate, an acrylate ester containing a polybutyl acrylate unit, and an acrylate ester containing a polydimethylsiloxane unit.

Usually, the content of the ethylenic unsaturated monomer in the inkjet-recording ink composition is preferably in the range of 50 to 99.6 wt %.

Any monomer described above may be selected and used appropriately as long as the effects of the invention are obtained. It is preferable to select a safer monomer. The safer monomer refers to a monomer having a lower PII (skin irritation), and the monomer has a PII of preferably 3.0 or less; more preferably 2.0 or less, still more preferably 1.0 or less, particularly preferably 0.5 or less.

The monomer is preferably a compound capable of polymerizing to form a polymer having an oxygen permeability coefficient at 25° C. of $2.6 \times 10^{-13}$ [$m^3$(STP)·m/(s·$m^2$·kPa)] or lower (preferably, $2.3 \times 10^{-13}$ [$m^3$(STP)·m/(s·$m^2$·kPa)] or lower), from the viewpoint of effectively achieving the effects of the invention.

The oxygen permeability coefficient can be determined at 25° C. by a known oxygen electrode method. Methods of determining the oxygen permeability coefficient of organic compounds are described in literature in detail, for example, in "Koubunshi to suibun" (Polymer and Water) (Soc. Polymer Science, Japan Ed., pp. 283 to 323, Saiwai Shobo, 1972), the disclosure of which is incorporated herein by reference. The oxygen permeability coefficients specified in the invention are obtained by the oxygen electrode method which can measure the oxygen permeability coefficient of a fluid oily substance. The oxygen permeability coefficient [unit: $m^3$(STP)·m/(s·$m^2$·kPa)] is determined by placing an oily substance to be measured on a detection head uniformly in the film state under the condition of a temperature of 25° C. and a humidity of 50 RH % in an oxygen analyzer [model 3600 (diaphragm 2956A: 25 μm), manufactured by Orbisphere Laboratories Japan Inc.], detecting the oxygen concentration by the electrodes, and calibrating the measured concentration by using standard permeation samples.

The ethylenic unsaturated monomer preferably has a structural unit capable of forming a hydrogen bond so as to decrease the oxygen permeability coefficient of the polymer obtained by polymerization of the ethylenic unsaturated monomer. Such a structural unit may be, in particular, one or more selected from an amide bond, an urethane bond, a glycidyl group, and a hydroxyl group.

Specifically, a monomer having one or more groups selected from the groups represented by the following Formulae (i) to (iii) is preferable.

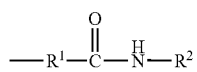

Formula (i)

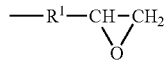

Formula (ii)

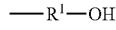

Formula (iii)

In Formulae (i) to (iii), $R^1$'s each independently represent a straight or branched alkylene or alkyleneoxy group which may have a substituent; and $R^2$ represents a hydrogen atom, a halogen atom, an alkyl group, an alkoxy group, or a cyano group.

Examples of the ethylenic unsaturated monomer preferable for reducing the oxygen permeability coefficient of the polymer formed by polymerization include an N-monosubstituted acrylamide, an N-disubstituted acrylamide, an N-monosubstituted methacrylamide, an N-disubstituted methacrylamide, glycidyl acrylate, glycidyl methacrylate, hydroxyethyl acrylate, 4-hydroxybutyl acrylate, 4-hydroxybutyl acrylate glycidylether, 2-chloroethyl acrylate, 3-chloro-2-hydroxypropyl methacrylate, 2,3-dihydroxypropyl methacrylate, 2-hydroxybutyl acrylate, and 2-hydroxypropyl acrylate. Only a single ethylenic unsaturated monomer may be used, or two or more ethylenic unsaturated monomers may be selected and used.

Specific examples of the polymer (exemplary polymers PA-1 to PA-11) prepared from the ethylenic unsaturated monomer are listed below. The ratio in parenthesis means a weight ratio, and the invention is not restricted by these specific examples.

PA-1) (n-Butyl acrylate)-(2-hydroxyethyl acrylate) copolymer (70:30; Mw: 24,300; and oxygen permeability coefficient: $1.05 \times 10^{-13}$ [$m^3$(STP)·m/(s·$m^2$·kPa)])

PA-2) (n-Butyl acrylate)-(4-hydroxybutyl acrylate) copolymer (70:30; Mw: 22,200; and oxygen permeability coefficient: $1.26 \times 10^{-13}$ [$m^3$(STP)·m/(s·$m^2$·kPa)])

PA-3) (n-Butyl acrylate)-(2-chloroethyl acrylate) copolymer (70:30; Mw: 30,600; and oxygen permeability coefficient: $1.20 \times 10^{-13}$ [$m^3$(STP)·m/(s·$m^2$·kPa)])

PA-4) (n-Butyl acrylate)-(glycidyl methacrylate) copolymer (70:30; Mw: 33,000; and oxygen permeability coefficient: $1.25 \times 10^{-13}$ [$m^3$(STP)·m/(s·$m^2$·kPa)])

PA-5) (n-Butyl acrylate)-(4-hydroxyethyl acrylate glycidylether) copolymer (70:30; Mw: 18,200; and oxygen permeability coefficient: $1.72 \times 10^{-13}$ [$m^3$(STP)·m/(s·$m^2$·kPa)])

PA-6) (n-Butyl acrylate)-(phenoxyethyl acrylate) copolymer (70:30; MW: 18,500; and oxygen permeability coefficient: $1.47 \times 10^{-13}$ [$m^3$(STP)·m/(s·$m^2$·kPa)])

PA-7) (n-Butyl acrylate)-(t-butylacrylamide) copolymer (90:10; Mw: 30,600; and oxygen permeability coefficient: $2.11 \times 10^{-13}$ [$m^3$(STP)·m/(s·$m^2$·kPa)])

PA-8) (n-Butyl acrylate)-(N-isopropyl acrylamide) copolymer (90:10; Mw: 30,300; and oxygen permeability coefficient: $2.15 \times 10^{-13}$ [$m^3$(STP)·m/(s·$m^2$·kPa)])

PA-9) (Methyl acrylate)-(M-90G (manufactured by Shin-Nakamura Chemical)) copolymer (70:30; Mw: 25,800; and oxygen permeability coefficient: $2.48 \times 10^{-13}$ [m (STP)·m/(s·m2·kPa)])

PA-10) (n-Butyl acrylate)-(N-isopropyl acrylamide) copolymer (70:30; Mw: 30,600; and oxygen permeability coefficient: $0.09 \times 10^{-13}$ [$m^3$(STP)·m/(s·$m^2$·kPa)])

PA-11) (n-Butyl acrylate)-(t-butylacrylamide) copolymer (50:50; MW: 25,900; and oxygen permeability coefficient: $0.16 \times 10^{-13}$ [$m^3$(STP)·m/(s·$m^2$·kPa)])

The oxygen permeability coefficient of the polymer prepared from an ethylenic unsaturated monomer will be described in more detail, taking the exemplary polymer PA-1 as an example.

First, a polymer solution PA-1 is prepared (Synthesis Example 1). Specifically, 22 parts of methylethylketone and 8.3 parts of 2-propanol were placed in a 200-ml three-necked flask whose internal air has been replaced by nitrogen gas, and the mixture liquid was heated to 65° C. Then, 0.17 part of azobisvaleronitrile (V-65) was further added thereto. Then, a mixture solution of 35 parts of n-butyl acrylate, 15 parts of 2-hydroxyethyl acrylate, 0.42 part of n-dodecanethiol, 22 parts of methylethylketone, and 8.3 parts of 2-propanol was added dropwise thereto over 2 hours. Then, after reaction for 2 hours, 0.088 part of V-65 was added and the mixture was heated to 73° C. After reaction for another 2 hours, a polymer solution PA-1 having the target solid matter concentration of 45% was obtained. Thereafter, the oxygen permeability coefficient of the polymer can be obtained by: placing the PA-1 on the detection head uniformly in the film state under the condition of a temperature of 25° C. and a humidity of 50 RH % in an oxygen analyzer (model 3600 [diaphragm 2956A: 25 μm], manufactured by Orbisphere Laboratories Japan Inc.), detecting the oxygen concentration by electrode, and calculating the oxygen permeation coefficient from the measured oxygen concentration based on the oxygen concentrations obtained by using standard permeation samples.

In the inkjet-recording ink composition according to the invention, the monomer content is not particularly limited. The monomer content is preferably 30 wt % to 2,000 wt %, more preferably 100 wt % to 1,500 wt %, based on the quantity of the colorant, from the viewpoint of ensuring good dissolution of the colorant described below (in particular, oil-soluble dye). An excessively high monomer content may make it difficult to prepare a stable fine dispersion because of an excessively high proportion of oil phase; from that viewpoint, the monomer content is preferably 50 to 1,500 wt %, more preferably 100 to 1,000 wt %, based on the quantity of the colorant (in particular, oil-soluble dye).

In addition, from the viewpoint of the penetration efficiency of ink into a record medium, when the ink composition is prepared, for example, by the emulsification method described below, the monomer content in the colored particle is preferably 25 wt % to 90 wt %, more preferably 50 wt % to 85 wt %.

[Colorant]

The inkjet-recording ink composition of the invention contains at least one colorant. The colorant may be a water-insoluble dye or a pigment, and may be suitably selected from known dyes and pigments.

The water-insoluble dye will be described first in detail. In the invention, the water-insoluble dye is a dye which has affinity to the polymer formed by polymerization of the monomer described above and which does not dissolve in an aqueous medium when colored particles containing the dye and the monomer are dispersed in an aqueous medium. More specifically, the water-insoluble dye is a dye having a solubility in water at 25° C. (weight of the dye dissolvable in 100 g of water) of 1 g or less, preferably 0.5 g or less, more preferably 0.1 g or less.

The dye insoluble in water, which is so-called "an oil-soluble dye", may be used preferably.

In addition, the dye is preferably a dye having a high oxidation potential so as to improve the curing properties and the resistance to color fading, in particular the resistance to oxidative substances such as ozone. Thus, the dye is more preferably an oil-soluble dye having an oxidation potential of higher than 1.0 V (vs. SCE). A higher oxidation potential is more preferred, and the oxidation potential of the dye is more preferably higher than 1.1 V (vs. SCE), still more preferably higher than 1.15 V (vs. SCE).

The oxidation potential has been described in paragraphs [0049] to [0051] of JP-A No. 2002-309118, the disclosure of which is incorporated herein by reference. However, the invention is not limited to such dyes.

The melting point of the oil-soluble dye is preferably 200° C. or lower, more preferably 150° C. or lower, still more preferably 100° C. or lower. Use of an oil-soluble dye having a lower melting point suppresses precipitation of the dye crystal in the ink composition and improves the storage stability of the ink composition.

The oil-soluble dye may be selected suitably from known compounds (dyes), and specific examples thereof include the dyes described in paragraphs [0023] to [0053] of JP-A No. 2002-114930, the disclosure of which is incorporated herein by reference. In the inkjet-recording ink composition according to the invention, only a single oil-soluble dye may be used or a mixture of two or more oil-soluble dyes may be used. In addition, the inkjet-recording ink composition may further include other colorants such as a water-soluble dye, a dispersible dye, and a pigment in accordance with the necessity.

Oil-soluble dyes in respective colors will be described in detail below.

An oil-soluble dye represented by the following Formula (Y-1) is preferable as a yellow oil-soluble dye. The oil-soluble dye represented by Formula (Y-1) may be used not only in a yellow ink but also in other color inks such as a black ink, a green ink, and a red ink.

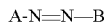 Formula (Y-1)

In Formula (Y-1), A and B each independently represent a heterocyclic group which may have a substituent. The heterocyclic group is preferably a five- or six-membered heterocyclic ring. The heterocyclic ring may have a monocyclic structure or a polycyclic structure having 2 or more rings fused to each other, and may have an aromatic or non-aromatic heterocyclic ring. A nitrogen atom, an oxygen atom, or a sulfur atom is preferable as a heteroatom in the heterocyclic ring.

Preferable examples of the heterocyclic ring represented by A include 5-pyrazolone, pyrazole, oxazolone, isooxazolone, barbituric acid, pyridone, rhodanine, pyrazolidinedione, pyrazolopyridone, a pyrazoloazol, a ring derived from Meldrum's acid, and a fused heterocyclic ring in which any of the above rings is fused to an aromatic hydrocarbon ring or a heterocyclic ring. Among them, 5-pyrazolone, 5-aminopyrazole, pyridone, and a pyrazoloazol are preferably; and 5-aminopyrazole, 2-hydroxy-6-pyridone, and pyrazolotriazol are particularly preferable.

Preferable examples of the heterocyclic ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzthiazole, isothiazole, benzisothiazole, thiadiazole, benzisoxazole, pyrrolidine, piperidine, piperadine, imidazolidine, and thiazoline. Among them, pyridine, quinoline, thiophene, benzothiophene, pyrazole, imidazole, benzimidazole, triazole, oxazole, isoxazole, benzoxazole, benzisoxazole, thiazole, benzthiazole, isothiazole, benzisothiazole, thiadiazole, and benzisoxazole are preferable; quinoline, thiophene, pyrazole, thiazole, benzoxazole, benzisoxazole, isothiazole, imidazole, benzthiazole, and thiadiazole are more preferable; and pyrazole, benzthiazole, benzoxazole, imidazole, 1,2,4-thiadiazole, and 1,3,4-thiadiazole are particularly preferable.

Examples of the group bondable to the ring A or B include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imide group, a phosphino group, a phosphinyl group, a phosphinyloxy group, a phosphinylamino group, and a silyl group.

Among dyes represented by Formula (Y-1), dyes each represented by the following Formulae (Y-II), (Y-III), or (Y-IV) are more preferable.

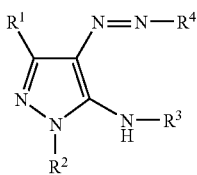

Formula (Y-II)

In Formula (Y-II), $R^1$ and $R^3$ each independently represent a hydrogen atom, a cyano group, an alkyl group, a cycloalkyl group, an aralkyl group, an alkoxy group, an alkylthio group, an arylthio group, an aryl group, or an ionic hydrophilic group. $R^2$ represents a hydrogen atom, an alkyl group, a cycloalkyl group, an aralkyl group, a carbamoyl group, an acyl group, an aryl group, or a heterocyclic group; and $R^4$ represents a heterocyclic group.

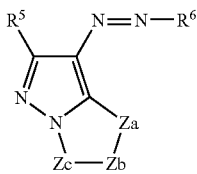

Formula (Y-III)

In Formula (Y-III) above, $R^5$ represents a hydrogen atom, a cyano group, an alkyl group, a cycloalkyl group, an aralkyl group, an alkoxy group, an alkylthio group, an arylthio group, an aryl group, or an ionic hydrophilic group; and $R^6$ represents a heterocyclic group. Za represents —N=, —NH— or $C(R^{11})$=; Zb and Zc each independently represent —N= or $C(R^{11})$=; and $R^{11}$ represents a hydrogen atom or a non-metal substituent.

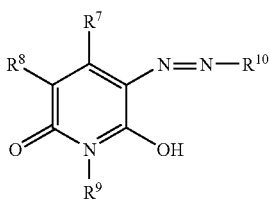

Formula (Y-IV)

In Formula (Y-IV), $R^7$ and $R^9$ each independently represent a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group. $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an amino group, a substituted amino group, a hydroxy group, or an ionic hydrophilic group. In addition, $R^{10}$ represents a heterocyclic group.

The groups represented by $R^1$, $R^2$, $R^3$, $R^5$, $R^7$, $R^8$ and $R^9$ in Formulae (Y-II), (Y-III), and (Y-IV) are described below in detail, respectively.

The alkyl group represented by $R^1$, $R^2$, $R^3$, $R^5$, $R^7$, $R^8$, or $R^9$ may be an alkyl group having a substituent, or an unsubstituted alkyl group. The alkyl group is preferably an alkyl group having 1 to 20 carbon atoms. Examples of the substituent include a hydroxyl group, an alkoxy group, a cyano group, a halogen atom, and an ionic hydrophilic group. Specific preferable examples of the (substituted) alkyl group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, and a 4-sulfobutyl group.

The cycloalkyl group represented by $R^1$, $R^2$, $R^3$, $R^5$, $R^7$, or $R^9$ may be a cycloalkyl group having a substituent, or an unsubstituted cycloalkyl group. The cycloalkyl group is preferably a cycloalkyl group having 5 to 12 carbon atoms. Examples of the substituent include an ionic hydrophilic group. Specific preferable examples of the (substituted) cycloalkyl group include a cyclohexyl group.

The aralkyl group represented by $R^1$, $R^2$, $R^3$, $R^5$, $R^7$, or $R^9$ may be an aralkyl group having a substituent, or an unsubstituted aralkyl group. The aralkyl group is preferably an aralkyl group having 7 to 20 carbon atoms. Examples of the substituent include an ionic hydrophilic group. Specific examples of the (substituted) aralkyl group include a benzyl group and a 2-phenethyl group.

The aryl group represented by $R^1$, $R^2$, $R^3$, $R^5$, $R^7$, $R^8$, or $R^9$ may be an aryl group having a substituent, or an unsubstituted aryl group. The aryl group is preferably an aryl group having 6 to 20 carbon atoms. Examples of the substituent include an alkyl group, an alkoxy group, a halogen atom, an alkylamino group, and an ionic hydrophilic group. Preferable examples of the (substituted) aryl group include a phenyl group, a p-tolyl group, a p-methoxyphenyl group, an o-chlorophenyl group, and a m-(3-sulfopropylamino)phenyl group.

The alkylthio group represented by $R^1$, $R^3$, $R^5$, $R^7$, $R^8$, or $R^9$ may be an alkylthio group having a substituent, or an unsubstituted alkylthio group. The alkylthio group is preferably an alkylthio group having 1 to 20 carbon atoms. Examples of the substituent include an ionic hydrophilic group. Specific examples of the (substituted) alkylthio group include a methylthio group and an ethylthio group.

The arylthio group represented by $R^1$, $R^3$, $R^5$, $R^7$, $R^8$, or $R^9$ may be an arylthio group having a substituent, or an unsubstituted arylthio group. The arylthio group is preferably an arylthio group having 6 to 20 carbon atoms. Examples of the substituent include an alkyl group and an ionic hydrophilic group. Specific examples of the (substituted) arylthio group include a phenylthio group and a p-tolylthio group.

The heterocyclic group represented by $R^2$ is preferably a five- or six-membered heterocyclic ring. The heterocyclic ring may be fused with another ring. The heteroatom in the heterocyclic ring is preferably a nitrogen atom, an oxygen atom, or a sulfur atom. In addition, the heterocyclic ring may be an aromatic heterocyclic ring or a non-aromatic heterocyclic ring, and may have one or more substituents. Preferable examples of the substituent include the substituents described above as examples of the substituent for the aryl group. The heterocyclic ring is preferably a six-membered nitrogen-containing aromatic heterocyclic ring. Among them, triazine, pyrimidine, and phthalazine are particularly preferable.

The halogen atom represented by $R^8$ is preferably a fluorine atom, a chlorine atom, or a bromine atom.

The alkoxy group represented by $R^1$, $R^3$, $R^5$, or $R^8$ may be an alkoxy group having a substituent, or an unsubstituted alkoxy group. The alkoxy group is preferably an alkoxy group having 1 to 20 carbon atoms. Examples of the substituent include a hydroxyl group and an ionic hydrophilic group. Specific examples of the (substituted) alkoxy group include a methoxy group, an ethoxy group, an isopropoxy group, a methoxyethoxy group, a hydroxyethoxy group, and a 3-carboxypropoxy group.

The aryloxy groups represented by $R^8$ may be an aryloxy group having a substituent or an unsubstituted aryloxy group. The aryloxy group is preferably an aryloxy group having 6 to 20 carbon atoms. Examples of the substituent include an alkoxy group and an ionic hydrophilic group. Specific examples of the (substituted) aryloxy group include a phenoxy group, a p-methoxyphenoxy group, and an o-methoxyphenoxy group.

The acylamino group represented by $R^8$ may be an acylamino group having a substituent or an unsubstituted acylamino group. The acylamino group may be an acylamino group having 2 to 20 carbon atoms. Examples of the substituent include an ionic hydrophilic group. Specific examples of the (substituted) acylamino group include an acetamido group, a propionamido group, a benzamido group, and a 3,5-disulfobenzamide group.

The sulfonylamino group represented by $R^8$ may be a sulfonylamino group having a substituent or an unsubstituted sulfonylamino group. The sulfonylamino group is preferably a sulfonylamino group having 1 to 20 carbon atoms. Examples of the substituent include a methyl group, an ethyl group, an n-propyl group, an iso-propyl group, an n-butyl group, an iso-butyl group, and a tert-butyl group. Preferable examples thereof include a sulfonylamino group as well as, for example, a methylsulfonylamino group and an ethylsulfonylamino group.

The alkoxycarbonylamino group represented by $R^8$ may be an alkoxycarbonylamino group having a substituent or an unsubstituted alkoxycarbonylamino group. The alkoxycarbonylamino group is preferably an alkoxycarbonylamino group having 2 to 20 carbon atoms. Examples of the substituent include an ionic hydrophilic group. Specific examples of the (substituted) alkoxycarbonylamino group include an ethoxycarbonylamino group.

The ureido group represented by $R^8$ may be an ureido group having a substituent or an unsubstituted ureido group. The ureido group is preferably an ureido group having 1 to 20 carbon atoms. Examples of the substituent include an alkyl group and an aryl group. Specific examples of the (substituted) ureido group include a 3-methylureido group, a 3,3-dimethylureido group, and a 3-phenylureido group.

The alkoxycarbonyl group represented by $R^7$, $R^8$, or $R^9$ may be an alkoxycarbonyl group having a substituent or an unsubstituted alkoxycarbonyl group. The alkoxycarbonyl group is preferably an alkoxycarbonyl group having 2 to 20 carbon atoms. Examples of the substituent include an ionic hydrophilic group. Specific examples of the (substituted) alkoxycarbonyl group include a methoxycarbonyl group and an ethoxycarbonyl group.

The carbamoyl group represented by $R^2$, $R^7$, $R^8$, or $R^9$ may be a carbamoyl group having a substituent or an unsubstituted carbamoyl group. Examples of the substituent include an alkyl group. Specific examples of the (substituted) carbamoyl group include a methylcarbamoyl group and a dimethylcarbamoyl group.

The sulfamoyl group represented by $R^8$ may be a sulfamoyl group having a substituent or an unsubstituted sulfamoyl group. Examples of the substituent include an alkyl group.

Specific examples of the (substituted) sulfamoyl group include a dimethylsulfamoyl group and a di-(2-hydroxyethyl) sulfamoyl group.

Preferable examples of the sulfonyl group represented by $R^8$ include a methanesulfonyl group and a phenylsulfonyl group.

The acyl group represented by $R^2$ or $R^8$ may be an acyl group having a substituent or an unsubstituted acyl group. The acyl group is preferably an acyl group having 1 to 20 carbon atoms. Examples of the substituent include an ionic hydrophilic group. Specific examples of the (substituted) acyl group include an acetyl group and a benzoyl group.

The ionic hydrophilic group represented by $R^1$, $R^3$, $R^5$, $R^7$, $R^8$, or $R^9$ may be a carboxyl group, a quaternary ammonium salt, a sulfonic acid group, or the like; and preferable examples thereof include a carboxyl group and a sulfonic acid group.

The aralkyl group represented by $R^2$ may be an aralkyl group having a substituent or an unsubstituted aralkyl group. Examples of the substituent include a hydroxy group, an alkoxy group, a cyano group, a halogen atom, and an ionic hydrophilic group. Examples of the aryl unit in the aralkyl group include a phenyl group and a naphthyl group, and preferable examples thereof include a benzyl group and a 2-phenethyl group.

Examples of the substituent in the substituted amino group represented by $R^8$ include an alkyl group, an aryl group, and a heterocyclic group. Specific examples of the substituted amino group include a methylamino group, a diethylamino group, an anilino group, and a 2-chloroanilino group.

In Formulae (Y-II), (Y-III), and (Y-IV), the definitions of the heterocyclic groups represented by $R^4$, $R^6$, and $R^{10}$ are the same as the definition of the optionally substituted heterocyclic group represented by B of Formula (Y-I), and preferable examples, more preferable examples, and still more preferable examples thereof are also the same as the preferable examples, more preferable examples, and still more preferable examples of the heterocyclic group represented by B shown in Formula (Y-I), respectively. Examples of the substituent on the heterocyclic group include ionic hydrophilic groups, alkyl groups having 1 to 12 carbon atoms, aryl groups, alkylthio groups, arylthio groups, halogen atoms, cyano groups, sulfamoyl groups, sulfonamino groups, carbamoyl groups, and acylamino groups. The above groups such as alkyl and aryl groups may themselves have substituents which may be selected from the above examples of the substituent bondable to the heterocyclic ring A or B shown in Formula (Y-I).

In Formula (Y-III), Za represents —N═, —NH—, or —C($R^{11}$)═, and Zb and Zc each independently represent —N═ or —C ($R^{11}$)═. $R^{11}$ represents a hydrogen atom or a non-metal substituent. When $R^{11}$ represents a non-metal substituent, the non-metal substituent is preferably a cyano group, a cycloalkyl group, an aralkyl group, an aryl group, an alkylthio group, an arylthio group, or an ionic hydrophilic group. The definitions and preferable examples of these groups are the same as in the above explanation of $R^1$.

Examples of the skeletons of the heterocyclic rings comprising two five-membered rings included in Formula (Y-III) are shown below:

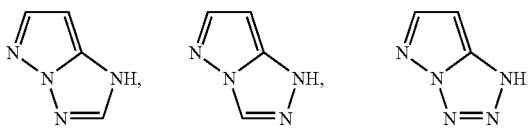

Specific examples of the dye represented by Formula (Y-I) include, but not limited to, the exemplary compounds Y-101 to Y-155 described in paragraphs [0139] to [0149] of JP-A No. 2003-073598, the disclosure of which is incorporated herein by reference. These compounds can be prepared with reference to JP-A No. 2-24191 and 2001-279145, the disclosures of which are incorporated herein by reference.

The compound having the structure represented by Formula (3) or (4) of JP-A No. 2002-114930 (the disclosure of which is incorporated herein by reference) is preferable as the oil-soluble magenta dye, and specific examples thereof include the compounds described in paragraphs [0054] to [0073] of JP-A No. 2002-114930. Preferable examples of the dye further include the azo dyes represented by Formulae (M-1) to (M-2) disclosed in paragraphs [0084] to [0122] of JP-A No. 2002-121414 (the disclosure of which is incorporated herein by reference), and specific examples thereof include the compounds disclosed in paragraphs [0123] to [0132] of JP-A No. 2002-121414. The oil-soluble dyes represented by Formulae (3), (4), and (M-1) to (M-2) in the above patent applications may be used not only for magenta inks but also for other color inks such as black and red inks.

Preferable examples of the oil-soluble cyan dye include the dyes represented by Formulae (I) to (IV) shown in JP-A No. 2001-181547 (the disclosure of which is incorporated herein by reference) and the dyes represented by Formula (IV-1) to (IV-4) described in paragraphs [0063] to [0078] of JP-A No. 2002-121414 (the disclosure of which is incorporated herein by reference); specific examples thereof include the compounds described in paragraphs [0052] to [0066] of JP-A No. 2001-181547 and paragraphs [0079] to [0081] of JP-A No. 2002-121414. Preferable examples of the dye include the phthalocyanine dyes represented by Formulae (C-I) and (C-II) described in paragraphs [0133] to [0196] of JP-A No. 2002-121414. In particular, the phthalocyanine dye represented by Formula (C-II) is preferable. Specific examples thereof include the compounds described in paragraphs [0198] to [0201] of JP-A No. 2002-121414. The oil-soluble dyes represented by Formulae (I) to (IV), (IV-1) to (IV-4), (C-I), and (C-II) may be used not only for cyan inks, but also for other color inks such as black and green inks.

The pigment is preferably, for example, an organic pigment. Examples of the organic pigment include yellow pigments, orange pigments, red pigments, violet pigments, blue pigments, green pigments, brown pigments, and black pigments.

The content of the colorant in the inkjet-recording ink composition is preferably 0.05 to 15 wt %, more preferably 0.1 to 10 wt %, and particularly preferably 0.2 to 6 wt %.

[Photopolymerization Initiator]

The inkjet-recording ink composition according to the invention contains at least one photopolymerization initiator. The photopolymerization initiator absorbs light in the visible to near-infrared wavelength range and accelerates polymerization curing by acting on the ethylenic unsaturated monomer described above when exposed to a visible to near-infrared light.

The photopolymerization initiator according to the invention is not particularly limited as long as the photopolymerization initiator generates a radical or an active species other than a radical upon exposure to a light in the visible to near-infrared wavelength range, to accelerate the polymerization reaction of the polymerizable group in the ethylenic unsaturated monomer described above. In the invention, the visible to near-infrared light refers to a light in the wavelength range of 400 to 1,200 nm.

Examples of generally known photopolymerization initiators include acetophenone derivatives, benzophenone derivatives, benzyl derivatives, benzoin derivatives, benzoin ether derivatives, benzyldialkylketal derivatives, thioxanthone derivatives, acylphosphine oxide derivatives, metal complexes, p-dialkylaminobenzoic acid, azo compounds, and peroxide compounds. Preferable examples thereof include acetophenone derivatives, benzyl derivatives, benzoin ether derivatives, benzyldialkylketal derivatives, thioxanthone derivatives, acylphosphine oxide derivatives, and combinations of organic dyes and organic boron compounds. An appropriate photopolymerization initiator capable of acting in the above wavelength range may be selected.

In the invention, a photopolymerization initiator comprising an organic dye and an organic boron compound is particularly preferable. Hereinafter, the organic dye and the organic boron compound will be described mainly.

Organic Dye

The organic dye according to the invention may be selected appropriately form known compounds. Among them, the organic dye is preferably an organic dye having an absorption peak wavelength of 400 to 1,200 nm.

The sensitivity can be improved by adjusting the sensitive wavelength in accordance with the light source to be used, and the adjustment may be achieved by selecting a desired dye from the organic dyes sensitive in the above wavelength range. Suitable selection of the dye enables use of a light source of blue, green, or red, an infrared laser, or the like as the light source for image exposure.

Accordingly, for example, in forming a color image in multiple colors by using multiple ink compositions different in hue, it is possible to polymerization-cure the respective ink compositions separately or collectively, by allowing organic dyes having different absorption wavelengths which function as spectral sensitizing dyes to be present respectively in different ink compositions and using a light source suitable for the absorption wavelengths Specific examples of the organic dye include the dyes disclosed, for example in: the patent applications described below concerning "organic boron compounds", "Research Disclosure, Vol. 200, December, 1980, Item 20036" (the disclosure of which is incorporated herein by reference), and "Zoukanzai" (Sensitizers) (pp. 160 to 163, Kodansha; Katsumi Tokumaru and Akira Ogawara, ed., 1987) (the disclosure of which is incorporated herein by reference). The organic dye in the photopolymerization initiator according to the invention may be a cationic, anionic, or nonionic dye.

Specific examples thereof include the 3-ketocoumarin compounds described in JP-A No. 58-15603; the thiopyrylium salts described in JP-A No. 58-40302; the naphthothiazole merocyanine compounds described in Japanese Patent Publication (JP-B) Nos. 59-28328 and 60-53300; the merocyanine compounds described in JP-B Nos. 61-9621 and 62-3842 and JP-A Nos. 59-89303 and 60-60104; the merocyanine dyes containing thiobarbituric acid described in JP-A Nos. 62-150242 and 64-59345, JP-B No. 8-9643, JP-A Nos. 2000-212208, 2000-235262, 2001-181315, 2001-226417, 2001-226605, 2001-228604, and 2001-324807; hemioxanol colorants; and cyanine, hemicyanine and merocyanine dyes having indolenine rings. The disclosures of the above patent documents are incorporated herein by reference.

Examples of the organic dye further include the dyes described in *"Kinousei Shikiso no Kagaku"* (Chemistry of Functional Dyes) (1981, CMC Publishing, pp. 393 to 416), and *"Sikizai"* (Colorants) (60 [4] 212-224 (1987)), the disclosures of which are incorporated herein by reference. Specific examples thereof include cationic methine dyes, cationic carbonium dyes, cationic quinonimine dyes, cationic indoline dyes, and cationic styryl dyes.

Examples of the organic dye include keto dyes such as coumarin dyes (including ketocoumarins and sulfonocoumarins), merostyryl dyes, oxonol dyes, and hemioxonol dyes; non-keto dyes such as non-keto polymethine dyes, triarylmethane dyes, xanthene dyes, anthracene dyes, rhodamine dyes, acridine dyes, aniline dyes, and azo dyes; non-keto polymethine dyes such as azomethine dyes, cyanine dyes, carbocyanine dyes, dicarbocyanine dyes, tricarbocyanine dyes, hemicyanine dyes, and styryl dyes; and quinonimine dyes such as azine dyes, oxazin dyes, thazine dyes, quinoline dyes, and thiazole dyes.

Specific examples (exemplary compounds 1-1 to 3-15) of the cationic, anionic, and nonionic organic dyes described above are shown below. However, the invention is not restricted by these examples.

(Cationic organic dyes)

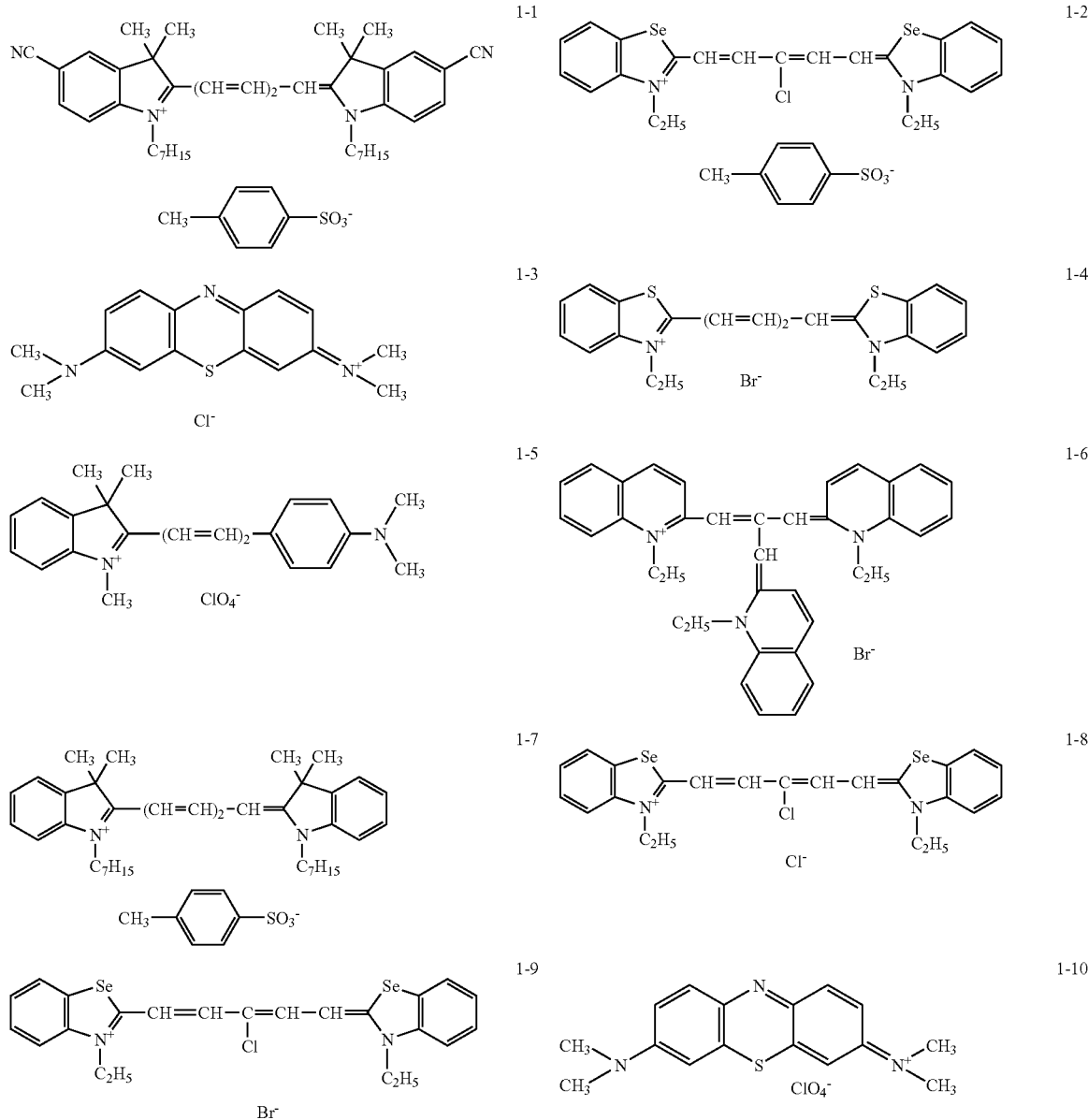

-continued
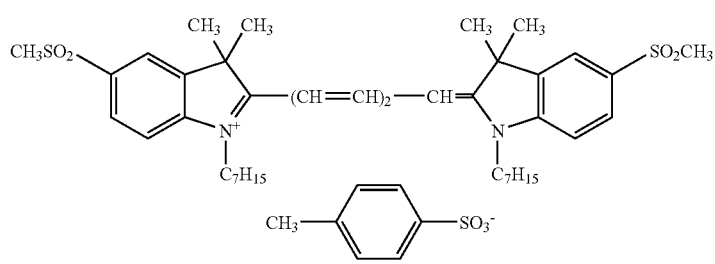
1-11
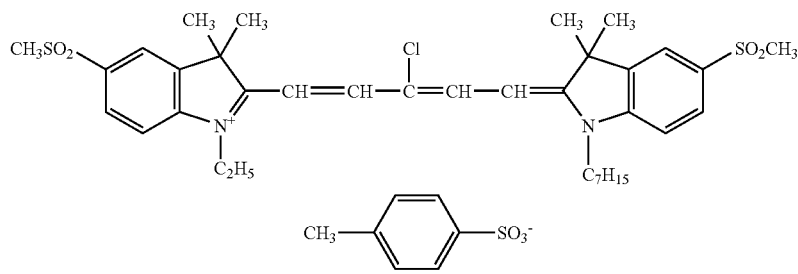
1-12
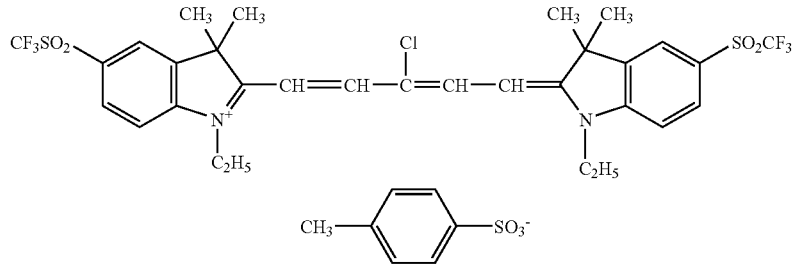
1-13
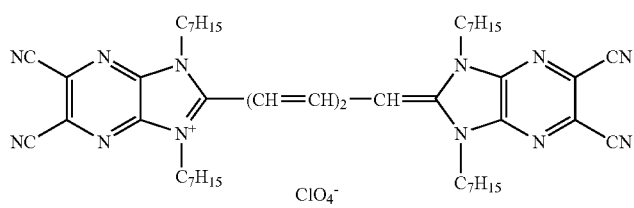
1-14
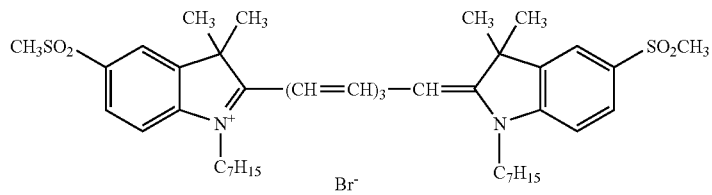
1-15
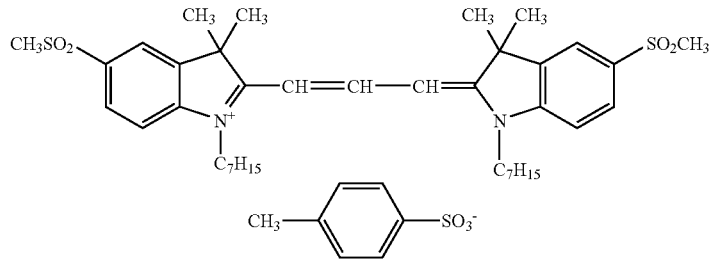
1-16

-continued
1-17
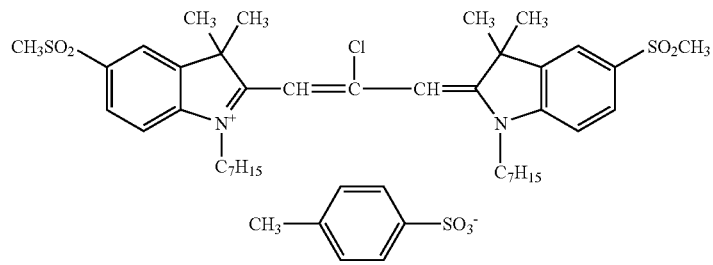
1-18
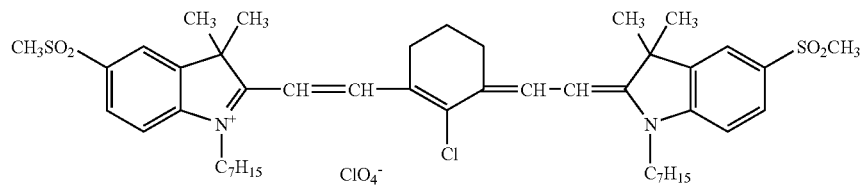
1-19
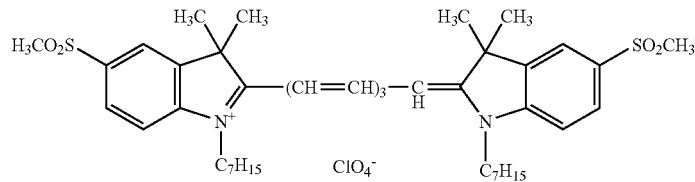
1-20
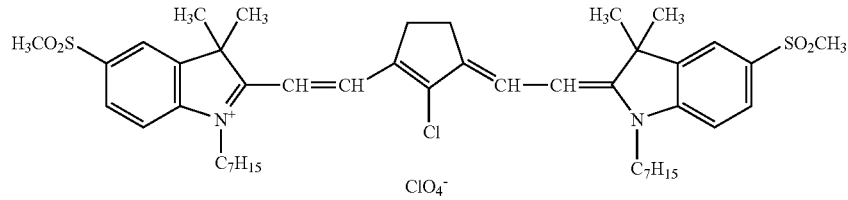
(Anionic organic dye)
2-1
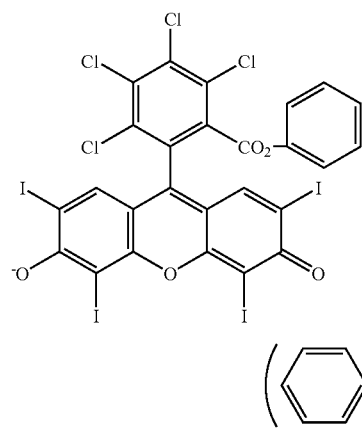
2-2
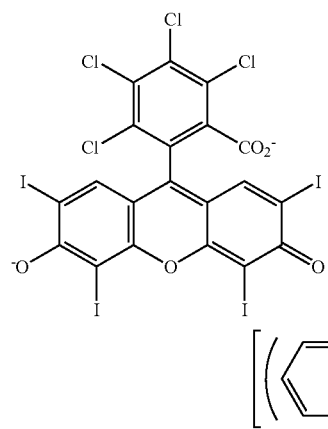
2-3
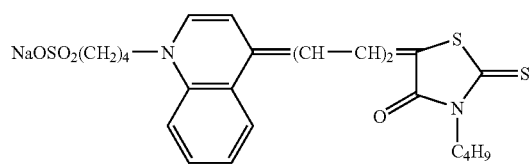
2-4
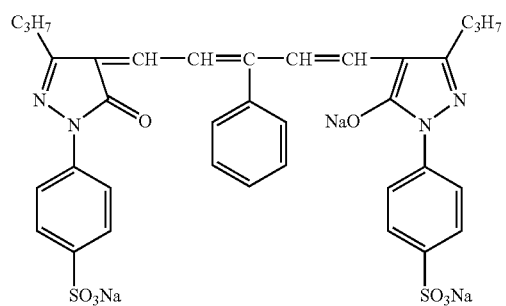

-continued
(Nonionic organic dye)
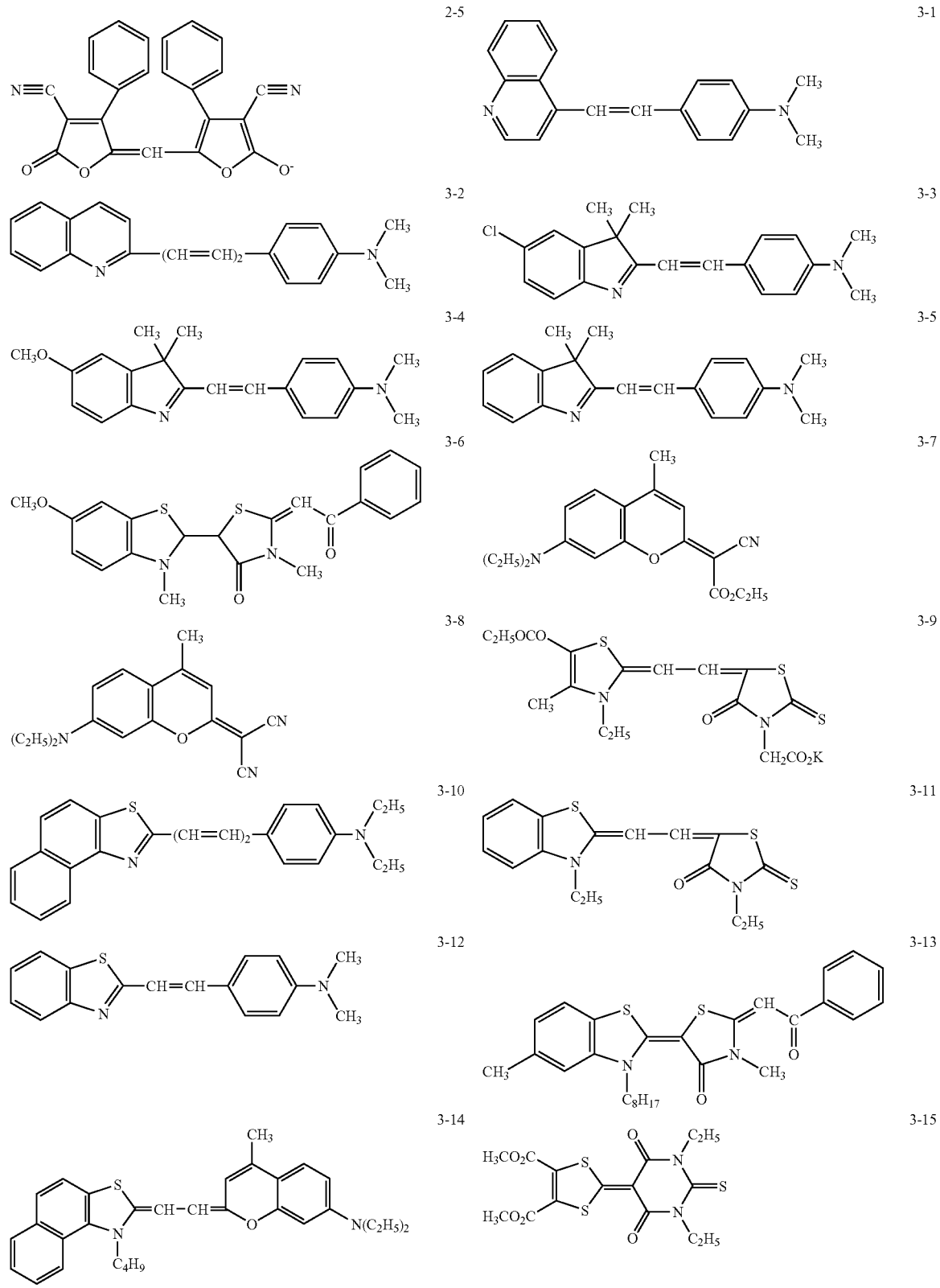

Selection and use of an appropriate organic dye allows the photopolymerization initiator to have a spectral sensitivity in the wavelength range of 400 to 1,200 nm. Only a single organic dye may be used, or two or more organic dyes may be used, wherein each dye may be selected from the various organic dyes described above. In an embodiment, the colorant described above functions also as the organic dye.

The content of the organic dye in the ink-jet-recording ink composition is preferably in the range of 0.01 to 15 wt %, more preferably 0.05 to 10 wt %, still more preferably, 0.1 to 5 wt %, based on the weight of the ethylenic unsaturated monomer. In addition, the content of the organic dye is preferably 1 to 10 mols per 1 mol of the organic boron compound described below.

Organic Boron Compound

The organic boron compound in the photopolymerization initiator according to the invention is an organic boron compound represented by the following Formula (1). Examples of the organic boron compound include organic boron compounds described in JP-A Nos. 62-143044, 9-188685, 9-188686, 9-188710, and 2000-319283, the disclosures of which are incorporated herein by reference. When the organic boron compound and the organic dye coexist, the photopolymerization initiator is highly sensitive to an exposure light source in the spectral absorption wavelength range, whereby the sensitivity is improved and radical generation can be controlled by using an arbitrary light source emitting light in the visible region.

$$B^-—R)_4X^+ \qquad \text{Formula (I)}$$

In Formula (I), each R is selected from alkyl groups, substituted alkyl groups, aryl groups, substituted aryl groups, aralkyl groups, substituted aralkyl groups, alkaryl groups, substituted alkaryl groups, alkenyl groups, substituted alkenyl groups, alkynyl groups, substituted alkynyl groups, alicyclic groups, substituted alicyclic groups, heterocyclic groups, substituted heterocyclic groups, and derivatives thereof; and R groups may be the same as or different from each other. In addition, 2 or more R groups may form a boron-containing heterocyclic ring by combining with each other directly or via a substituent. X represents an alkali metal, quaternary ammonium, pyridinium, quinolinium, diazonium, morpholinium, tetrazolinium, acrydinium, phosphonium, sulfonium, oxosulfonium, iodonium, S, P, Cu, Ag, Hg, Pd, Fe, Co, Sn, Mo, Cr, Ni, As, or Se.

Specific examples (exemplary compounds (1) to (36), (A-1) to (A-40), and (B-1) to (B-25)) of the organic boron compound are shown below. However, the invention is not restricted by these examples.

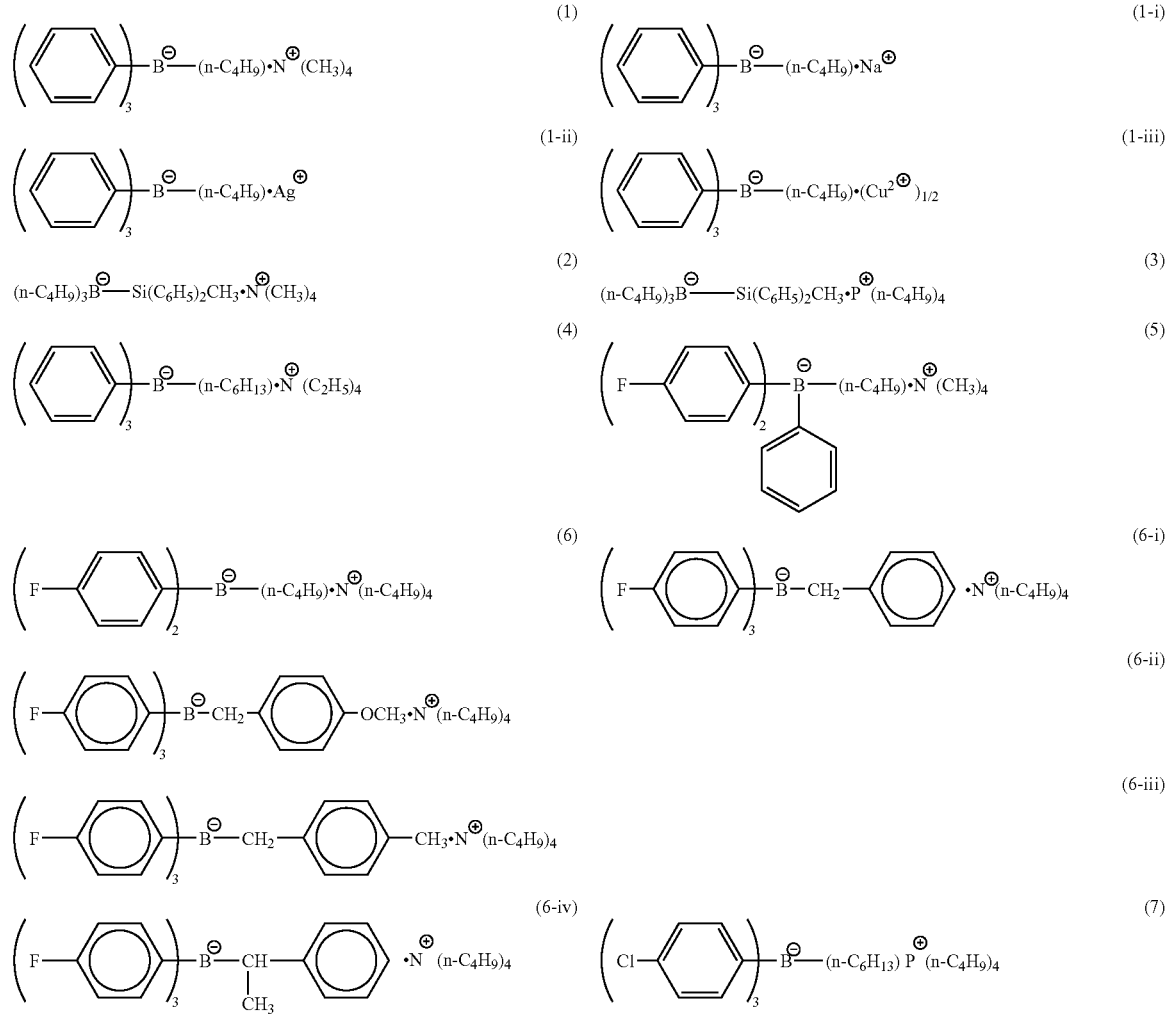

-continued
(8)
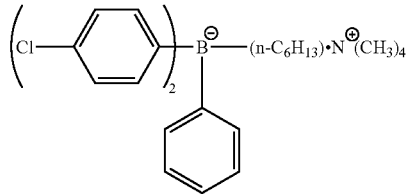
(9)
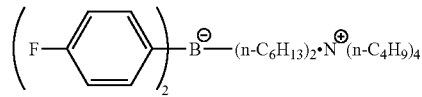
(10)
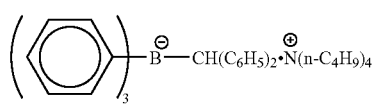
(11)
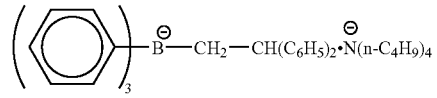
(12)
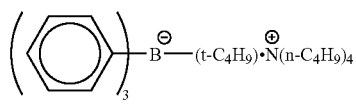
(13)
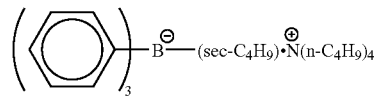
(14)
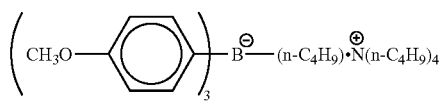
(15)
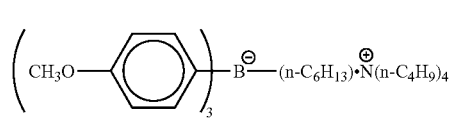
(16)
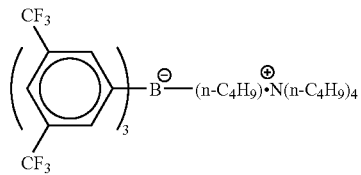
(17)
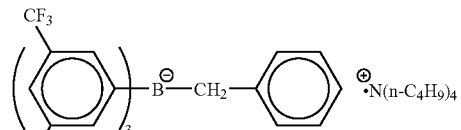
(18)
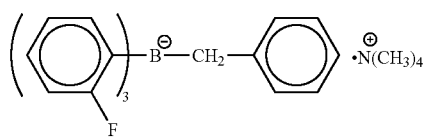
(19)
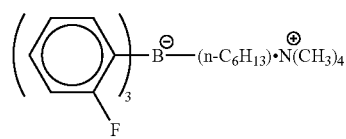
(20)
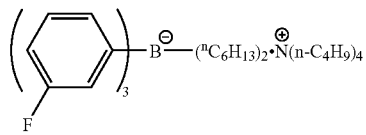
(20-i)
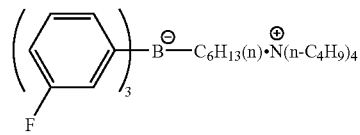
(21)
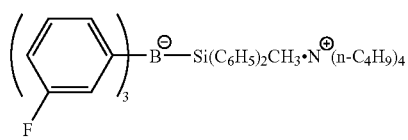
(22)
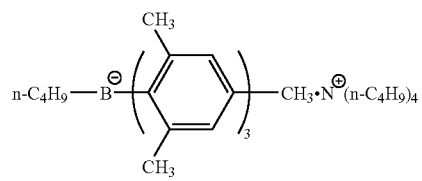
(23)
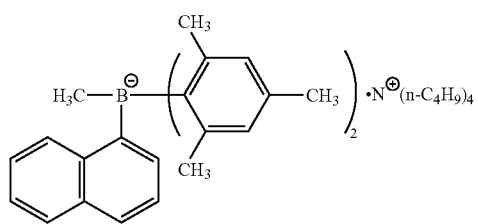
(24)
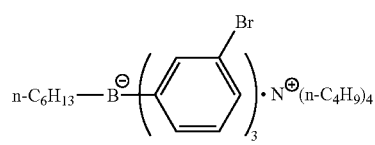

-continued
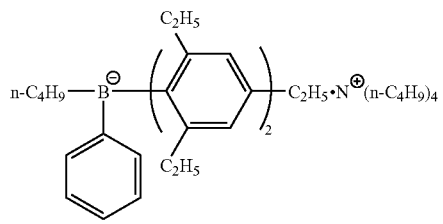 (25)
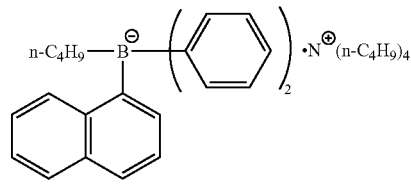 (26)
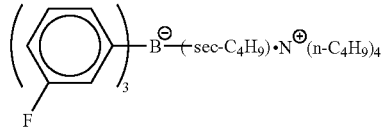 (27)
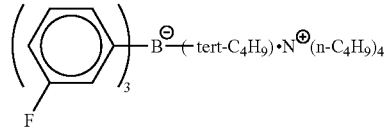 (28)
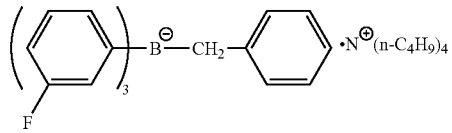 (29)
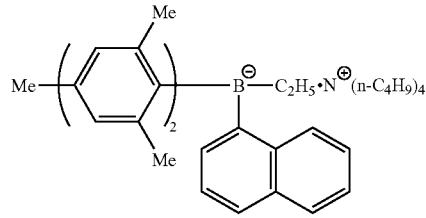 (30)
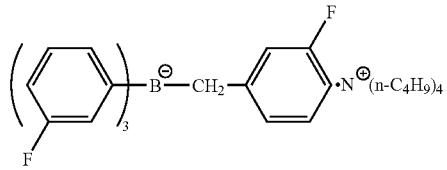 (31)
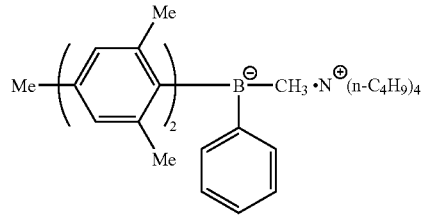 (32)
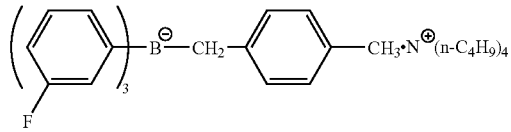 (33)
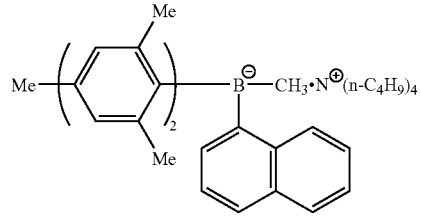 (34)
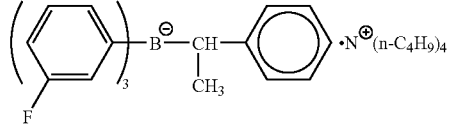 (35)
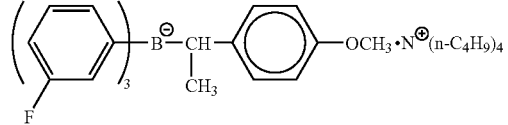 (36)
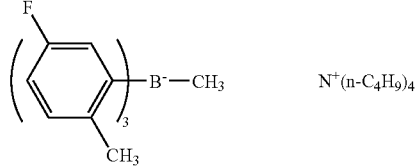 A-1
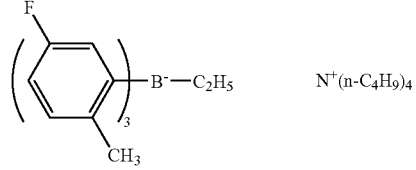 A-2
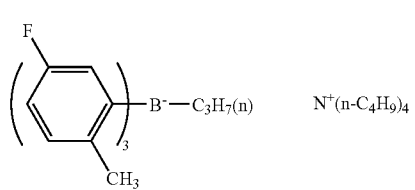 A-3
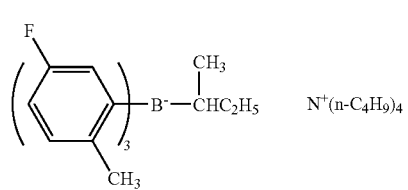 A-4

-continued
A-5 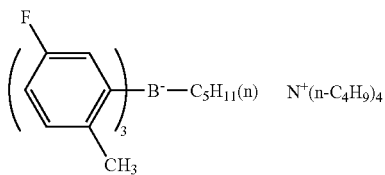
A-6 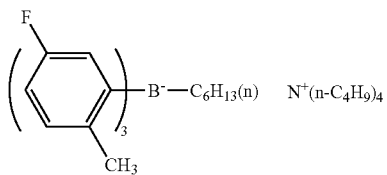
A-7 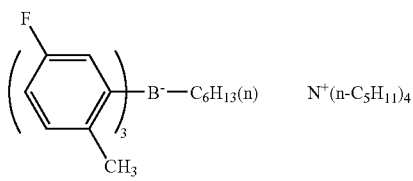
A-8 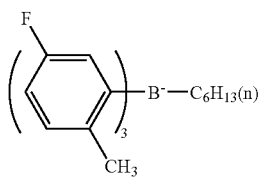
A-9 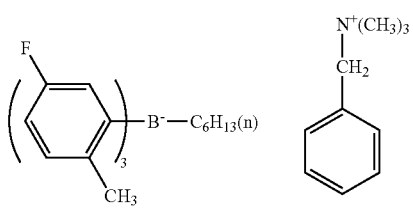
A-10 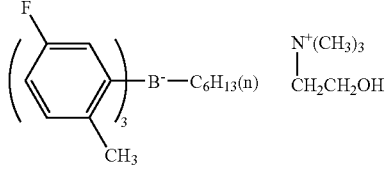
A-11 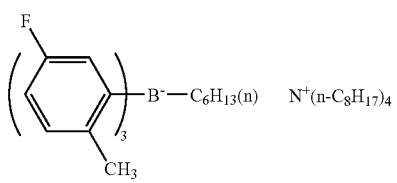
A-12 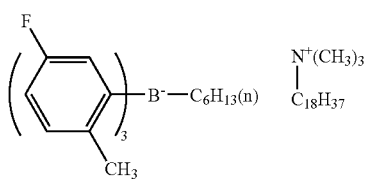
A-13 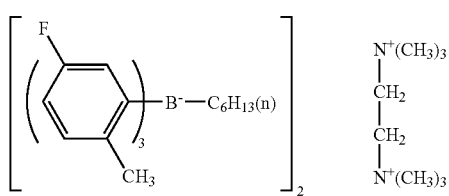
A-14 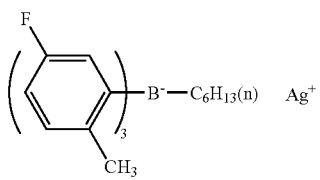
A-15 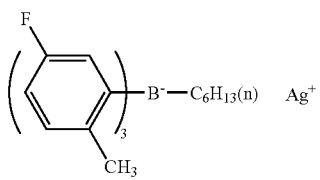
A-16 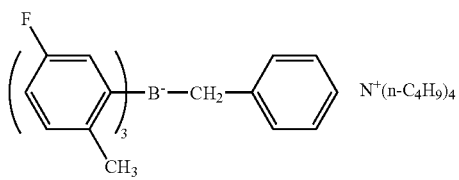
A-17 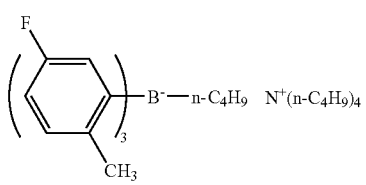
A-18 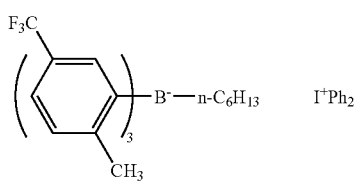
A-19 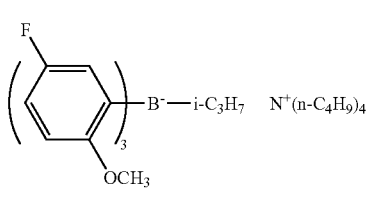
A-20 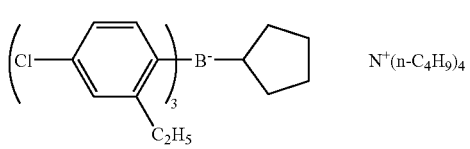

-continued
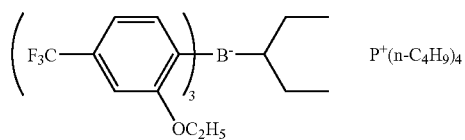 A-21
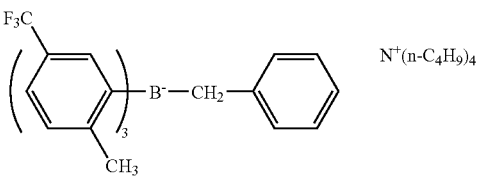 A-22
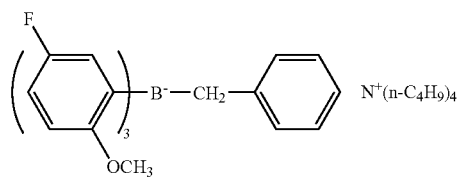 A-23
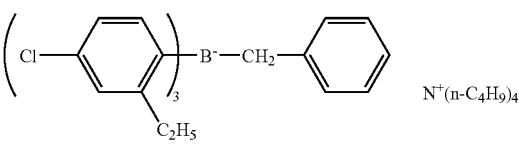 A-24
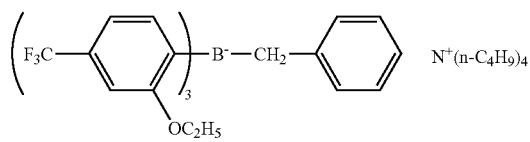 A-25
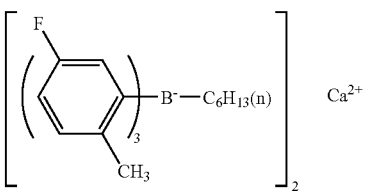 A-26
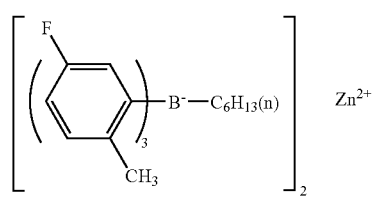 A-27
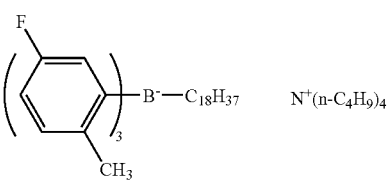 A-28
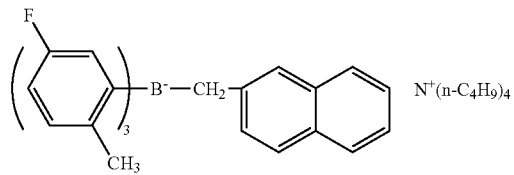 A-29
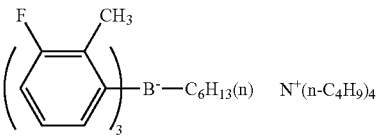 A-30
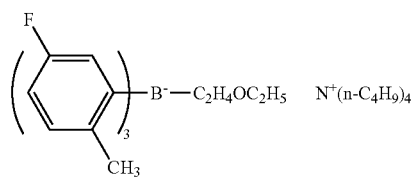 A-31
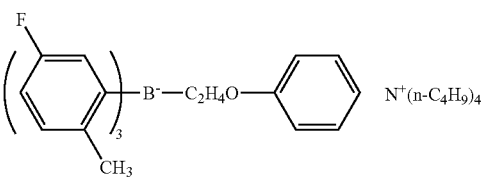 A-32
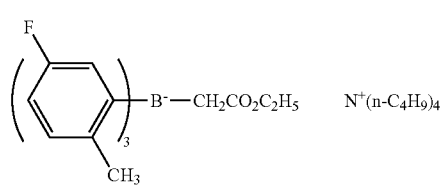 A-33
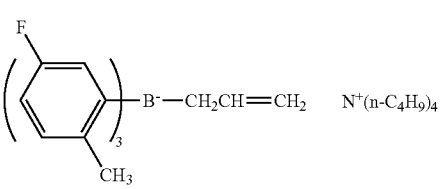 A-34
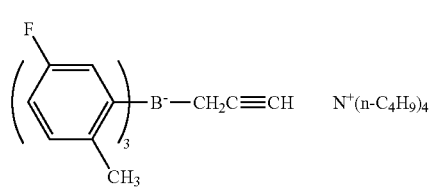 A-35
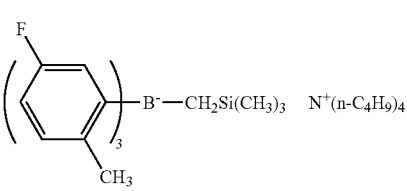 A-36

-continued
A-37
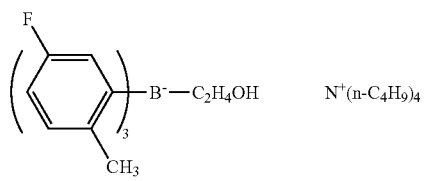
A-38
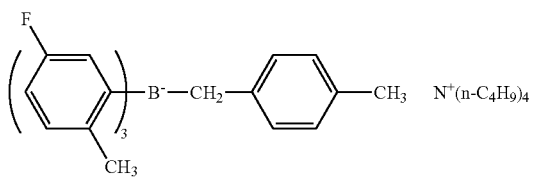
A-39
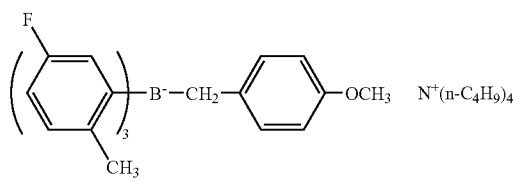
A-40
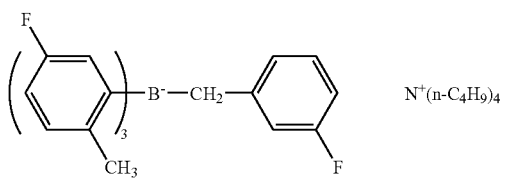
B-(1)
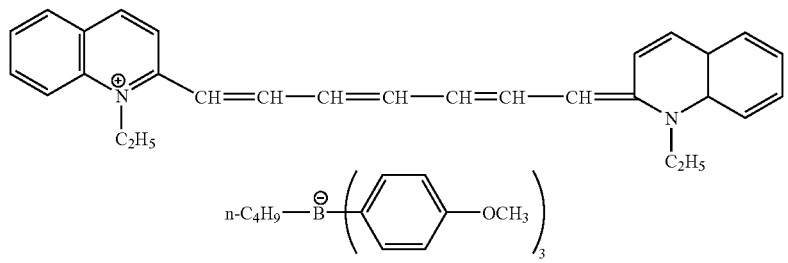
B-(2)
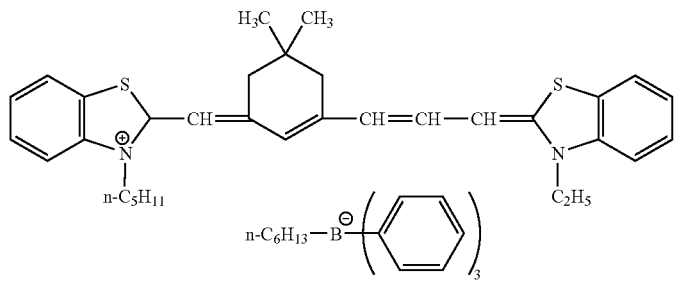
B-(3)
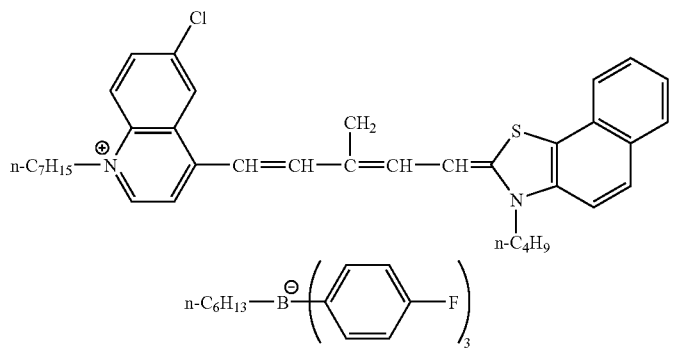
B-(4)
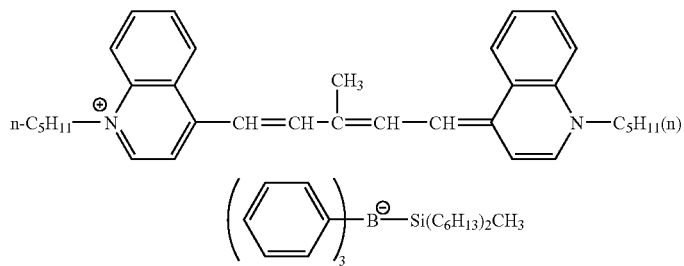

-continued
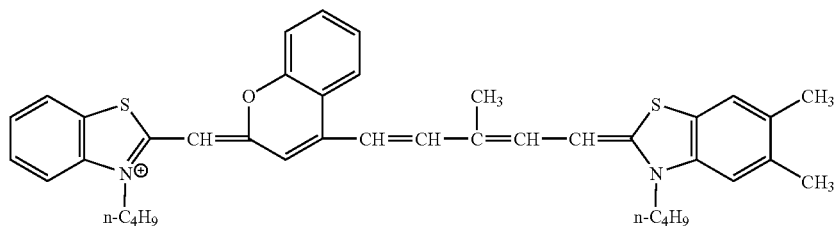
B-(5)
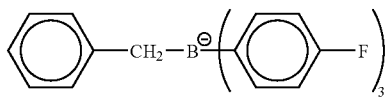
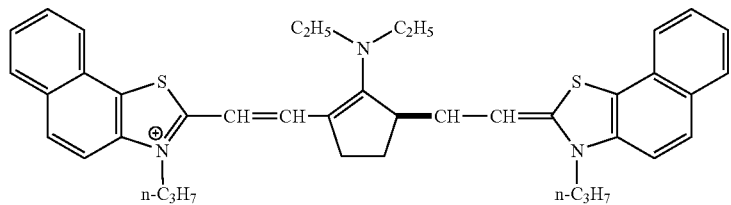
B-(6)
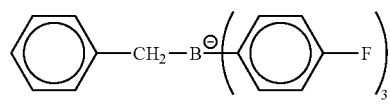
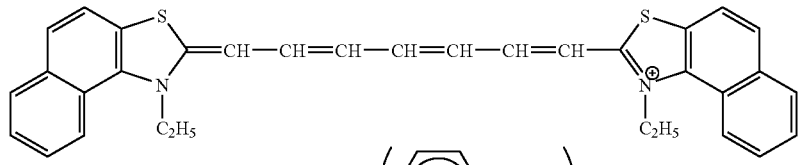
B-(7)
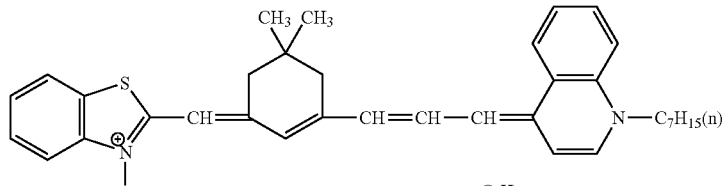
B-(8)
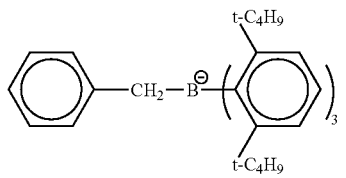
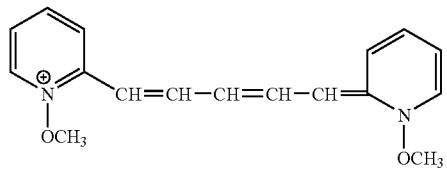
B-(9)
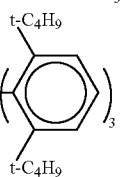

-continued
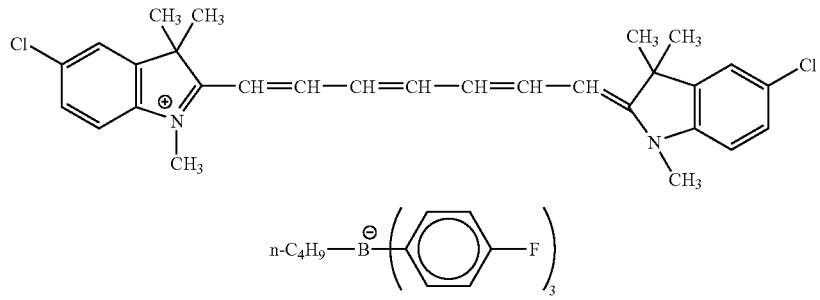 B-(10)
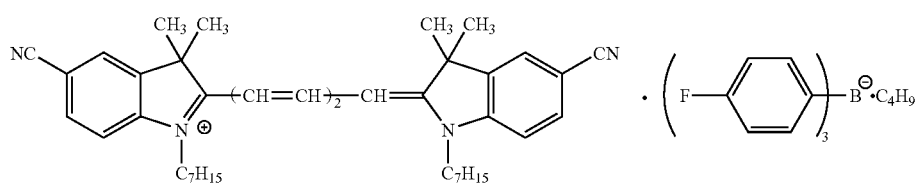 B-(11)
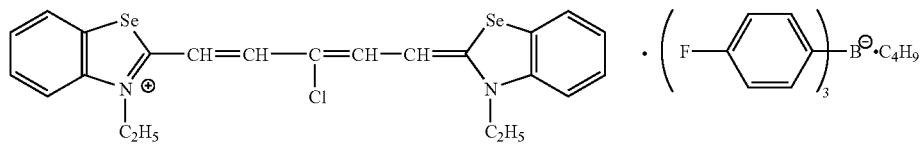 B-(12)
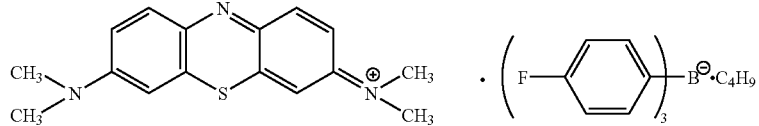 B-(13)
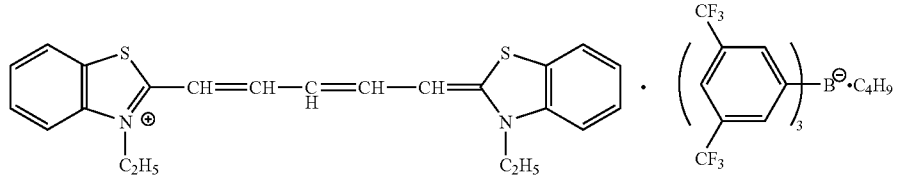 B-(14)
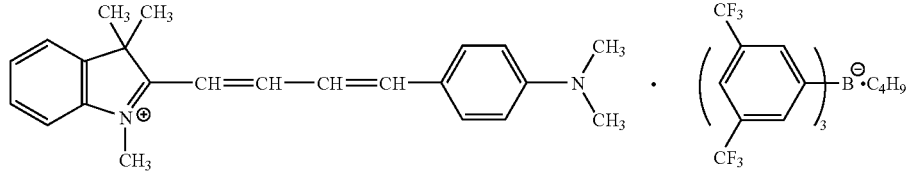 B-(15)
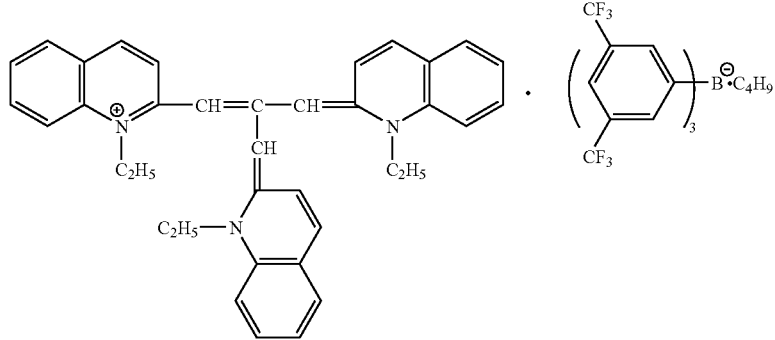 B-(16)

-continued
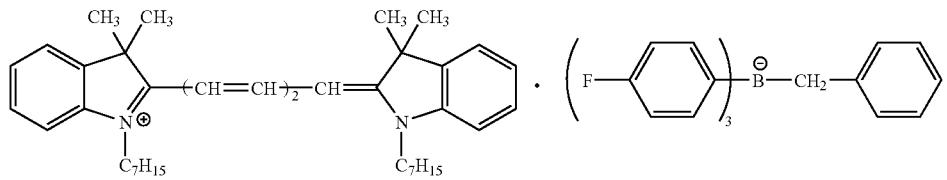
B-(17)
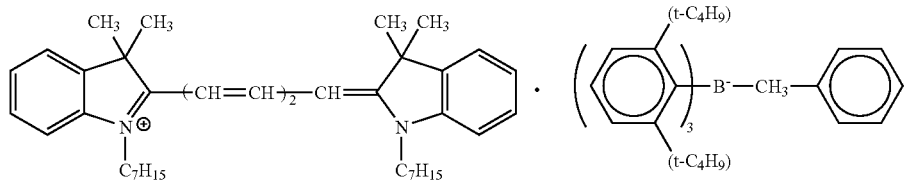
B-(18)
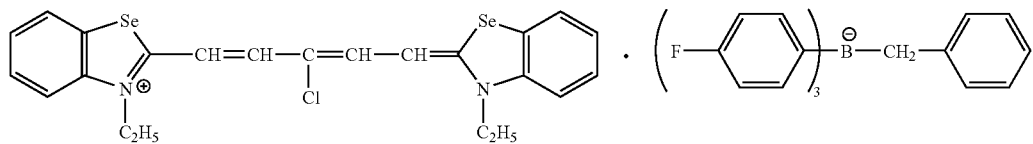
B-(19)
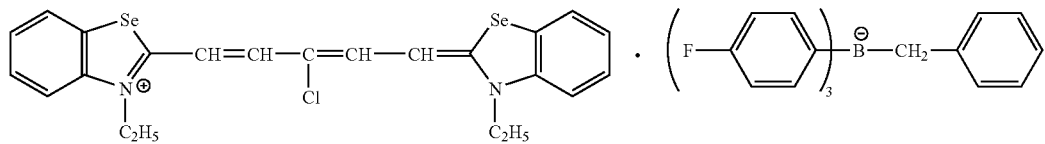
B-(20)
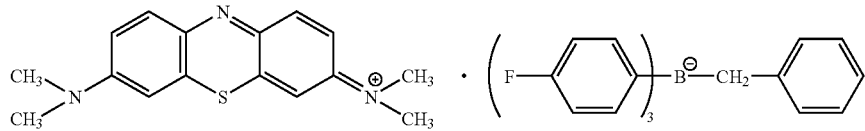
B-(21)
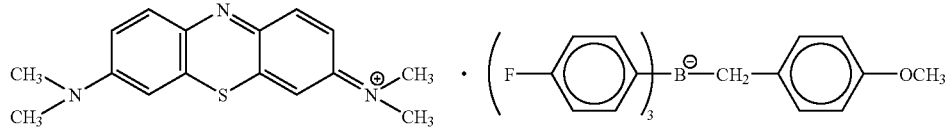
B-(22)
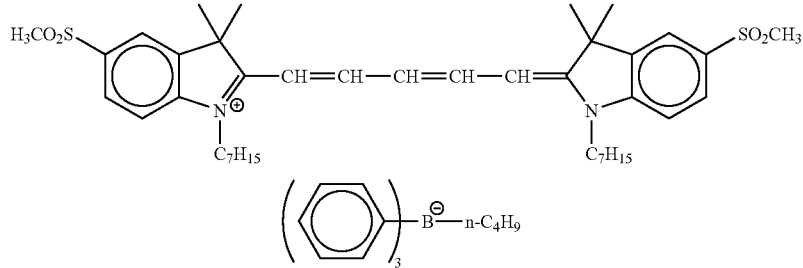
B-(23)
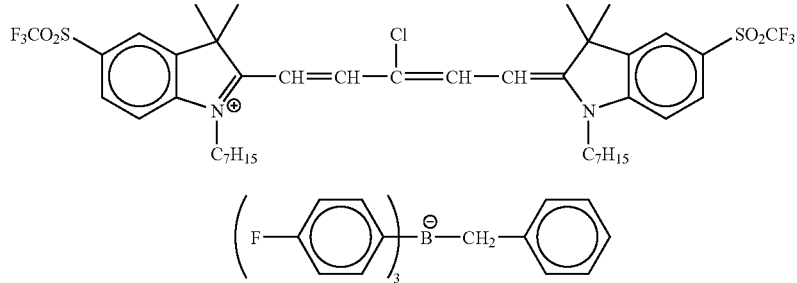
B-(24)

-continued

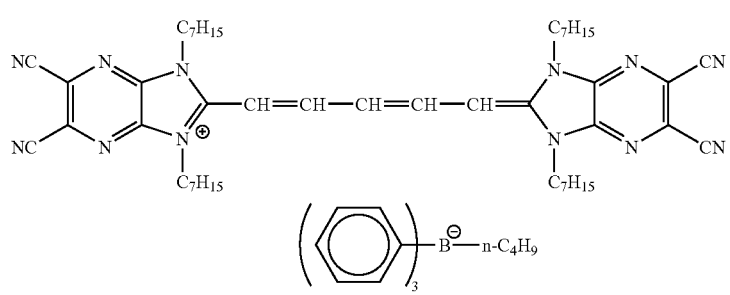

B-(25)

A compound described in paragraphs [0145] to [0151] of JP-A No.2000-199952 (the disclosure of which is incorporated herein by reference) which interacts with the organic dye may be additionally used in the photopolymerization initiator according to the invention, as long as the effects of the invention can be obtained. Preferable examples of the compound interacting with the organic dye include benzoin ethers, s-triazine derivatives having trihalogen-substituted methyl groups, organic peroxides, and azinium chlorides.

[Other Components]

In addition to the ethylenic unsaturated monomer, the oil-soluble dye and the photopolymerization initiator described above, the inkjet-recording ink composition according to the invention may further comprise an organic solvent, or a high-boiling point hydrophobic organic solvent or polymer for the purpose of adjusting the viscosity, polarity, and the polymerization activity of the composition.

Organic Solvent

Generally, the inkjet-recording ink composition according to the invention may include an organic solvent, for example when colored particles are prepared by the emulsification method to be described below. For example, in an example of the preparation of an ink composition by dispersing colored particles in an aqueous medium, an oil phase is prepared by using an organic solvent together with the monomer, the colorant and the photopolymerization initiator.

The organic solvent is not particularly limited. It is preferable to select the organic solvent based on solubility of the water-insoluble dye (in particular, oil-soluble dye) in the organic solvent or solubility of the oil (in particular, polymer component constituting the oil) in the organic solvent. Examples thereof include ketone solvents such as acetone, methylethylketone, and diethylketone; alcohol solvents such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethylether, tetrahydrofuran, and dioxane; and glycol ether solvents such as ethylene glycol monomethylether, and ethylene glycol dimethylether.

Only a single organic solvent may be used, or two or more organic solvents may be used simultaneously. A mixed solvent of an organic solvent and water may be used depending on the solubility of the colorant, the solubility of the monomer, or the solubility of the polymer formed from the monomer.

The amount of the organic solvent to be used is not particularly limited as long as the effects of the invention are not impaired. The amount of the organic solvent is preferably 10 to 2,000 parts by weight per 100 parts by weight of the ethylenic unsaturated monomer described above. When the amount of the organic solvent is smaller than 10 parts by weight, it is difficult to disperse the particles finely and stably. When the amount of the organic solvent is over 2,000 parts by weight, it is necessary to conduct processes for removing the organic solvent and concentrating the resulting composition, and the freedom in designing the composition is restricted.

When the organic solvent has a vapor pressure greater than that of water, it is preferable to remove the organic solvent, from the viewpoints of the stability of the dispersion and of health and safety. The organic solvent may be removed by a known method suitable for the type of the organic solvent, and examples thereof include evaporation, vacuum evaporation, and ultrafiltration. If emulsification is conducted, it is preferable to remove the organic solvent as quickly as possible immediately after the emulsification.

As will be described below, for example when colored particles containing the ethylenic unsaturated monomer, the colorant, and the photopolymerization initiator are dispersed in an aqueous medium by emulsification, the content of the colored particles in the inkjet-recording ink composition according to the invention is preferably 1 to 45 wt %, more preferably 2 to 30 wt %, based on the weight of the composition. The content can be adjusted properly by dilution, evaporation, ultrafiltration, or the like.

The high-boiling organic solvent described above which is optionally contained in the inkjet-recording ink composition is an organic solvent having a boiling point of higher than 100° C. The high-boiling organic solvent has a boiling point of preferably 150° C. or higher, more preferably 170° C. or higher. Examples thereof include polyhydric alcohols, aliphatic carboxylic acid esters, phosphoric acid esters, and hydrocarbons. Specific examples thereof include diethylene glycol, trimethylol propane, dibutyl phthalate, 2-ethylhexyl benzoate, and alkyl naphthalenes. Specifically, the high-boiling organic solvent may be the hydrophobic high-boiling organic solvent disclosed in JP-A No. 2001-335734, the disclosure of which is incorporated herein by reference. The organic solvent may be a liquid or a solid at room temperature, in accordance with the purpose.

Only a single high-boiling organic solvent may be used, or two or more high-boiling organic solvents may be used. The amount of the high-boiling organic solvent is preferably 0 to 20 wt %, more preferably 0 to 10 wt %.

The polymer described above which is optionally contained in the inkjet-recording ink composition may be used for adjustment of the polarity and the viscosity of the colored particles containing the monomer and the colorant, for improvement of the solubility of the colorant (in particular, oil-soluble dye), for adjustment of the adhesion of the ink composition to the record medium after polymerization curing, and for adjustment of the light fastness. The polymer is preferably a polymer superior in compatibility with the colorant and the monomer. The molecular weight of the polymer is preferably 50,000 or lower, more preferably 20,000 or lower. Examples of the polymer include vinyl polymers, polyurethanes, and polyesters. Specific examples thereof include polybutyl acrylate, poly(isobutyl methacrylate/hydroxyethyl acrylate) (copolymerization weight ratio: 95/5), poly(isopropyl acrylate/tetrahydrofurfuryl acrylate) (copolymerization weight ratio: 70/30), poly(butyl methacrylate/N-methoxymethylacrylamide) (copolymerization weight ratio: 80/20), and a polybutyl acrylate/polydimethylsiloxane block copolymer (copolymerization weight ratio: 90/10). Only a single polymer may be used, or two or more polymers may be used in combination. When a polymer is used, the amount of the polymer may be selected in consideration of the types and the amounts of the ethylenic unsaturated monomer and the colorant, and is preferably 0 to 40 wt %, more preferably 0 to 20 wt %.

The ink composition may further comprise a storage stabilizer. The storage stabilizer is an agent which suppresses undesirable polymerization during storage. Examples thereof include quaternary ammonium salts, hydroxyamines, cyclic amides, nitriles, substituted ureas, heterocyclic compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monobutylether, and copper naphthenate.

When a storage stabilizer is used, the amount of the storage stabilizer is preferably 0.005 to 1 wt %, more preferably 0.01 to 0.5 wt %, particularly preferably 0.01 to 0.2 wt %, based on the amount of the ethylenic unsaturated monomer.

The method of preparing the inkjet-recording ink composition according to the invention will be described below.

The inkjet-recording ink composition according to the invention may be a nonaqueous (oil-based) ink composition prepared by mixing the ethylenic unsaturated monomer, the colorant, the photopolymerization initiator, and other optional components by agitation. Alternatively, the inkjet-recording ink composition may be an aqueous (water-based) ink composition in which such lipophilic components are dispersed in an aqueous medium. The aqueous ink composition may be prepared by a method (emulsification method) of emulsifying the ethylenic unsaturated monomer and the like. In a preferable example of the emulsification method, the monomer and the like are emulsified by adding water to an organic solvent phase containing the monomer, the colorant and the photopolymerization initiator or by adding such an organic solvent phase to water, so that a colored particle dispersion containing finely dispersed colored particles is obtained.

The emulsifier for the emulsification may be a known machine whose examples include a simple stirrer, an impeller mixer, an in-line mixer, a mill such as a colloid mill, and an ultrasonic disperser. In the invention, a high-pressure emulsifier is preferable; and a high-pressure homogenizer is particularly preferable.

A detailed mechanism of the high-pressure homogenizer is described, for example, in U.S. Pat. No. 4,533,254 and JP-A No. 6-47264, the disclosures of which are incorporated herein by reference. As commercially available machines, Gaulin homogenizer (A.P.V Gaulin Inc.), Microfluidizer (Micorfluidex Inc.), Ultimizer (Sugino Machine Ltd.), and the like are available. A high-pressure homogenizer having a mechanism for atomizing in an ultrahigh-pressure jet stream has been recently developed, and is described, for example in U.S. Pat. No. 5,720,551, the disclosure of which is incorporated herein by reference. This high-pressure homogenizer is particularly effective for the emulsification in the invention. An example of the emulsifier employing the ultrahigh-pressure jet stream is DeBEE2000 (Bee International Ltd.).

The pressure during emulsification by a high-pressure emulsification machine is preferably 50 MPa or higher (500 bar or higher), more preferably 60 MPa or higher (600 bar or higher), still more preferably 180 MPa or higher (1,800 bar or higher). In the invention, combined use of two or more types of emulsification machines in the emulsification is particularly preferable; for example, emulsification by an agitating emulsifier may be followed by a processing in a high-pressure homogenizer. In an embodiment, emulsification is conducted by such an emulsification machine, then additives such as a wetting agent and a surfactant are added, then the ink composition is processed again by a high-pressure homogenizer while filling a cartridge with the processed ink composition.

If a low-boiling organic solvent is present together with the monomer during emulsification, it is preferable to substantially remove the low-boiling solvent, from the viewpoints of the emulsion stability, health and safety. For substantially removing the low-boiling organic solvent, an appropriate method may be selected from various known methods such as evaporation, vacuum evaporation, and ultrafiltration in accordance with the type of the low-boiling organic solvent. It is preferable to remove the low-boiling organic solvent as rapidly as possible immediately after emulsification.

During the emulsification, various surfactants may be used in addition to the above components. Preferable examples thereof include anionic surfactants such as a fatty acid salt, an alkyl sulfate ester salt, an alkylbenzenesulfonic acid salt, an alkylnaphthalenesulfonic acid salt, a dialkyl sulfosuccinic acid salt, an alkylphosphoric acid ester salt, a naphthalenesulfonic acid formalin condensate, and a polyoxyethylene alkyl sulfate ester salt; nonionic surfactants such as a polyoxyethylene alkylether, a polyoxyethylene alkylallylether, a polyoxyethylene fatty acid ester, a sorbitan fatty acid ester, a polyoxyethylene sorbitan fatty acid ester, a polyoxyethylene alkylamine, a glycerol fatty acid ester, and an oxyethylene oxypropylene block copolymer; an acetylene-based polyoxyethylene oxide surfactant, SURFYNOLS (Air Products & Chemicals); amine oxide-based amphoteric surfactants such as N,N-dimethyl-N-alkylamine oxide; and surfactants disclosed on pp. 37 and 38 of JP-A No. 59-157,636 and Research Disclosure No. 308119 (1989), the disclosures of which are incorporated herein by reference.

When an aqueous ink composition is prepared by emulsification, i.e., by dispersing colored particles (organic phase) containing the monomer, the colorant and the photopolymerization initiator in an aqueous medium, it is particularly important to control the particle size. For improving the color purity and the density of the image formed by inkjet-recording process, it is preferable to reduce the average particle diameter of the colored particles. Specifically, the volume-average particle diameter of the colored particles is preferably 1 nm to 300 nm, more preferably 2 nm to 200 nm, still more preferably 2 nm to 100 nm. Presence of bulky particles in the colored particles may lead to deterioration in printing performance. Bulky particles occasionally affect printing performance, for example by clogging the nozzle of the printer head, or by blemishing the nozzle, thereby causing ejection failure or uneven ejection of ink even if the nozzle is not completed clogged. Thus, the content of the bulky particles is preferably smaller. Specifically, when an ink is prepared, the number of particles of 5 μm or larger per 1 μl of ink is preferably 10 or less, and the number of particles of 1 μm or larger per 1 μl of ink is preferably 1,000 or less. A known method such as centrifugal separation or microfiltration may be used for removal of these bulky particles. The separation may be performed immediately after emulsification or immediately before filling the ink cartridge subsequent to addition of various additives such as a wetting agent and surfactant to the emulsion. Use of a mechanical emulsification machine is effective for reducing the average particle diameter of colored particles and decreasing the number of bulky particles.

In addition to the components above, the inkjet-recording ink composition according to the invention (particularly the aqueous ink composition) may further comprise the following additives in accordance with the necessity. The further additives may be added in such a range as not to impair the effects of the invention. Examples thereof include known additives such as an anti-drying agent, a penetration-accelerating agent, an ultraviolet absorbent, an oxidation inhibitor, a fungicide, a pH adjuster, a surface tension adjuster, an anti-foaming agent, a viscosity adjuster, a dispersant, a dispersion stabilizer, an antirust agent, and a chelating agent.

The anti-drying agent is preferably used for prevention of clogging caused by drying of ink compositions at the ink-ejecting outlet of the nozzle for use in inkjet-recording processes. The anti-drying agent is preferably a water-soluble organic solvent having a vapor pressure lower than that of water. Specific examples of the anti-drying agent include polyvalent alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylol propane; lower alkylethers of polyvalent alcohols such as ethylene glycol monomethyl ether, ethylene glycol monoethyl ether, diethyleneglycol monomethyl ether, diethyleneglycol monoethyl ether, triethylene glycol monoethyl ether, and triethylene glycol monobutyl ether; heterocyclic rings such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide, and 3-sulfolene; multifunctional compounds such as diacetone alcohol and diethanolamine; and urea derivatives. Among these compounds, polyvalent alcohols such as glycerol and diethyleneglycol are more preferable.

Only a single anti-drying agent may be used, or two or more anti-drying agents may be used in combination. The anti-drying agent is preferably contained in the inkjet-recording ink composition at a concentration of 10 to 50 wt %.

The penetration-accelerating agent is preferably used for improving penetration of the ink composition into paper. Examples of the penetration-accelerating agent include alcohols such as ethanol, i-propanol, butanol, di(tri)ethylene glycol monobutylether, and 1,2-hexanediol; sodium laurylsulfate; sodium oleate; and nonionic surfactants. The penetration-accelerating agent is used in such a range as not to cause the bleeding, penetration through paper (print through), or the like of the printed image. Usually, sufficient effects are achieved by use of a penetration-accelerating agent at a content of approximately 5 to 30 wt % in the inkjet-recording ink composition.

The ultraviolet absorbent may be used for improving the storability of the image. Examples thereof include the benzotriazole compounds such as described in JP-A Nos. 58-185677, 61-190537, 2-782, 5-197075, and 9-34057 (the disclosures of which are incorporated herein by reference); the benzophenone compounds such as described in JP-A Nos. 46-2784 and 5-194483, and U.S. Pat. No. 3,214,463 (the disclosures of which are incorporated herein by reference); the cinnamic acid compounds such as described in JP-B Nos. 48-30492 and 56-21141 and JP-A No. 10-88106 (the disclosures of which are incorporated herein by reference); the triazine compounds such as described in JP-A Nos. 4-298503, 8-53427, 8-239368, 10-182621, and 8-501291 (the disclosures of which are incorporated herein by reference); the compounds described in Research Disclosure No. 24239 (the disclosure of which is incorporated herein by reference); and compounds emitting fluorescence upon absorption of ultraviolet ray, i.e., so-called fluorescent brighteners such as stilbene and benzoxazole compounds.

The oxidation inhibitor is used for improving the storage life of the image. For examples, various organic anti-fading agents and metal complex anti-fading agents may be used as oxidation inhitibors. Examples of the organic anti-fading agent include hydroquinones, alkoxyphenols, dialkoxyphenols, phenols, anilines, amines, indanes, chromanes, alkoxyanilines, and heterocyclic rings. The metal complex anti-fading agent may be a nickel complex, a zinc complex, or the like. Specific examples of the metal complex anti-fading agent include the compounds described in the patents cited in Research Disclosure No. 17643 (section VII-I to J), ibid., No. 15162, ibid., No. 18716 (left column on p. 650), ibid., No. 36544 (p. 527), ibid., No. 307105 (p. 872), and ibid., No. 15162 (the disclosures of which are incorporated herein by reference); and the compounds within the scope of the Formula of typical compounds, and the exemplary compounds described in JP-A No. 62-215272, pp. 127 to 137, the disclosure of which is incorporated herein by reference.

Examples of the fungicide include sodium dehydroacetate, sodium benzoate, sodium pyridinethione-1-oxide, p-hydroxybenzoic acid ethylester, 1,2-benzisothiazolin-3-one, and salts thereof. The fungicide may be used preferably at a concentration of 0.02 to 1.00 wt % in the ink.

The surface tension adjuster is preferably a nonionic surfactant, a cationic surfactant, an anionic surfactant, or the like. The surface tension of the inkjet-recording ink composition according to the invention is preferably 25 to 70 mN/m and more preferably 25 to 60 mN/m.

The viscosity of the inkjet-recording ink composition according to the invention is preferably 30 mPa.s or lower and more preferably 10 mPa.s or lower.

The anti-forming agent may be a fluorine-based or silicone-based compound, a chelating agent such as EDTA, or the like in accordance with the necessity.

The pH adjuster may be used, for example, for pH adjustment and dispersion stabilization in the preparation of a colored particle dispersion by the emulsification method. The pH adjuster may be added in such an amount as to achieve a pH of 4.5 to 10.0, more preferably a pH of 6 to 10.0. An organic base, an inorganic alkali, or the like is preferable as the basic pH adjuster, and an organic acid, an inorganic acid, or the like is preferable as the acidic pH adjuster. Among the organic bases, triethanolamine, diethanolamine, N-methyldiethanolamine, dimethylethanolamine, and the like are more preferable. Among the inorganic alkalis, alkali metal hydroxides, carbonate salts, and ammonia are preferable as the basic pH adjuster. Among the alkali metal hydroxides, sodium hydroxide, lithium hydroxide, potassium hydroxide, and the like are particularly preferable. Among the carbonate salts, sodium carbonate, sodium hydrogen carbonate, and the like are particularly preferable. Further, among the organic acids, acetic acid, propionic acid, trifluoroacetic acid, alkylsulfuric acids, and the like are more preferable. Among the inorganic acids, hydrochloric acid, sulfuric acid, phosphoric acid, and the like are more preferable.

The inkjet-recording ink composition according to the invention may be favorably used as an ink for inkjet recording. The inkjet-recording process is not particularly limited, and may be, for example: an electric charge-control method of ejecting ink by electrostatic attraction; a drop-on-demand method (pressure pulse method) of using the vibrational pressure of a piezoelectric element; an acoustic inkjet method comprising converting electrical signals into acoustic beams, and irradiating the ink with the beams, thereby ejecting the ink by the generated radiation pressure; or a thermal inkjet method comprising forming air bubbles by heating ink and using the generated pressure for ejecting the ink. The inkjet-recording processes also include a process of ejecting many small-volume droplets of ink with a lower optical density (which is called photoink), a process of improving image quality by using multiple inks which have substantially the same hue and which have different optical density, and a process of using a colorless transparent ink.

Among the processes above, the ink composition according to the invention is suitable as the inkjet-recording inks for thermal inkjet method, piezoelectric inkjet method, electrolytic inkjet method, acoustic inkjet method, and the like.

<Image-Forming Process>

The image-forming process according to the invention comprises recording an image on a record medium by using the inkjet-recording ink composition of the invention described above and curing the recorded image by irradiation with a visible to near-infrared light. In the invention, it is possible to use a visible to near-infrared light in exposure. After recording an image on a record medium, the image fastness can be improved effectively through polymerization curing of the ethylenic unsaturated monomer by irradiation of the recorded image with the visible to near-infrared light.

The image recording is preferably conducted by an inkjet-recording process in an inkjet printer. In the inkjet-recording process, an image is recorded on a record medium by using the inkjet-recording ink composition of the invention. The ink-ejecting nozzle and the like used in the inkjet-recording process are not particularly limited and may be selected appropriately in accordance with the purpose. The inkjet-recording process is not particularly limited, and may be as described above.

Polymerization-curing of the image is facilitated by using a light source emitting a light having the wavelength range corresponding to the sensitive wavelength of the photopolymerization initiator. Specifically, the exposure is preferably carried out by using a light source emitting a light in the wavelength range of 400 to 1,200 nm such as a fluorescent lamp, an LD, or an LED. The exposure time and the light intensity may be appropriately selected in accordance with the extent of the polymerization curing of the ethylenic unsaturated monomer, and the exposure time is generally about 30 seconds.

[Record Medium]

The record medium is not particularly limited, and may be a known record medium such as plain paper, resin coated paper, paper exclusively for inkjet-recording paper, a film, a multi-use paper adapted also for electrophotography, cloth, glass, metal, or ceramics. Among them, paper exclusively for inkjet-recording is preferable; and the paper is more preferably selected from papers described in, for example, JP-A No 8-169172, 8-27693, 2-276670, 7-276789, 9-323475, 62-238783, 10-153989, 10-217473, 10-235995, 10-337947, 10-217597, and 10-337947, the disclosures of which are incorporated herein by reference.

In the invention, among the record media above, the following recording paper and film are particularly preferable. The recording paper and film each have a substrate and an ink-receiving layer formed thereon and optionally having other layers such as a backcoat layer. Each of the layers including the ink-receiving layer may be a monolayer or a multi-layer.

Examples of the support include: papers produced by a machine such as a Fourdrinier machine or a cylinder paper machine from chemical pulps such as LBKP and NBKP, mechanical pulps such as GP, PGW, RMP, TMP, CTMP, CMP, and CGP, used paper pulps such as DIP and the like which are optionally provided with additives such as conventional pigments, binders, sizing agents, fixing agents, cationic agents, and paper-strength additive; synthetic papers, and plastic film sheets.

The thickness of the support is preferably, approximately 10 to 250 μm, and the basic weight thereof is preferably 10 to 250 g/m².

The ink receiving layer and the backcoat layer may be formed on the support after a size press is conducted with starch, polyvinylalcohol, or the like or after an anchor coat layer is formed with starch, polyvinylalcohol, or the like. In addition, the support may be flattened by a calendering machine such as a machine calender, a TG calender, or a soft calender.

Among the supports above, paper whose both surfaces are laminated with polyolefin (e.g., polyethylene, polystyrene, polyethylene terephthalate, polybutene, and copolymers thereof, etc.), and a plastic film sheet are preferable. It is more preferable to add a white pigment (e.g., titanium oxide, zinc oxide, etc.) or a coloring dye (e.g., cobalt blue, ultramarine, neodymium oxide, etc.) to the polyolefin.

The ink-receiving layer may further comprise other additives such as a pigment, an aqueous binder, a mordant, a water-resistance imparting agent, a light fastness improver, and a surfactant.

The pigment is preferably a white pigment, and preferable examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrene-based pigments, acrylic pigments, urea resins, and melamine resins. Among these white pigments, porous inorganic pigments are preferable, and synthetic amorphous silica and the like with a larger pore area are more preferable. The synthetic amorphous silica may be an anhydrous silicic acid prepared by a dry method or a hydrous silicic acid prepared by a wet method, preferably a hydrous silicic acid.

Examples of the aqueous binder include water-soluble polymers such as polyvinylalcohol, silanol-modified polyvinylalcohols, starch, cationized starches, casein, gelatin, carboxymethylcellulose, hydroxyethylcellulose, polyvinylpyrrolidone, polyalkyleneoxides, and polyalkyleneoxide derivatives; and water-dispersible polymers such as styrene butadiene latex and acrylic emulsion. Only a single aqueous binder may be used, or two or more aqueous binders may be used in combination. Among them, polyvinylalcohol and silanol-modified polyvinylalcohols are preferable from the points of adhesiveness to the pigment and the prevention of peeling of the ink-receiving layer.

The mordant is preferably immobilized; therefore, a polymer mordant is preferable. Polymer mordants are described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236; and U.S. Pat. Nos. 2,484,430, 2,548,564, 3,148,061, 3,309,690, 4,115,124, 4,124,386, 4,193,800, 4,273,853, 4,282,305, and 4,450,224, the disclosures of which are incorporated herein by reference. The polymer mordants described on pp. 212 to 215 of JP-A No. 1-161236 are particularly preferable. Use of a polymer mordant described therein makes it possible to obtain an image with high quality and improved light fastness.

The water-resistance imparting agent, which is effective in improving the water resistance of images, is preferably a cationic resin. Examples of the cationic resin include polyamide polyamine epichlorohydrin, polyethyleneimine, polyamine sulfone, dimethyldiallylammonium chloride polymer, cationic polyacrylamide, and colloidal silica. Among them, polyamide polyamine epichlorohydrin is particularly preferable. The content of the cationic resin is preferably 1 to 15 wt %, more preferably 3 to 10 wt %, based on the total solid content in the ink receiving layer.

Examples of the light fastness improvers include zinc sulfate, zinc oxide, hindered amine oxidation inhibitor, benzophenone-based ultraviolet absorbents, and benzotriazole-based ultraviolet absorbents. Among them, zinc sulfate is particularly preferable.

The surfactant functions as a coating aid, a releasability improver, a sliding property improver, or an antistatic agent. Examples of the surfactant include surfactants described in JP-A Nos. 62-173463 and 62-183457. An organic fluorochemical compound may be used instead of the surfactant. The organic fluorochemical compound is preferably hydrophobic. Examples of the organic fluorochemical compound include fluorochemical surfactants, oily fluorochemical compounds (e.g., fluorochemical oils, etc.), and solid fluorochemical resins (e.g., ethylene tetrafluoride resin, etc.). Organic fluorochemical compounds are described in JP-B No. 57-9053 (columns 8 to 17) and JP-A Nos. 61-20994 and 62-135826, the disclosures of which are incorporated herein by reference.

Examples of other additives include a pigment dispersing agent, a thickener, an antifoaming agent, a dye, a fluorescent brightener, an antiseptic, a pH adjuster, a matting agent, and a film-hardening agent.

In addition, the backcoat layer may comprise a white pigment, an aqueous binder, and other components. Examples of the white pigment include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous soil, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, and magnesium hydroxide; and organic pigments such as styrene-based plastic pigments, acrylic plastic pigments, polyethylene, microcapsules, urea resins, and melamine resins.

Examples of the aqueous binder in the backcoat layer include water-soluble polymers such as styrene-maleic acid salt copolymers, styrene-acrylic acid salt copolymers, polyvinylalcohol, silanol-modified polyvinylalcohols, starch, cationized starches, casein, gelatin, carboxymethylcellulose, hydroxyethylcellulose, and polyvinylpyrrolidone; and water-dispersible polymers such as styrene butadiene latex and acrylic emulsion. Examples of other components in the backcoat layer include an antifoaming agent, a foaming inhibitor, a dye, a fluorescent brightener, an antiseptic, and a water-resistance imparting agent.

The layers (including the backcoat layer) on the recording paper or on the recording film may comprise a polymer latex. The polymer latex is used for improvement of the physical properties of films, more specifically for improvement of the dimensional stability and for prevention of the curl, adhesion, and cracking of films. Polymer latexes are described in JP-A Nos. 62-245258, 62-136648, and 62-110066, the disclosures of which are incorporated herein by reference. Addition of a polymer latex having a lower glass transition temperature (40° C. or lower) to a layer containing the mordant leads to prevention of the cracking and curl of the layer. Alternatively, addition of a polymer latex having a high glass transition temperature to the backcoat layer leads to prevention of the curl.

In the image-forming process according to the invention, the record medium is not particularly limited. It is preferable to use a record medium having an ink-receiving layer containing a white pigment (porous inorganic pigment) on a substrate, for forming a high-quality image. When the record medium has an ink-receiving layer containing a porous inorganic pigment such as a white pigment, many conventional dispersion inks do not penetrate into the record medium well, whereby there is a problem that the pigment particles are separated from the surface upon rubbing of the formed image with a finger. The inkjet-recording ink composition according to the invention (e.g., colored particle dispersion), which comprises an ethylenic unsaturated monomer, a colorant, and a photopolymerization initiator, is oily and has a lower viscosity, thereby not having such a problem. The inkjet-recording ink composition of the invention is superior in penetration property and in the ejection stability of ejection nozzles during printing. In addition, because the ethylenic unsaturated monomer is polymerized by exposure after printing, the colored particles change to the colored particles comprising a colorant and a polymer, thereby improving the image fastness, in particular, improving the light fastness, the ozone resistance, and the abrasion resistance of the images. Accordingly, the image recording by using the inkjet-recording ink composition according to the invention provides a high-quality, high-strength image with superior image fastness.

EXAMPLES

Hereinafter, the invention will be described with reference to Examples, but it should be understood that the invention is not restricted by these Examples. Inkjet-recording inks are prepared as examples of the ink compositions; and the terms "part" and "%" used in Examples and Comparative Examples are based on weight, unless specified otherwise.

Example 1

A nonaqueous magenta inkjet-recording ink 101 according to the invention was prepared by blending the following components.

| Composition | |
|---|---|
| n-butyl acrylate and t-butylacrylamide [ratio = 50:50; monomers (raw materials for exemplary polymer PA-11)] | 3.0 g |
| DPCA60 (manufactured by Nippon Kayaku Co., Ltd.) | 1.0 g |
| 1,6-Hexanediol diacrylate (HDDA, manufactured by Daicel-UCB Co., Ltd.) | 16.0 g |
| N-Ethyldiethanolamine | 0.6 g |
| Photopolymerization initiator having the following Composition | |
| Exemplary organic dye 1-16 | 0.2 g |
| Exemplary organic boron compound A-12 | 0.15 g |

-continued

| | |
|---|---|
| Following oil-soluble dye M-1 | 0.8 g |

Oil-soluble dye M-1

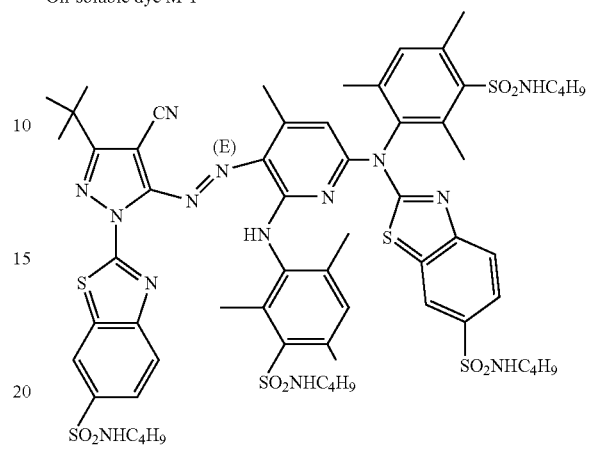

Oxidation potential $E_{ox}$ = 1.3 V

Examples 2 to 8 and Comparative Examples 1 to 4

Nonaqueous magenta inkjet-recording inks 102 to 108 according to the invention and comparative nonaqueous magenta inkjet-recording inks 109 to 112 were each prepared in the same manner as in Example 1, except that the oil-soluble dye, the types of the monomers (raw materials for the polymer) and the photopolymerization initiator, and the ratio of the photopolymerization initiator to the monomer were changed as shown in Table 1 below.

The oxygen permeability coefficients of the polymers obtained by polymerization (see the following Table 1) were determined in the same manner as in the case of the exemplary polymer PA-1 (Synthesis Example 1).

TABLE 1

| | Ink No. | Oil-soluble dye | Monomer[*1] | Photopolymerization initiator[*2] (organic dye-organic boron compound) | Ratio of (photopolymerization initiator/monomer) | Polymer formed by polymerization | Oxygen permeability coefficient [m³(STP)·m/ (s·m²·kPa)] |
|---|---|---|---|---|---|---|---|
| Example 1 | 101 | M-1 | n-Butyl acrylate/t-butylacrylamide (=50/50) | (1-16)-(A-12) | 1% | PA-11 | $0.16 \times 10^{-13}$ |
| Example 2 | 102 | M-1 | n-Butyl acrylate/t-butylacrylamide (=50/50) | (1-16)-(A-12) + following azide compound | 1% | PA-11 | $0.16 \times 10^{-13}$ |
| Example 3 | 103 | Y-1 | n-Butyl acrylate/t-butylacrylamide (=50/50) | (3-15)-(A-12) | 1% | PA-11 | $0.16 \times 10^{-13}$ |
| Example 4 | 104 | C-1 | n-Butyl acrylate/t-butylacrylamide (=50/50) | (1-12)-(A-12) | 0.5% | PA-11 | $1.05 \times 10^{-13}$ |
| Example 5 | 105 | C-1 | n-Butyl acrylate/t-butylacrylamide (=50/50) | (1-12)-(A-12) + following azide compound | 0.5% | PA-11 | $1.05 \times 10^{-13}$ |
| Example 6 | 106 | M-1 | n-Butyl acrylate/t-butylacrylamide (=50/50) | Following compound (26) | 1% | PA-11 | $0.16 \times 10^{-13}$ |
| Example 7 | 107 | C-1 | n-Butyl acrylate/t-butylacrylamide (=50/50) | Following compound (27) | 0.5% | PA-11 | $0.16 \times 10^{-13}$ |
| Example 8 | 108 | M-1 | n-Butyl acrylate | (1-16)-(A-12) | 1% | n-Butyl acrylate polymer | $2.96 \times 10^{-13}$ |
| Comparative Example 1 | 109 | M-1 | n-Butyl acrylate/t-butylacrylamide (=50/50) | — | — | — | — |
| Comparative Example 2 | 110 | M-1 | n-Butyl acrylate/t-butylacrylamide (=50/50) | Irgacure-1870[*3] | 5% | PA-11 | $0.16 \times 10^{-13}$ |
| Comparative | 111 | Y-1 | n-Butyl acrylate/ | Irgacure-1870[*3] | 5% | PA-11 | $0.16 \times 10^{-13}$ |

TABLE 1-continued

| Ink No. | Oil-soluble dye | Monomer(*1) | Photopolymerization initiator(*2) (organic dye-organic boron compound) | Ratio of (photopoly- merization initiator/ monomer) | Polymer formed by polymerization | Oxygen permeability coefficient [m³(STP) · m/ (s · m² · kPa)] |
|---|---|---|---|---|---|---|
| Example 3 |  | t-butylacrylamide (50/50) |  |  |  |  |
| Comparative Example 4 | 112 | C-1 | n-Butyl acrylate/ t-butylacrylamide (50/50) | Irgacure-1870(*3) | 10% | PA-11 | 0.16 × 10⁻¹³ |

(*1)Raw material for polymer excluding DPCA60 and HDDA
(*2)The numbers shown in boxes for Examples represent the exemplary compounds shown above with the numbers.
(*3)Irgacure-1870: Mixture of [bis(2,6-dimethoxybenzoyl)-2,4,4-trimethyl-pentylphosphine oxide] and 1-hydroxy-cyclohexyl-phenyl-ketone [70/30]

Oil-soluble dye Y-1

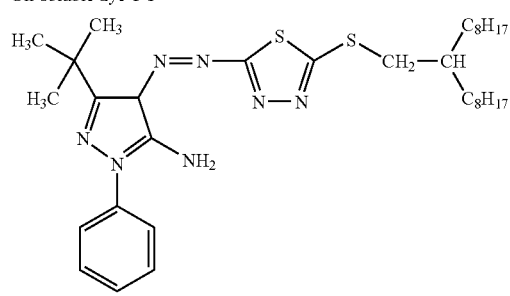

Oxidation potential $E_{ox}$: 1.1 V

Oil-soluble dye C-1

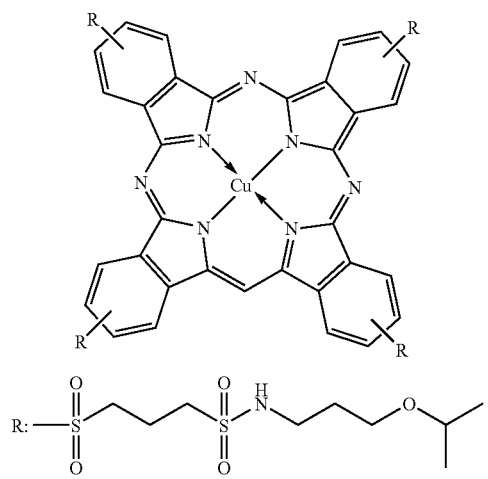

Oxidation potential $E_{ox}$: 1.27 V (26)

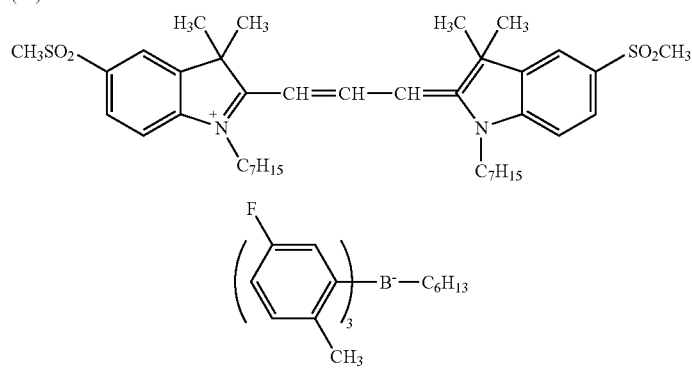

(27)

TABLE 1-continued

| | | | | Ratio of | | Oxygen |
| | | | Photopolymerization initiator[*2] | (photopoly- | Polymer formed | permeability |
| Ink | Oil-soluble | | (organic dye-organic boron | merization | by | coefficient |
| No. | dye | Monomer[*1] | compound) | initiator/monomer) | polymerization | [m³(STP) · m/(s · m² · kPa)] |

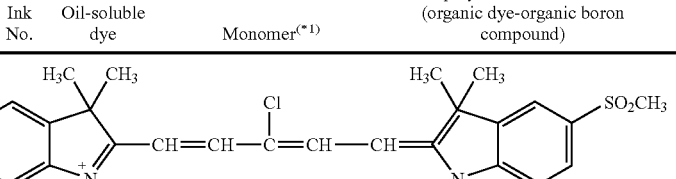

Azide compound (auxiliary agent)

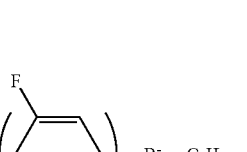

(Evaluation 1)

Each of the nonaqueous magenta inkjet-recording inks 101 to 112 thus obtained was filled into a cartridge of an inkjet printer (experimental machine, manufactured by Microjet Ltd.) one by one; an image was recorded on art paper to give a density (OD) of 1.0 by using the same machine (printing density: 300 dpi; ejection frequency: 4 KHz; and number of nozzles: 64); and then, the recorded image was exposed on a 38,000-lux fluorescent lamp irradiator for 30 seconds. The image after exposure was subjected to the following evaluations. The evaluation results are summarized in Table 2 below.

1. Evaluation of Printing Performance

Each cartridge was set in the printer and ejection of the ink from all nozzles was confirmed. Then, images were formed on ten A4 sheets. The unevenness of the printed images was evaluated according to the following evaluation criteria:

Evaluation Criteria

A: No unevenness of printed image is observed throughout printing

B: Unevenness of printed image is observed occasionally during printing

C: Unevenness of printed image is observed throughout printing

2. Evaluation of Stickiness

The stickiness of the printed face was evaluated sensory with a finger and divided into three ranks: A represents a printed face without stickiness; B represents a printed face with slight stickiness; and C represents a printed face with remarkable stickiness.

3. Evaluation of Abrasion Resistance

An image was formed on art paper and subjected to exposure. Thirty minutes after the exposure, the art paper was rubbed with an eraser for 10 strokes, and the change in the image density of the printed area was observed. The results were classified into three ranks: A represents no decrease in density; B represents slight decrease in density; and C represents remarkable decrease in density.

4. Evaluation of Light Fastness

The density ($D^1$) of the recorded image on each art paper was measured by using a reflection densitometer (X-RITE 310 TR, manufactured by X-Rite), and then, the art paper was irradiated with a xenon light (85,000 lux) emitted from a weather meter (Atlas CI65) for 4 days, and the image density ($D^2$) after irradiation was measured in the same manner as described above. A dye residual ratio (%; $D^2/D^1 \times 100$) was calculated from the measured densities $D^1$ and $D^2$ and used as an indicator of the light fastness. In the measurement, the reflection density $D^1$ before irradiation was set at 1.0. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

5. Evaluation of Ozone Resistance

The density of a recorded image ($D^3$) on each art paper was measured by using a reflection densitometer (X-RITE 3101TR, manufactured by X-Rite), and then, after the art paper was stored under the condition at an ozone concentration of 5.0 ppm for 3 days, the density of the image after storage ($D^4$) was measured in the same manner as described above. A dye residual ratio (%; $D^4/D^3 \times 100$) was calculated from the measured densities $D^3$ and $D^4$, and used as an indicator of ozone resistance. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

TABLE 2

| | Ink No. | Printing performance | Stickiness | Abrasion resistance | Light fastness | Ozone resistance |
|---|---|---|---|---|---|---|
| Example 1 | 101 | A | A | A | A | A |
| Example 2 | 102 | A | A | A | A | A |
| Example 3 | 103 | A | A | A | A | A |
| Example 4 | 104 | A | A | A | A | A |
| Example 5 | 105 | A | A | A | A | A |
| Example 6 | 106 | A | A | A | A | A |
| Example 7 | 107 | A | A | A | A | A |
| Example 8 | 108 | A | A | A | B | B |
| Comparative Example 1 | 109 | A | D | D | D | D |
| Comparative Example 2 | 110 | A | D | D | D | D |
| Comparative Example 3 | 111 | A | D | D | D | D |
| Comparative Example 4 | 112 | A | C | D | C | C |

As shown in Table 2, the nonaqueous magenta inkjet-recording inks of Examples polymerized efficiently and rapidly under the visible light irradiation condition and exhibited superior printing performance even though the content of the photopolymerization initiator is low. Accordingly, the nonaqueous magenta inkjet-recording inks of Examples gave images which were free of stickiness and which had superior abrasion resistance, light fastness, and ozone resistance. This is because the nonaqueous magenta inkjet-recording inks of Examples were prepared such that the inks were able to polymerize and cure easily by irradiation with visible light. The ink composition giving a polymer having an oxygen permeability coefficient of more than $2.6 \times 10^{-13}$ [$m^3$(STP)·m/(s·$m^2$·kPa)] (Example 8) cured rapidly, but gave an image slightly inferior to images of other Examples with respect to the light fastness and ozone resistance after recording. On the other hand, in Comparative Examples, the photopolymerization initiator sensitive to visible light was not used. In Comparative Examples 2 to 4, a UV-sensitive polymerization initiator Irgacure-1870 was used instead. In Comparative Examples, the polymerization curing by visible light was insufficient, and the abrasion resistance, light fastness, and ozone resistance of the printed images were hardly improved by exposure with visible light.

Example 9

4 g of a mixture of n-butyl acrylate and t-butylacrylamide [ratio: 50:50; monomers (raw materials for exemplary polymer PA-11)], 0.45 g of the oil-soluble dye M-1 shown above, 0.04 g of N-ethyldiethanolamine, and a photopolymerization initiator consisting of 0.04 g of the exemplary organic dye 1-16 and 0.03 g of the exemplary organic boron compound A-12, were mixed and dissolved in 17 g of ethyl acetate, to give an ethyl acetate solution. Separately, a liquid mixture of 18 g of water and 0.4 g of EMAL 20 C (manufactured by Kao Corporation) was prepared. The liquid mixture was combined with the ethyl acetate solution, and the resulting mixture was treated by five cycles of: emulsification in a homogenizer at a frequency of 10,000 rpm/min for 4 minutes and standing-still for 1 minute. Then, the mixture was condensed at 30° C. under reduced pressure, to give a colored particle dispersion having a solid content of 25.2%. The volume-average particle size of the colored particles in the colored particle dispersion was 88 nm.

Subsequently, the colored particle dispersion thus obtained and the following substances were mixed, filtered through a 0.45-μm filter, to give a water-based magenta ink 201 for inkjet recording.

| | |
|---|---|
| Colored particle dispersion | 60 parts |
| Diethyleneglycol | 5 parts |
| Glycerol | 15 parts |
| Diethanolamine | 1 part |
| OLFINE E1010 (surfactant, manufactured by Nisshin Chemical Industry Co., Ltd) | 1.1 parts |
| Water | such an amount as to make the total amount of the mixture 100 parts |

Examples 10 to 16 and Comparative Examples 5 to 8

Water-based magenta inkjet-recording inks 202 to 208 according to the invention and comparative water-based magenta inkjet-recording inks 209 to 212 were prepared in the same manner as in Example 9, except that the types of the oil-soluble dye, the raw materials (monomers) for the polymer, and the photopolymerization initiator, and the ratio of the photopolymerization initiator to the monomer, were changed as shown in Table 3 below.

In Examples 9 to 16 and Comparative Examples 5 to 8, the photopolymerization initiator was used in an amount of 10% (weight ratio) or lower based on the amount of the ethylenic unsaturated monomer. In addition, in the finally obtained water-based inkjet-recording inks 201 to 212, the concentrations of diethyleneglycol, glycerol, and other additives were the same.

The oxygen permeability coefficient of the polymer obtained by polymerization (see the following Table 3) was measured in the same manner as in the case of the exemplary polymer PA-1 described above (Synthesis Example 1).

TABLE 3

| | Ink No. | Oil-soluble dye | Monomer[*1] | Photopolymerization initiator[*2] (organic dye/organic boron compound) | Ratio of (photo-polymerization initiator/ monomeric) | Polymer after polymerization | Oxygen permeability coefficient [$m^3(STP) \cdot m/(s \cdot m^2 \cdot kPa)$] | Particle size (nm) |
|---|---|---|---|---|---|---|---|---|
| Example 9 | 201 | M-1 | n-Butyl acrylate/t-butylacrylamide (=50/50) | (1-16)-(A-12) | 1% | PA-11 | $0.16 \times 10^{-13}$ | 88 |
| Example 10 | 202 | M-1 | n-Butyl acrylate/t-butylacrylamide (=50/50) | (1-16)-(A-12) + azide compound shown above | 1% | PA-11 | $0.16 \times 10^{-13}$ | 62 |
| Example 11 | 203 | Y-1 | n-Butyl acrylate/t-butylacrylamide (=50/50) | (3-15)-(A-12) | 1% | PA-11 | $0.16 \times 10^{-13}$ | 66 |
| Example 12 | 204 | C-1 | n-Butyl acrylate/t-butylacrylamide (=50/50) | (1-12)-(A-12) | 0.5% | PA-11 | $0.16 \times 10^{-13}$ | 78 |
| Example 13 | 205 | C-1 | n-Butyl acrylate/t-butylacrylamide (=50/50) | (1-12)-(A-12) + azide compound shown above | 0.5% | PA-11 | $0.16 \times 10^{-13}$ | 95 |
| Example 14 | 206 | M-1 | n-Butyl acrylate/t-butylacrylamide (=50/50) | Compound above (26) | 1% | PA-11 | $0.16 \times 10^{-13}$ | 81 |
| Example 15 | 207 | C-1 | n-Butyl acrylate/t-butylacrylamide (=50/50) | Compound above (27) | 0.5% | PA-11 | $0.16 \times 10^{-13}$ | 74 |
| Example 16 | 208 | M-1 | n-Butyl acrylate | (1-16)-(A-12) | 1% | n-Butyl acrylate polymer | $2.96 \times 10^{-13}$ | 74 |
| Comparative Example 5 | 209 | M-1 | n-Butyl acrylate/t-butylacrylamide (=50/50) | — | — | — | — | 62 |
| Comparative Example 6 | 210 | M-1 | n-Butyl acrylate/t-butylacrylamide (=50/50) | Irgacure-1870[*3] | 5% | PA-11 | $0.16 \times 10^{-13}$ | 59 |
| Comparative Example 7 | 211 | Y-1 | n-Butyl acrylate/t-butylacrylamide (=50/50) | Irgacure-1870[*3] | 5% | PA-11 | $0.16 \times 10^{-13}$ | 84 |
| Comparative Example 8 | 212 | C-1 | n-Butyl acrylate/t-butylacrylamide (=50/50) | Irgacure-1870[*3] | 10% | PA-11 | $0.16 \times 10^{-13}$ | 96 |

[*1]Raw material for polymer excluding DPCA60 and HDDA
[*2]The numbers shown in boxes for Examples represent the exemplary compounds shown above with the numbers.
[*3]Irgacure-1870: Mixture of [bis(2,6-dimethoxybenzoyl)-2,4,4-trimethyl-pentylphosphine oxide] and 1-hydroxy-cyclohexyl-phenyl-ketone [70/30]

(Evaluation 2)

Each of the water-based magenta inkjet-recording inks 201 to 212 thus obtained was filled into a cartridge of an inkjet printer PX-V700 (manufactured by Seiko Epson Corporation) one by one. Then, an image was recorded on inkjet photograde glossy papers "GASAI" (manufactured by Fuji Photo Film Co. Ltd.) by using the same machine and was subjected to exposure on a 38,000-lux fluorescent lamp irradiator for 30 seconds. Then, the recorded image was evaluated as described below. The results are summarized in the following Table 4.

1. Evaluation of Printing Performance

Each cartridge was set in the printer and ejection of the ink from all the nozzles was confirmed. Then, images were formed on ten A4 sheets. The unevenness of the printed images was evaluated according to the following evaluation criteria:

Evaluation Criteria

A: No unevenness of printed image is observed throughout printing
B: Unevenness of printed image is observed occasionally during printing
C: Unevenness of printed image is observed throughout printing 2. Evaluation of Stickiness The stickiness of the printed face was evaluated sensory with a finger and divided into three ranks: A (favorable) represents a printed face without stickiness; B (allowable) represents a printed face with slight stickiness; and C (defective) represents a printed face with remarkable stickiness.

3. Evaluation of Abrasion Resistance

An image was formed on an art paper and subjected to exposure. Thirty minutes after the exposure, the art paper was rubbed with an eraser for 10 strokes, and the change in the image density of the printed area was observed. The results were classified into three ranks: A (favorable) represents no decrease in density; B (allowable) represents slight decrease in density; and C (defective) represents remarkable decrease in density.

4. Evaluation of Light Fastness

The density ($D^5$) of a recorded image on each photographic glossy paper was measured by using a reflection densitometer (X-RITE 310 TR, manufactured by X-Rite), and then, the photographic paper was irradiated through a TAC filter with a xenon light (85,000 lux) from a weather meter (Atlas CI65) for 7 days and the image density ($D^6$) after irradiation was measured in the same manner as described above. A dye residual ratio (%; $D^6/D^5 \times 100$) was calculated from the measured densities $D^5$ and $D^6$ and used as an indicator of the light fastness. In the measurement, the reflection density $D^5$ before irradiation was set at 1.0. The results were classified into three ranks: A indicates that the dye residual ratio is 85% or higher; B indicates that the dye residual ratio is 70% or higher but lower than 85%; and C indicates that the dye residual ratio is lower than 70%.

5. Evaluation of Ozone Resistance

The density of a recorded image ($D^7$) on each photographic glossy paper was determined by using a reflection densitometer (X-Rite 310 TR, manufactured by X-Rite), and then, the photographic glossy paper was stored under the condition at an ozone concentration of 5.0 ppm for 3 days. The density of the image after storage ($D^8$) was measured in the same manner as described above. A dye residual ratio (%; $D^8/D^7 \times 100$) was calculated from the measured densities $D^7$ and D and used as an indicator of ozone resistance. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

TABLE 4

| | Ink No. | Printing performance | Stickiness | Abrasion resistance | Light fastness | Ozone resistance |
|---|---|---|---|---|---|---|
| Example 9 | 201 | A | A | A | A | A |
| Example 10 | 202 | A | A | A | A | A |
| Example 11 | 203 | A | A | A | A | A |
| Example 12 | 204 | A | A | A | A | A |
| Example 13 | 205 | A | A | A | A | A |
| Example 14 | 206 | A | A | A | A | A |
| Example 15 | 207 | A | A | A | A | A |
| Example 16 | 208 | A | A | A | B | B |
| Comparative Example 5 | 209 | A | C | C | D | D |
| Comparative Example 6 | 210 | A | A | C | C | D |
| Comparative Example 7 | 211 | A | A | C | D | D |
| Comparative Example 8 | 212 | A | A | C | C | C |

As shown in Table 4, the aqueous magenta inkjet-recording inks of Examples polymerized efficiently and rapidly under the visible light irradiation condition and exhibited superior printing performance even though the content of the photopolymerization initiator is low. Accordingly, the aqueous magenta inkjet-recording inks of Examples gave images which were free of stickiness and which had superior abrasion resistance, light fastness, and ozone resistance. This is because the aqueous magenta inkjet-recording inks of Examples were prepared such that the inks were able to polymerize and cure easily by irradiation with visible light. The ink composition giving a polymer having an oxygen permeability coefficient of more than $2.6 \times 10^{-13}$ [$m^3$(STP)·m/(s·$m^2$·kPa)] (Example 16) cured rapidly, but gave an image slightly inferior to images of other Examples with respect to the light fastness and ozone resistance after recording. On the other hand, in Comparative Examples, the polymerization initiator sensitive to visible light was not used. In Comparative Examples 6 to 8, a UV-sensitive polymerization initiator Irgacure-1870 was used instead. In Comparative Examples, the polymerization curing by visible light was insufficient, and the abrasion resistance, light fastness, and ozone resistance of the printed images were hardly improved by exposure with visible light.

Example 17

Preparation of Nonaqueous Inkjet-Recording Ink Composition

<Preparation of nonaqueous magenta inkjet-recording ink 301>

| | |
|---|---|
| Monomers: n-Butyl acrylate/t-butylacrylamide: 50/50 (raw materials for PA-11 polymer) | 3.0 g |
| Monomer: DPCA60 (manufactured by Nippon Kayaku) | 1.0 g |
| Monomer: 1,6-Hexanediol diacrylate (HDDA, manufactured by Daicel-UCB Co., Ltd.) | 16.0 g |
| N-Ethyldiethanolamine | 0.6 g |
| Photopolymerization initiator: | |
| Organic dye 1-11 | 0.2 g |
| Organic boron compound A-12 | 0.15 g |
| Colorant: M-1 | 0.8 g |

The above components were blended, to give a magenta ink 301.

Examples 17 to 27 and Comparative Examples 9 to 13

<Preparation of Nonaqueous Inkjet-Recording Inks 302 to 316>

Nonaqueous inkjet-recording inks 302 to 311 according to the invention and nonaqueous inkjet-recording inks of Comparative Examples 312 to 316, were prepared in the same manner as the preparation of the magenta ink 301, except that the types of the oil-soluble dye, the monomers and the initiator and the amount of the initiator used were changed as shown in Table 5 below.

TABLE 5

| | Ink No. | Oil-soluble dye | Monomer (excluding DPCA60 and HDDA) | Initiator (organic dye-organic boron compound) | Ratio of (Initiator/monomer) | Polymer obtained by polymerization | Oxygen permeability coefficient of formed polymer [$m^3$(STP)·m/(s·$m^2$·kPa)] | Note |
|---|---|---|---|---|---|---|---|---|
| Example 17 | 301 | M-1 | n-Butyl acrylate and t-butylacrylamide: 50/50 | (1-11)-(A-12) | 1 wt % | PA-11 | $0.16 \times 10^{-13}$ | Inventive example |
| Example 18 | 302 | M-1 | n-Butyl acrylate and t-butylacrylamide: 50/50 | (1-11)-(A-12) | 0.5 wt % | PA-11 | $0.16 \times 10^{-13}$ | Inventive example |
| Example 19 | 303 | M-1 | n-Butyl acrylate and t-butylacrylamide: 50/50 | (1-16)-(A-12) | 0.5 wt % | PA-11 | $0.16 \times 10^{-13}$ | Inventive example |
| Example 20 | 304 | Y-1 | n-Butyl acrylate and t-butylacrylamide: 50/50 | (3-15)-(A-12) | 0.1 wt % | PA-11 | $0.16 \times 10^{-13}$ | Inventive example |
| Example 21 | 305 | M-1 | n-Butyl acrylate and t-butylacrylamide: 50/50 | (1-11)-(A-12) + azide compound | 0.1 wt % | PA-11 | $0.16 \times 10^{-13}$ | Inventive example |
| Example 22 | 306 | M-1 | n-Butyl acrylate and t-butylacrylamide: 50/50 | (1-16)-(A-12) | 0.1 wt % | PA-11 | $0.16 \times 10^{-13}$ | Inventive example |
| Example 23 | 307 | M-1 | n-Butyl acrylate and t-butylacrylamide: 50/50 | (1-20)-(A-12) | 0.1 wt % | PA-11 | $0.16 \times 10^{-13}$ | Inventive example |

TABLE 5-continued

| | Ink No. | Oil-soluble dye | Monomer (excluding DPCA60 and HDDA) | Initiator (organic dye-organic boron compound) | Ratio of (Initiator/monomer) | Polymer obtained by polymerization | Oxygen permeability coefficient of formed polymer [m³(STP) · m/(s · m² · kPa)] | Note |
|---|---|---|---|---|---|---|---|---|
| Example 24 | 308 | Y-1 | n-Butyl acrylate and t-butylacrylamide: 50/50 | (1-16)-(A-12) | 0.1 wt % | PA-11 | 0.16 × 10⁻¹³ | Inventive example |
| Example 25 | 309 | C-1 | n-Butyl acrylate and t-butylacrylamide: 50/50 | (1-19)-(A-12) | 0.1 wt % | PA-11 | 0.16 × 10⁻¹³ | Inventive example |
| Example 26 | 310 | C-1 | n-Butyl acrylate and t-butylacrylamide: 50/50 | (1-20)-(A-12) | 0.1 wt % | PA-11 | 0.16 × 10⁻¹³ | Inventive example |
| Example 27 | 311 | C-1 | n-Butyl acrylate and t-butylacrylamide: 50/50 | (1-20)-(A-12) + azide compound | 0.1 wt % | PA-11 | 0.16 × 10⁻¹³ | Inventive example |
| Comparative Example 9 | 312 | M-1 | n-Butyl acrylate | (1-19)-(A-12) | 0.1 wt % | n-Butyl acrylate polymer | 2.96 × 10⁻¹³ | Comparative Example |
| Comparative Example 10 | 313 | M-1 | n-Butyl acrylate and t-butylacrylamide: 50/50 | Irgacure-1870 | 5 wt % | PA-11 | 0.16 × 10⁻¹³ | Comparative Example |
| Comparative Example 11 | 314 | M-1 | n-Butyl acrylate and t-butylacrylamide: 50/50 | Irgacure-1870 | 0.1 wt % | PA-11 | 0.16 × 10⁻¹³ | Comparative Example |
| Comparative Example 12 | 315 | Y-1 | n-Butyl acrylate and t-butylacrylamide: 50/50 | Irgacure-1870 | 1.5 wt % | PA-11 | 0.16 × 10⁻¹³ | Comparative Example |
| Comparative Example 13 | 316 | C-1 | n-Butyl acrylate and t-butylacrylamide: 50/50 | Irgacure-1870 | 10 wt % | PA-11 | 0.16 × 10⁻¹³ | Comparative Example |

Azide compound: Compound having the structure of the auxiliary agent (1) described in paragraph [0188] of JP-A No. 2002-82431, the disclosure of which is incorporated herein by reference
Irgacure-1870: Mixture of [bis(2,6-dimethoxybenzoyl)-2,4,4-trimethyl-pentylphosphine oxide] and 1-hydroxy-cyclohexyl-phenyl-ketone [70/30]

<Evaluation>

Images were printed with the inks 301 to 316 thus prepared on sheets of art paper, using an inkjet printer (test machine manufactured by Microjet Ltd.; printing density: 300 dpi; ejection frequency: 4 KHz; and number of nozzles: 64) to give a density OD of 1.0, and the printed sheets were exposed to light under the following exposure condition.

Exposure Condition
1: Exposure by a semiconductor laser having a wavelength of 405 nm
2: Exposure by a semiconductor-excited YLF solid state laser having a wavelength of 532 nm
3: Exposure by a semiconductor laser having a wavelength of 657 nm
4: Exposure by a semiconductor laser having a wavelength of 780 nm
5: Exposure by a semiconductor laser having a wavelength of 830 nm
6: Exposure just beneath the head by a Deep UV lamp (SP-7, manufactured by Ushio Inc.).

<Evaluation of Printing Performance>

The cartridge was set in the printer and ejection of ink from all nozzles was confirmed. Then, images were formed on ten A4 sheets. The unevenness of the printed image was evaluated according to the following evaluation criteria:
A: No unevenness of printed image is observed throughout printing
B: Unevenness of printed image is observed occasionally during printing
C: Unevenness of printed image is observed throughout printing <Evaluation of Stickiness>

The stickiness of the printed face was evaluated sensory with a finger and divided into three ranks: A represents a printed face without stickiness; B represents a printed face with slight stickiness; and C represents a printed face with remarkable stickiness.

<Evaluation of Abrasion Resistance>

An image was formed on an art paper and subjected to exposure. Thirty minutes after the exposure, the art paper was rubbed with an eraser for 10 strokes, and the change in the image density of the printed area was observed. The results were classified into three ranks: A represents no decrease in density; B represents slight decrease in density; and C represents remarkable decrease in density.

<Evaluation of Light Fastness>

The recorded image on each art paper was irradiated with a xenon light (85,000 lux) from a weather meter (Atlas C.I65) for 4 days, and the image densities before and after xenon irradiation were measured by using a reflection densitometer (X-RITE 310 TR) and evaluated in terms of the dye residual ratio. The reflection density before irradiation was approximately 1.0. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

<Ozone Resistance>

The ozone resistance was evaluated based on the residual dye ratio, which was determined by measuring the optical densities of the printed image before and after storage for 3 days under the condition of an ozone concentration of 5.0 ppm, by X-RITE 310. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

The results are summarized in Table 6 below.

TABLE 6

| Ink No. | Oil-soluble dye | Initiator (organic dye-organic boron compound) | Ratio of (initiator/monomer) | Exposure condition 1 to 4* | Exposure energy MJ/cm² | Printing performance | Stickiness | Abrasion resistance | Light fastness | Ozone resistance | Note |
|---|---|---|---|---|---|---|---|---|---|---|---|
| Example 17 | 301 | M-1 | (1-11)-(A-12) | 1 wt % | 3 | 10 | A | A | A | A | A | Inventive example |
| Example 18 | 302 | M-1 | (1-11)-(A-12) | 0.5 wt % | 3 | 10 | A | A | A | A | A | Inventive example |
| Example 19 | 303 | M-1 | (1-16)-(A-12) | 0.5 wt % | 2 | 10 | A | A | A | A | A | Inventive example |
| Example 20 | 304 | M-1 | (3-15)-(A-12) | 0.1 wt % | 1 | 10 | A | A | A | A | A | Inventive example |
| Example 21 | 305 | M-1 | (1-11)-(A-12) + azide compound | 0.1 wt % | 3 | 5 | A | A | A | A | A | Inventive example |
| Example 22 | 306 | M-1 | (1-16)-(A-12) | 0.1 wt % | 2 | 20 | A | A | A | A | A | Inventive example |
| Example 23 | 307 | M-1 | (1-20)-(A-12) | 0.1 wt % | 5 | 20 | A | A | A | A | A | Inventive example |
| Example 24 | 308 | Y-1 | (1-16)-(A-12) | 0.1 wt % | 5 | 10 | A | A | A | A | A | Inventive example |
| Example 25 | 309 | C-1 | (1-19)-(A-12) | 0.1 wt % | 4 | 10 | A | A | A | A | A | Inventive example |
| Example 26 | 310 | C-1 | (1-20)-(A-12) | 0.1 wt % | 5 | 20 | A | A | A | A | A | Inventive example |
| Example 27 | 311 | C-1 | (1-20)-(A-12) + azide compound | 0.1 wt % | 5 | 5 | A | A | A | A | A | Inventive example |
| Comparative Example 9 | 312 | M-1 | (1-19)-(A-12) | 0.1 wt % | 4 | 10 | A | A | A | C | C | Comparative Example |
| Comparative Example 10 | 313 | M-1 | Irgacure-1870 | 5 wt % | 6 | 100 | A | A | A | B | B | Comparative Example |
|  | 313 | M-1 | Irgacure-1870 | 5 wt % | 6 | 10 | A | C | C | D | D | Comparative Example |
| Comparative Example 11 | 314 | M-1 | Irgacure-1870 | 0.1 wt % | 6 | 100 | A | B | B | B | B | Comparative Example |
|  | 314 | M-1 | Irgacure-1870 | 0.1 wt % | 6 | 10 | A | C | C | D | D | Comparative Example |
| Comparative Example 12 | 315 | Y-1 | Irgacure-1870 | 1.5 wt % | 6 | 100 | A | A | A | B | B | Comparative Example |
|  | 315 | Y-1 | Irgacure-1870 | 1.5 wt % | 6 | 10 | A | C | C | D | D | Comparative Example |
| Comparative Example 13 | 316 | C-1 | Irgacure-1870 | 10 wt % | 6 | 100 | A | B | B | C | C | Comparative Example |
|  | 316 | C-1 | Irgacure-1870 | 10 wt % | 6 | 10 | A | C | C | D | D | Comparative Example |

1: Exposure to a semiconductor laser having a wavelength of 405 nm
2: Exposure to a semiconductor-excited YLF solid state laser having a wavelength of 532 nm
3: Exposure to a semiconductor laser having a wavelength of 657 nm
4: Exposure to a semiconductor laser having a wavelength of 780 nm
5: Exposure to a semiconductor laser having a wavelength of 830 nm
6: Exposure just beneath the head to a Deep UV lamp (SP-7, manufactured by Ushio Inc.).

As shown in Table 6, the nonaqueous magenta inkjet-recording inks of Examples polymerized efficiently and rapidly under the visible light irradiation condition and exhibited superior printing performance even though the content of the photopolymerization initiator is low. Accordingly, the nonaqueous magenta inkjet-recording inks of Examples gave images which were free of stickiness and which had superior abrasion resistance, light fastness, and ozone resistance. This is because the nonaqueous magenta inkjet-recording inks of Examples were prepared such that the inks were able to polymerize and cure easily by irradiation with visible light. On the other hand, in Comparative Examples, the photopolymerization initiator sensitive to visible light was not used, and a UV-sensitive polymerization initiator Irgacure-1870 was used instead. In Comparative Examples, the polymerization curing by visible light was insufficient, and the abrasion resistance, light fastness, and ozone resistance of the printed images were hardly improved by exposure with visible light.

Example 28

Preparation of Nonaqueous Inkjet-Recording Ink Composition

<Preparation of nonaqueous magenta inkjet-recording ink 401>

Composition n-Butyl acrylate and t-butylacrylamide    3.0 g
(ratio: 50/50; monomers (raw materials for exemplary polymer PA-11 after polymerization)

-continued

<Preparation of nonaqueous magenta inkjet-recording ink 401>

Composition

| | |
|---|---|
| DPCA60 (manufactured by Nippon Kayaku) | 1.0 g |
| 1,6-Hexanediol diacrylate (HDDA, manufactured by Daicel-UCB Co., Ltd.) | 16.0 g |
| N-Ethyldiethanolamine | 0.6 g |
| Exemplary organic boron compound A-12: | 0.42 g |
| Oil-soluble dye: M-1 | 0.8 g |

The above components were blended, to give a magenta ink 401.

Examples 29 to 36 and Comparative Examples 14 to 18

<Preparation of Nonaqueous Inkjet-Recording Inks 402 to 413>

Nonaqueous inkjet-recording inks 402 to 408 according to the invention and those in Comparative Examples 409 to 413 were prepared in the same manner as the preparation of the magenta ink 401, except that the types of the oil-soluble dye, the monomer, and the initiator and the amount of the initiator, were changed as shown in Table 7 below.

TABLE 7

| | Ink No. | Oil-soluble dye | Monomer (excluding DPCA60 and HDDA) | Organic boron compound | Ratio of (organic boron compound/ dye) | Polymer obtained by polymerization | Oxygen permeability coefficient of formed polymer $[m^3(STP) \cdot m/(s \cdot m^2 \cdot kPa)]$ | Note |
|---|---|---|---|---|---|---|---|---|
| Example 28 | 401 | M-1 | n-Butyl acrylate and t-butylacrylamide: 50/50 | A-12 | 1 wt % | PA-11 | $0.16 \times 10^{-13}$ | Invention example |
| Example 29 | 402 | M-1 | n-Butyl acrylate and t-butylacrylamide: 50/50 | A-12 | 1.5 wt % | PA-11 | $0.16 \times 10^{-13}$ | Invention example |
| Example 30 | 403 | M-1 | n-Butyl acrylate and t-butylacrylamide: 50/50 | A-12 + azide compound | 1.5 wt % (ratio of azide compound to dye = 1 wt %) | PA-11 | $0.16 \times 10^{-13}$ | Invention example |
| Example 31 | 404 | M-1 | n-Butyl acrylate and t-butylacrylamide: 50/50 | A-11 | 1.5 wt % | PA-11 | $0.16 \times 10^{-13}$ | Invention example |
| Example 32 | 405 | Y-1 | n-Butyl acrylate and t-butylacrylamide: 50/50 | A-12 | 1 wt % | PA-11 | $0.16 \times 10^{-13}$ | Invention example |
| Example 33 | 406 | Y-1 | n-Butyl acrylate and t-butylacrylamide: 50/50 | A-6 | 1.5 wt % | PA-11 | $0.16 \times 10^{-13}$ | Invention example |
| Example 34 | 407 | C-1 | n-Butyl acrylate and t-butylacrylamide: 50/50 | A-12 | 1.5 wt % | PA-11 | $0.16 \times 10^{-13}$ | Invention example |
| Example 35 | 408 | C-1 | n-Butyl acrylate and t-butylacrylamide: 50/50 | A-6 | 1.5 wt % | PA-11 | $0.16 \times 10^{-13}$ | Invention example |
| Comparative Example 14 | 409 | M-1 | n-Butyl acrylate | A-12 | 1.5 wt % | n-Butyl acrylate polymer | $2.96 \times 10^{-13}$ | Comparative example |
| Comparative Example 15 | 410 | M-1 | n-Butyl acrylate and t-butylacrylamide: 50/50 | — | — | — | — | Comparative example |
| Comparative Example 16 | 411 | M-1 | n-Butyl acrylate and t-butylacrylamide: 50/50 | Irgacure-1870 | 5 wt % | PA-11 | $0.16 \times 10^{-13}$ | Comparative example |
| Comparative Example 17 | 412 | Y-1 | n-Butyl acrylate and t-butylacrylamide: 50/50 | Irgacure-1870 | 5 wt % | PA-11 | $0.16 \times 10^{-13}$ | Comparative example |
| Comparative Example 18 | 413 | C-1 | n-Butyl acrylate and t-butylacrylamide: 50/50 | Irgacure-1870 | 10 wt % | PA-11 | $0.16 \times 10^{-13}$ | Comparative example |

Azide compound: Compound having the structure of the auxiliary agent (1) described in paragraph [0188] of JP-A No. 2002-82431

Irgacure-1870: Mixture of [bis(2,6-dimethoxybenzoyl)-2,4,4-trimethyl-pentylphosphine oxide] and 1-hydroxy-cyclohexyl-phenyl-ketone [70/30]

<Evaluation>

Images were printed with the inks 401 to 413 thus prepared on sheets of art paper by an inkjet printer (printing density: 300 dpi; ejection frequency: 4 KHz; and number of nozzles: 64) to give a density OD of 1.0, and then exposed to light under the exposure condition shown in Table 8.

<Evaluation of printing performance>

The cartridge was set in the printer and ejection of ink from all nozzles was confirmed. Then, images were formed on 10 A4 sheets. The unevenness of the printed images was evaluated according to the following evaluation criteria:
A: No unevenness of printed image is observed throughout printing
B: Unevenness of printed image is observed occasionally during printing
C: Unevenness of printed image is observed throughout printing <Evaluation of Stickiness>

The stickiness of printed face was evaluated sensory with a finger and ranked into the following three grades:
Not sticky: A
Slightly sticky: B
Remarkably sticky: C.

<Evaluation of Abrasion Resistance>

An image was formed on art paper and subjected to exposure. Thirty minutes after the exposure, the art paper was rubbed with an eraser for 10 strokes, and the change in the image density of the printed area was observed. The results were classified into three ranks: A represents no decrease in density; B represents slight decrease in density; and C represents remarkable decrease in density.

<Evaluation of Light Fastness>

The recorded image on each art paper was irradiated with a xenon light (85,000 lux) from a weather meter (Atlas C.I65) for 4 days, and the image densities before and after xenon irradiation were measured by using a reflection densitometer (X-RITE 310 TR) and evaluated in terms of the dye residual ratio. The reflection density before irradiation was approximately 1.0. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

<Ozone Resistance>

The ozone resistance was evaluated based on the residual dye ratio, which was determined by measuring the optical densities of the printed image before and after storage for 3 days under the condition of an ozone concentration of 5.0 ppm, by X-RITE 310. The results were grouped into five ranks: A indicates that the dye residual ratio is 90% or higher; B indicates that the dye residual ratio is 80% or higher but lower than 90%; C indicates that the dye residual ratio is 70% or higher but lower than 80%; D indicates that the dye residual ratio is 50% or higher but lower than 70%; and E indicates that the dye residual ratio is lower than 50%.

The results are summarized in Table 8 below.

TABLE 8

| | Ink No. | Exposure conditions 1 to 2* | Printing performance | Stickiness | Abrasion resistance | Light fastness | Ozone resistance | Note |
|---|---|---|---|---|---|---|---|---|
| Example 28 | 401 | 1 | A | A | A | A | A | Invention example |
| Example 29 | 402 | 1 | A | A | A | A | A | Invention example |
| Example 30 | 403 | 1 | A | A | A | A | A | Invention example |
| Example 31 | 404 | 1 | A | A | A | A | A | Invention example |
| Example 32 | 405 | 1 | A | A | A | A | A | Invention example |
| Example 33 | 406 | 1 | A | A | A | A | A | Invention example |
| Example 34 | 407 | 1 | A | A | A | A | A | Invention example |
| Example 35 | 408 | 1 | A | A | A | A | A | Invention example |
| Comparative example 14 | 409 | 1 | A | D | D | D | D | Comparative example |
| Comparative example 15 | 410 | 1 | A | D | D | D | D | Comparative example |
| Comparative example 16 | 411 | 1 | A | D | D | D | D | Comparative example |
| | | 2 | A | A | A | A | A | Comparative example |
| Comparative example 17 | 412 | 1 | A | C | D | C | C | Comparative example |
| | | 2 | A | A | A | A | A | Comparative example |
| Comparative example 18 | 413 | 1 | A | C | D | C | C | Comparative example |
| | | 2 | A | A | A | A | A | Comparative example |

1: Light irradiation on a 38,000-lux fluorescent lamp irradiator for 30 seconds
2: Exposure just beneath the head by a Deep UV lamp (SP-7, manufactured by Ushio Inc.) at an intensity of 100 mJ/m$^2$.

As shown in Table 8, the nonaqueous magenta inkjet-recording inks of Examples polymerized efficiently and rapidly under the visible light irradiation condition and exhibited superior printing performance even though the content of the organic boron compound is low. Accordingly, the nonaqueous magenta inkjet-recording inks of Examples gave images which were free of stickiness and which had superior abrasion resistance, light fastness, and ozone resistance. This is because the nonaqueous magenta inkjet-recording inks of Examples were prepared such that the inks were able to polymerize and cure easily by irradiation with visible light. On the other hand, in Comparative Examples, the organic boron compound sensitive to visible light was not used, and a UV-sensitive polymerization initiator Irgacure-1870 was used instead. In Comparative Examples, the polymerization curing by a fluorescent lamp (exposure condition 1) was insufficient, and the abrasion resistance, light fastness, and ozone resistance of the printed images were hardly improved by exposure by the fluorescent lamp. In Comparative Examples, high-energy UV irradiation (exposure condition 2) was necessary for obtaining the results equivalent to the results obtained in Examples.

What is claimed is:

1. A photopolymerization-curable inkjet-recording ink composition, comprising an ethylenic unsaturated monomer, a colorant, and a photopolymerization initiator containing an organic dye and an organic boron compound,
   wherein the colorant is an oil-soluble dye having an oxidative potential of higher than 1.1 V (vs. SCE); and
   wherein the organic boron compound is represented by formula (I):

Formula (I)

wherein in formula (I), each R is selected from an alkyl group, a substituted alkyl group, an aryl group, a substituted aryl group, an aralkyl group, a substituted aralkyl group, an alkaryl group, a substituted alkaryl group, an alkenyl group, a substituted alkenyl group, an alkynyl group, a substituted alkynyl group, an alicyclic group, a substituted alicyclic group, a heterocyclic group, a substituted heterocyclic group, and derivatives of these group; R group may be the same as or different from each other; two or more R group may form a boron-containing heterocyclic ring by combining with each other directly or via a substituent; and X represents an alkali metal, quaternary ammonium, pyridinium, quinolinium, diazonium, morpholinium, tetrazolinium, acrydinium, phosphonium, sulfonium, oxosulfonium, iodonium, S, P, Cu, Ag, Hg, Pd, Fe, Co, Sn, Mo, Cr, Ni, As, or Se.

2. The inkjet-recording ink composition according to claim 1, wherein the ethylenic unsaturated monomer polymerizes to form a polymer having an oxygen permeability coefficient at 25° C. of $2.6 \times 10^{-13}$ [m$^3$(STP)·m/(s·m$^2$·kPa)] or lower.

3. The inkjet-recording ink composition according to claim 1, wherein the organic dye is one or more dyes selected from cationic, anionic, and nonionic dyes.

4. The inkjet-recording ink composition according to claim 1, wherein the colorant is the same as the organic dye.

5. The inkjet-recording ink composition according to claim 1, wherein the ethylenic unsaturated monomer includes an amide bond, a urethane bond, a glycidyl group, or a hydroxyl group.

6. The inkjet-recording ink composition according to claim 1, wherein the ethylenic unsaturated monomer includes a structure represented by formula (i), (ii) or (iii):

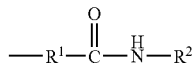

Formula (i)

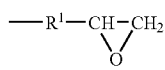

Formula (ii)

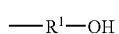

Formula (iii)

wherein in formulae (i) to (iii), R$^1$ represents a straight or branched alkylene or alkyleneoxy group which may have a substituent; and R$^2$ represents a hydrogen atom, a halogen atom, an alkyl group, an alkoxy group, or a cyano group.

7. The inkjet-recording ink composition according to claim 1, wherein the organic dye has an absorption peak within the wavelength range of 400 to 1,200 nm.

8. The inkjet-recording ink composition according to claim 1, wherein a content of the organic dye is 0.01 to 15% by mass based on a mass of the ethylenic unsaturated monomer.

9. The inkjet-recording ink composition according to claim 1, wherein the inkjet-recording ink composition is prepared by emulsifying a solution comprising the ethylenic unsaturated monomer, the colorant, and the photopolymerization initiator in an aqueous medium.

10. An image-forming process comprising recording an image on a record medium by using the inkjet-recording ink composition of claim 1, and curing the recorded image by irradiation with visible to near-infrared light.

11. A method for producing the inkjet-recording ink composition of claim 1, the method comprising emulsifying a solution including the ethylenic unsaturated monomer, the colorant, and the photopolymerization initiator containing the organic dye and the organic boron compound in an aqueous medium.

12. The method according to claim 11, wherein the ethylenic unsaturated monomer includes an amide bond, a urethane bond, a glycidyl group, or a hydroxyl group.

13. The method according to claim 11, wherein the ethylenic unsaturated monomer includes a structure represented by formula (i), (ii) or (iii):

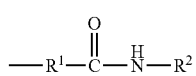

Formula (i)

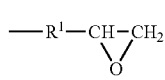

Formula (ii)

Formula (iii)

wherein in formulae (i) to (iii), R$^1$ represents a straight or branched alkylene or alkyleneoxy group which may have a substituent; and R$^2$ represents a hydrogen atom, a halogen atom, an alkyl group, an alkoxy group, or a cyano group.

14. The method according to claim 11, wherein the organic dye has an absorption peak within the wavelength range of 400 to 1,200 nm.

15. The method according to claim 11, wherein a content of the organic dye is 0.01 to 15% by mass based on a mass of the ethylenic unsaturated monomer.

16. A photopolymerization-curable inkjet-recording ink composition according to claim 1, wherein the colorant is a yellow oil-soluble dye selected from the group consisting of the following formula (Y-I), (Y-II), (Y-III), and (Y-IV):

   Formula (Y-I)

wherein in formula (Y-I), A and B each independently represents a heterocyclic group which may have a substituent;

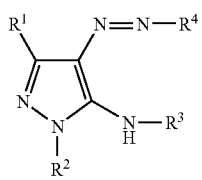   Formula (Y-II)

wherein in formula (Y-II), $R^1$ and $R^3$ each independently represents a hydrogen atom, a cyano group, an alkyl group, a cycloalkyl group, an aralkyl group, an alkoxy group, an alkylthio group, an arylthio group, an aryl group, or an ionic hydrophilic group; $R^2$ represents a hydrogen atom, an alkyl group, a cycloalkyl group, an aralkyl group, a carbamoyl group, an acyl group, an aryl group, or a heterocyclic group; and $R^4$ represents a heterocyclic group;

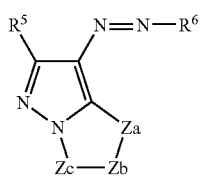   Formula (Y-III)

wherein in Formula (Y-III), $R^5$ represents a hydrogen atom, a cyano group, an alkyl group, a cycloalkyl group, an aralkyl group, an alkoxy group, an alkylthio group, an arylthio group, an aryl group, or an ionic hydrophilic group; $R^6$ represents a heterocyclic group; Za represents —N=, —NH— or $C(R^{11})$=; Zb and Zc each independently represent —N= or $C(R^{11})$=; and $R^{11}$ represents a hydrogen atom or a non-metal substituent;

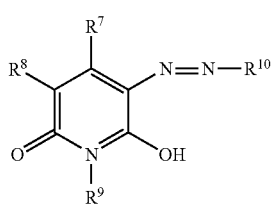   Formula (Y-IV)

wherein in formula (Y-IV), $R^7$ and $R^9$ each independently represents a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an amino group, a substituted amino group, a hydroxy group, or an ionic hydrophilic group; and $R^{10}$ represents a heterocyclic group.

17. A photopolymerization-curable inkjet-recording ink composition according to claim 1, wherein the colorant is a magenta oil-soluble dye selected from the group consisting of the following formula (3) and (4):

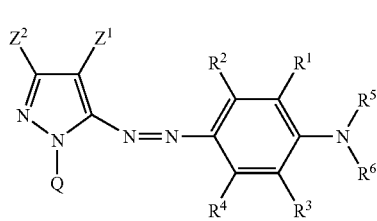   Formula (3)

wherein in formula (3), Z1 represents an electron withdrawing group in which Hammett's substituent constant σp is no less than 0.20;

Z2 represents a hydrogen atom, an aliphatic group, or an aromatic group;

R1, R2, R3, R4, R5, and R6 each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbonyloxy group, a silyloxy group, an aryloxycarbonyl group, an aryloxycarbonylamino group, an imido group, a heterocyclic thio group, a sulfinyl group, a phosphonyl group, an acyl group, a carboxy group, or a sulfo group; and Q represents a hydrogen atom, an aliphatic group, an aromatic group, or a heterocyclic group. an ureido group, an urethane group, an acyl group, an amido group, or a sulfonamido group;

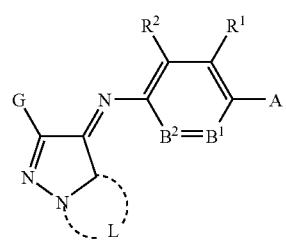   Formula (4)

wherein in formula (4), G represents a hydrogen atom, an aliphatic group, an aromatic group, a heterocyclic group, a cyano group, an alkoxy group, an aryloxy group, an alkylthi group, an aylthio group, an ester group, an amino group, a carbamoyl group, sulfonyl group, or a sulfamoyl group;

A represents —NR5R6, or a hydroxy group, and $R^5$ and $R^6$ represents each independently a hydrogen atom, an aliphatic group, an aromatic group, or a heterocyclic group;

B1 represents =C (R3)— or =N—, and B2 represents —C (R4)=, or —N=;

R1, R2, R3, R4, R5, and R6 each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, a alkoxycarbonyl group, a heterocyclic oxy group, an azo group, an acyloxy group, a carbonyloxy group, a silyloxy group, an aryloxycarbonyl group, an aryloxycarbonylamino group, an imido group, a heterocyclic thio group, a sulfinyl group, a phosphonyl group, an acyl group, a carboxy group, or a sulfo group; and L represents a group of atoms forming a 5-membered or 6-membered nitrogen-containing heterocyclic ring which may be substituted by at least one of an aliphatic group, aromatic group, heterocyclic group, cyano group, alkoxy group, aryloxy group, alkylthio group, arylthio group, ester group, amino group, carbamoyl group, sulfonyl group, sulfonyl group, sulfamoyl group, ureido group, urethane group, acyl group, amido group, and sulfonamido group, and this heterocyclic ring may further form a fused ring with other ring.

18. A photopolymerization-curable inkjet-recording ink composition according to claim 1, wherein the colorant is a magenta oil-soluble dye selected from the group consisting of the following formula (C-I) and (C-II):

Formula (C-I)

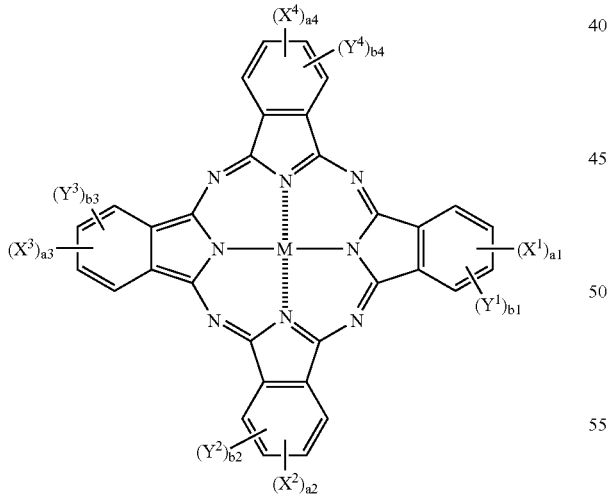

wherein in formula (C-I), $X^1$, $X^2$, $X^3$ and $X^4$ each independently represents —SO—$Z^1$, —$SO_2$,-$Z^1$ and —$SO_2NR^{21}R^{22}$;

$Y^1$, $Y^2$, $Y^3$ and $Y^4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureide group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group;

$Z^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$R^{21}$ and $R^{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, wherein both $R^{21}$ and $R^{22}$ are not hydrogen atoms;

a1–a4 and b1–b4 each represents a substituent number for $X^1$-$X^4$ and $Y^1$-$Y^4$; $a^1$-$a^4$ each independently represents an integer of 0-4, and b1–b4 each independently represents an integer of 0-4, wherein the summation of a1–a4 is no less than 2, and, when a1–a4 and b1–b4 represent integers of 2 or greater, plural $X^1$-$X^4$ and $Y^1$-$Y^4$ may be the same or different;

a1 and b1 each independently represents an integer of 0-4 that fulfills the relationship a1+b1=4;

a2 and b2 each independently represents an integer of 0-4 that fulfills the relationship a2+b2=4;

a3 and b3 each independently represents an integer of 0-4 that fulfills the relationship a3+b3=4;

a4 and b4 each independently represents an integer of 0-4 that fulfills the relationship a4+b4=4; and M represents a hydrogen atom, a metal element or oxide thereof, hydride or halide;

Formula (C-II)

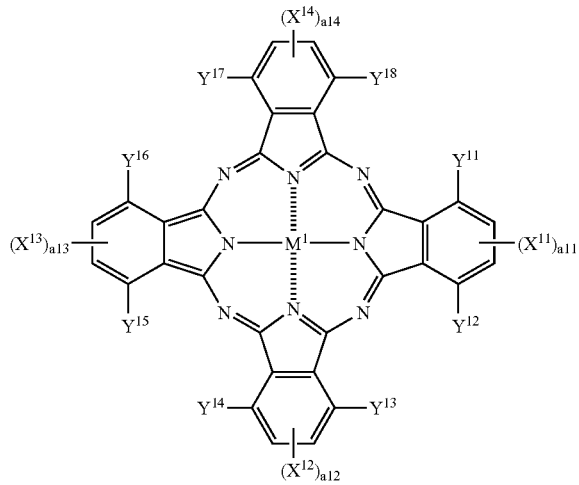

wherein in formula (C-II), $X^{11}$, $X1^2$, $X1^3$ and $X1^4$ each independently represents —SO-$Z^1$, —SO$_2$-$Z^1$ and —SO$_2$NR$^{21}$R$^{22}$;

$Y^{11}$, $Y^{12}$, $Y^{13}$ and $Y^{14}$ each independently represents a hydrogen atom, a halogen atoms, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureide group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group or a sulfo group;

a11 and b11 each independently represents an integer of 0-4 that fulfills the relationship a11+b11=4;

a12 and b12 each independently represents an integer of 0-4 that fulfills the relationship a12+b12=4;

a13 and b13 each independently represents an integer of 0-4 that fulfills the relationship a13+b13=4;

a14 and b14 each independently represents an integer of 0-4 that fulfills the relationship a14+b14=4; and $M^1$ represents a hydrogen atom, a metal element or oxide thereof, hydride or halide.

19. A photopolymerization-curable inkjet-recording ink composition according to claim 16, wherein the organic boron compound is a compound having an anion structure of anyone of the following compound, (A-1) to (A-40):

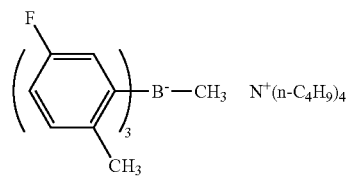
A-1

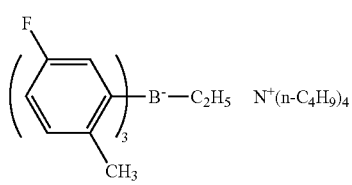
A-2

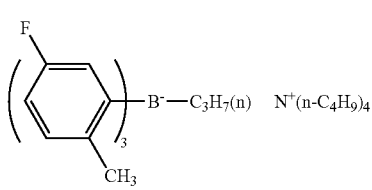
A-3

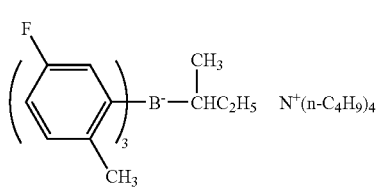
A-4

-continued

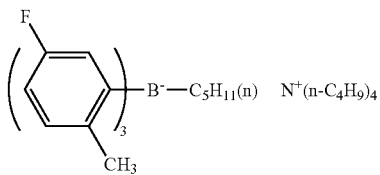
A-5

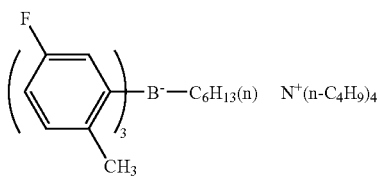
A-6

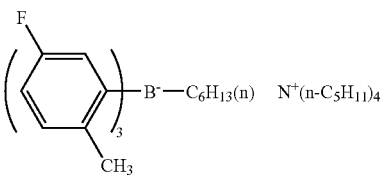
A-7

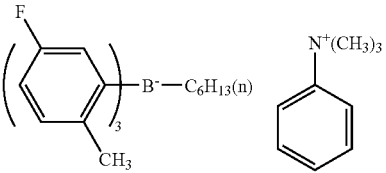
A-8

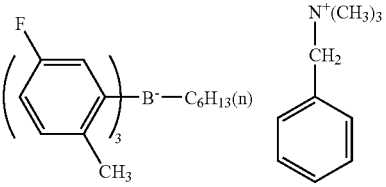
A-9

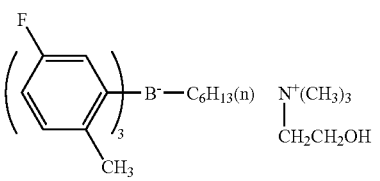
A-10

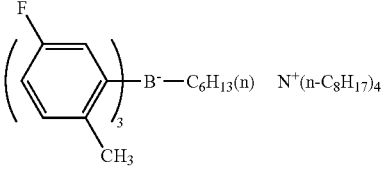
A-11

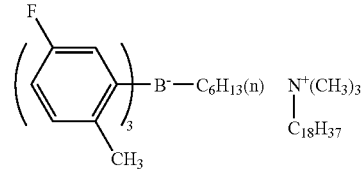
A-12

-continued
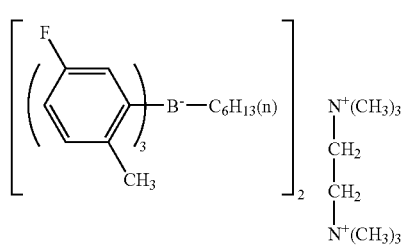 A-13
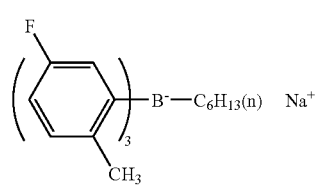 A-14
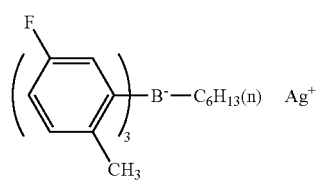 A-15
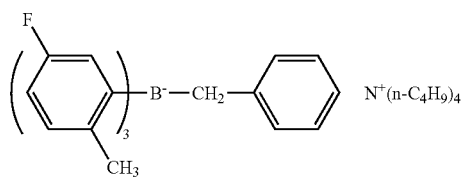 A-16
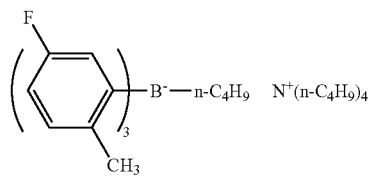 A-17
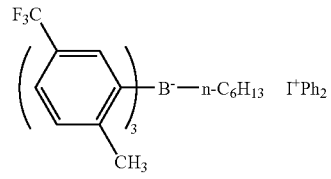 A-18
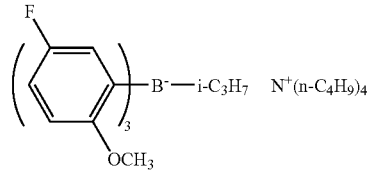 A-19
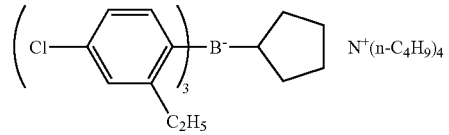 A-20
-continued
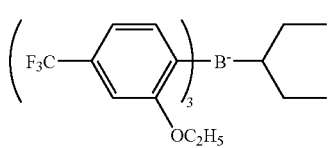 A-21
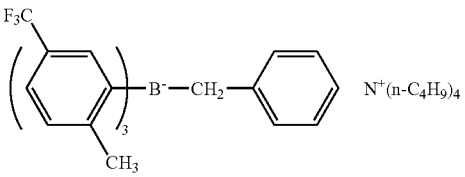 A-22
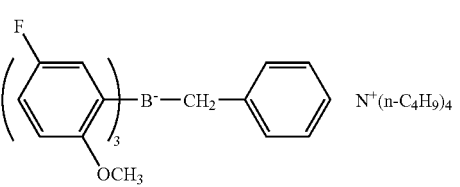 A-23
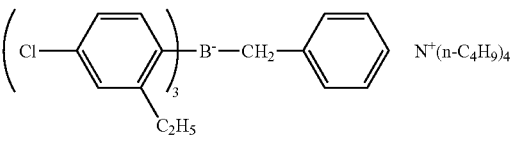 A-24
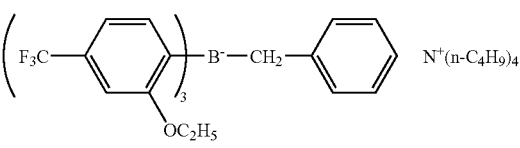 A-25
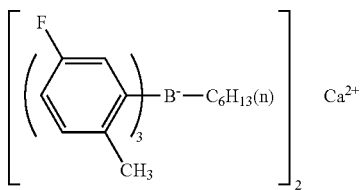 A-26
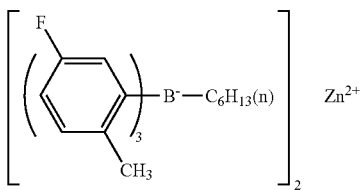 A-27
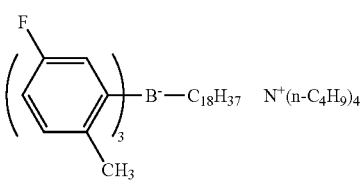 A-28

-continued
A-29
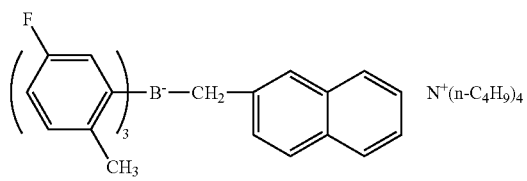
A-30
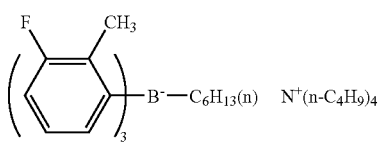
A-31
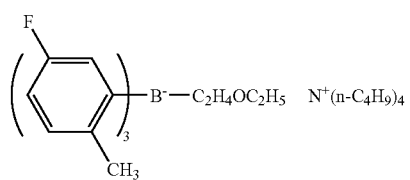
A-32
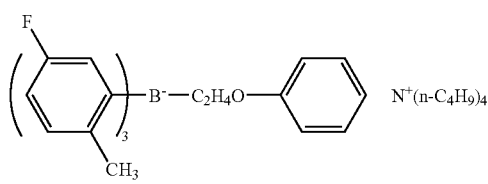
A-33
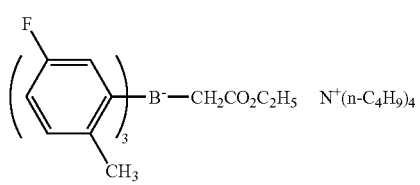
A-34
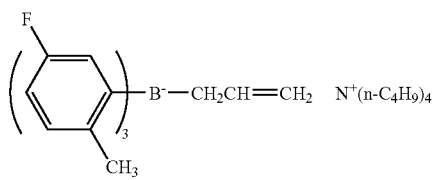
A-35
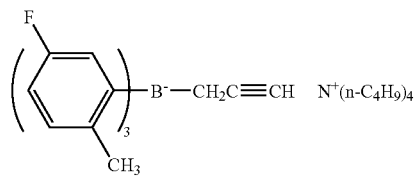
A-36
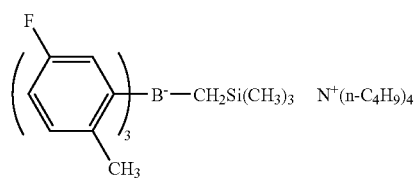
-continued
A-37
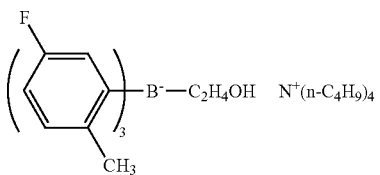
A-38
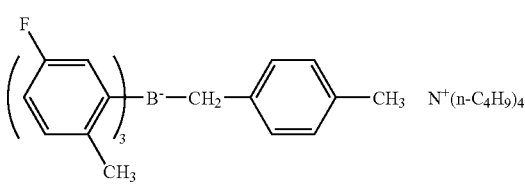
A-39
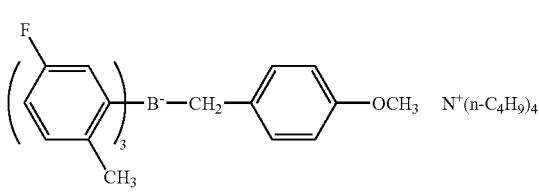
A-40
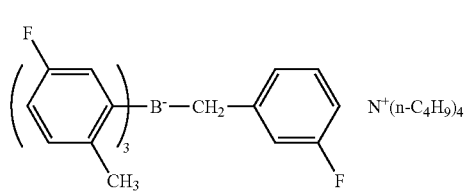
20. A photopolymerization-curable inkjet-recording ink composition according to claim 17, wherein the organic boron compound is a compound having an anion structure of any one of the following compound, (A-1) to (A-40):
A-1
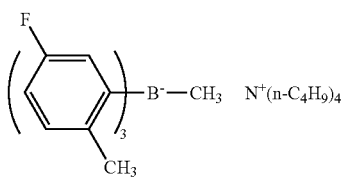
A-2
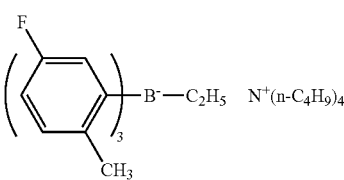
A-3
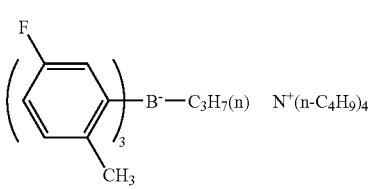

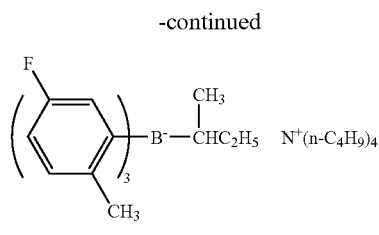

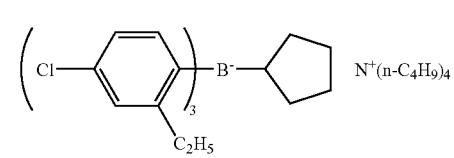 A-20
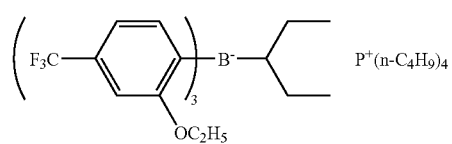 A-21
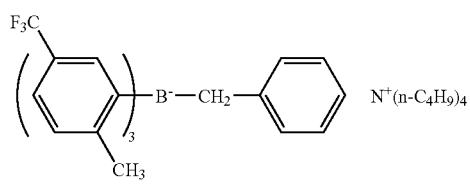 A-22
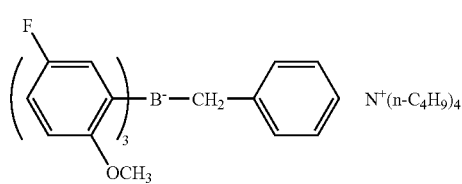 A-23
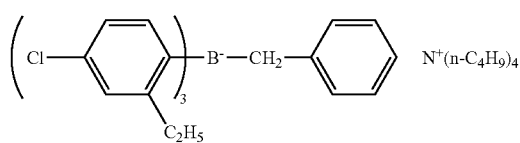 A-24
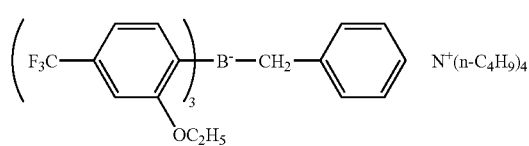 A-25
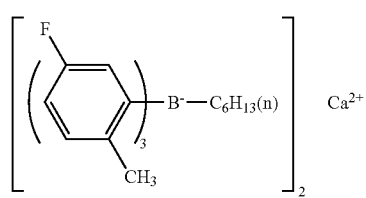 A-26
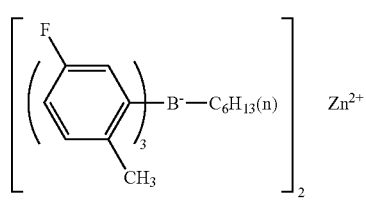 A-27
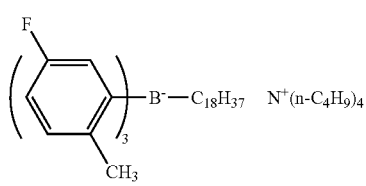 A-28
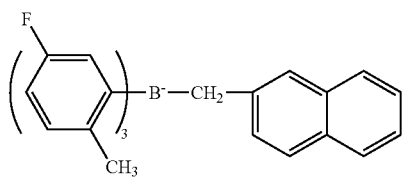 A-29
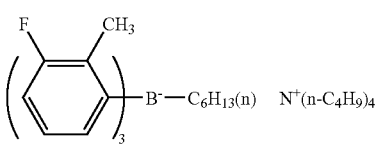 A-30
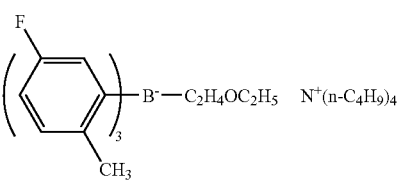 A-31
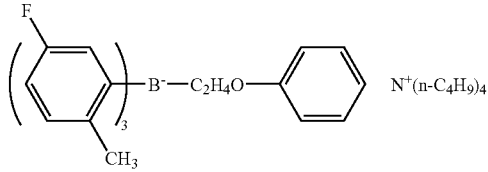 A-32
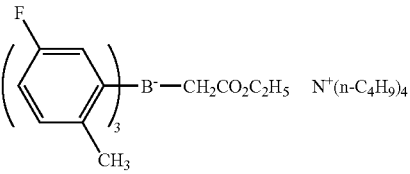 A-33
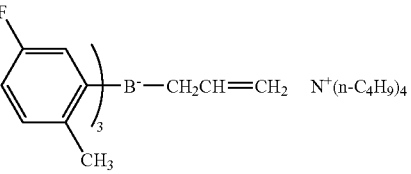 A-34
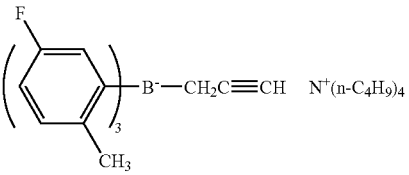 A-35
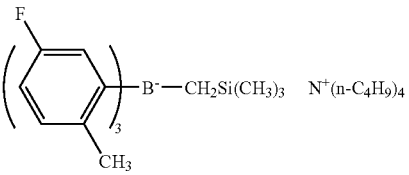 A-36

-continued
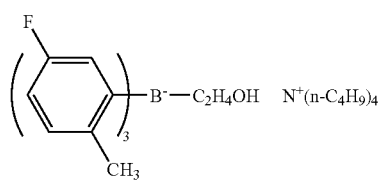
A-37
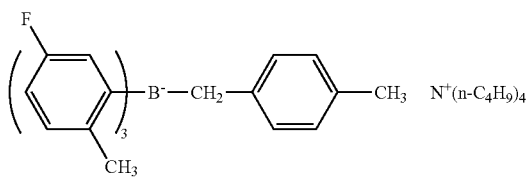
A-38
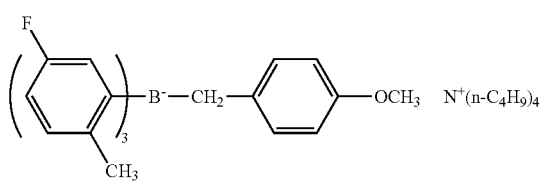
A-39
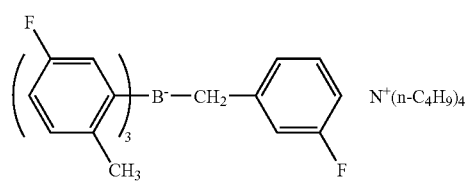
A-40
21. A photopolymerization-curable inkjet-recording ink composition according to claim 18, wherein the organic boron compound is a compound having an anion structure of any one of the following compound, (A-1) to (A-40):
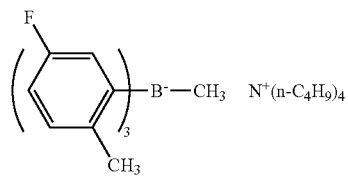
A-1
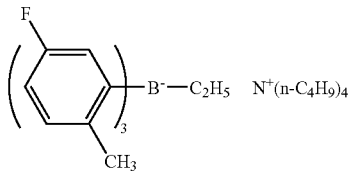
A-2
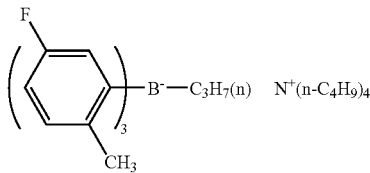
A-3
-continued
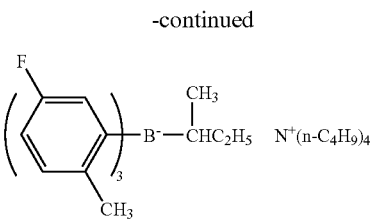
A-4
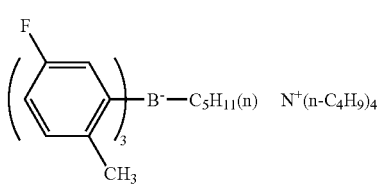
A-5
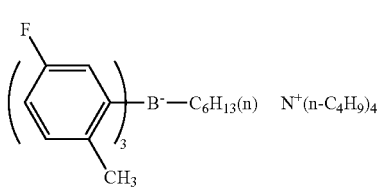
A-6
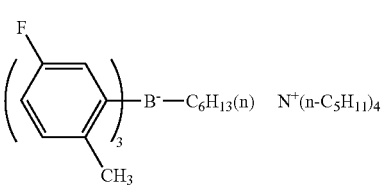
A-7
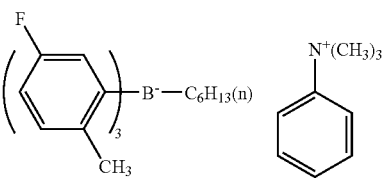
A-8
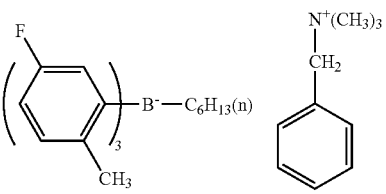
A-9
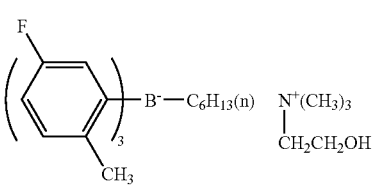
A-10
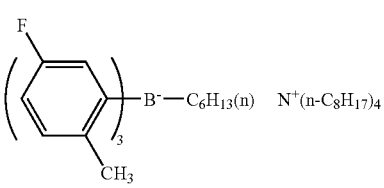
A-11

-continued
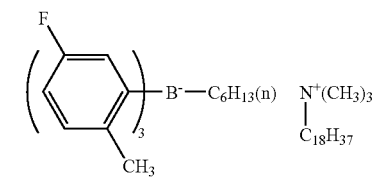 A-12
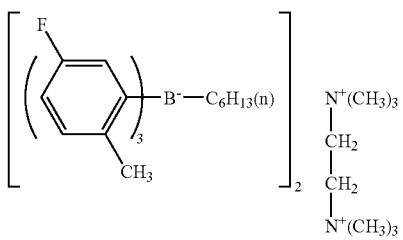 A-13
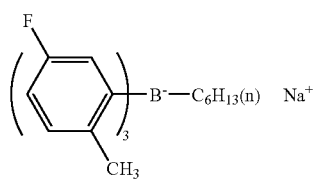 A-14
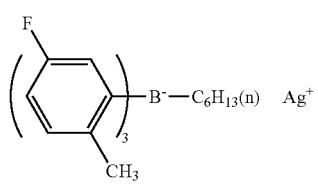 A-15
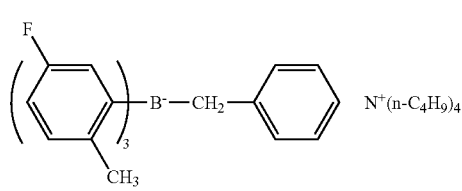 A-16
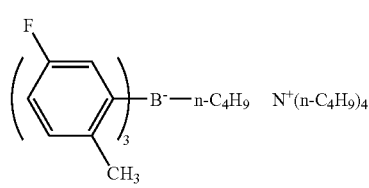 A-17
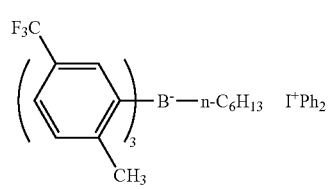 A-18
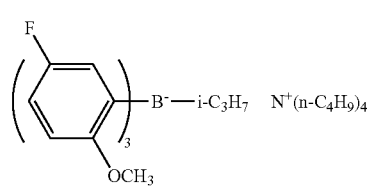 A-19
-continued
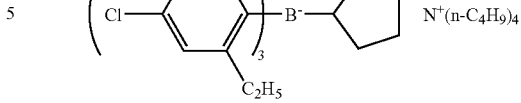 A-20
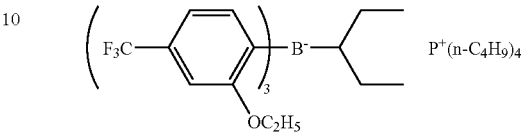 A-21
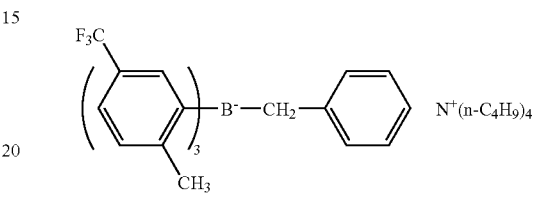 A-22
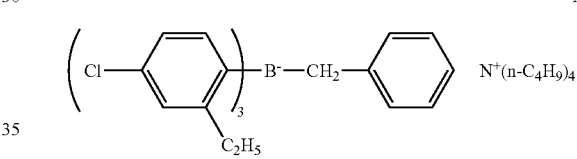 A-23
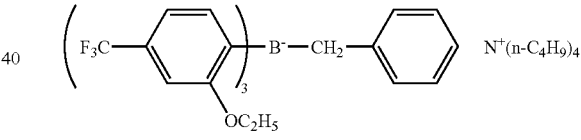 A-24
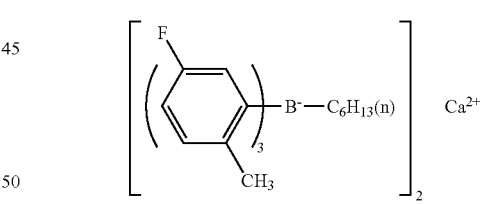 A-25
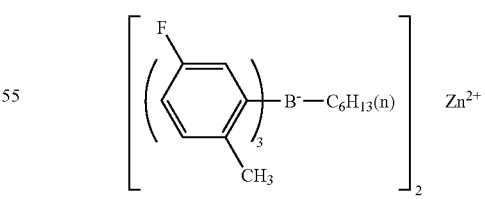 A-26
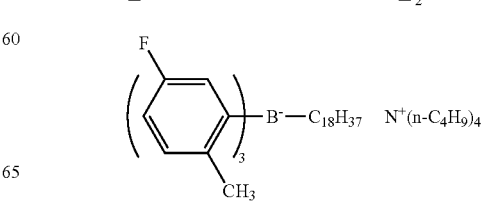 A-27
A-28

-continued
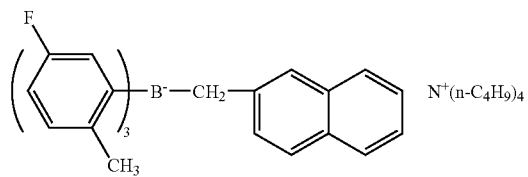
A-29
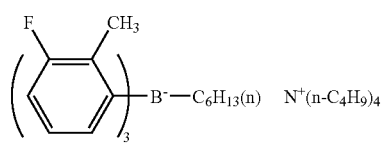
A-30
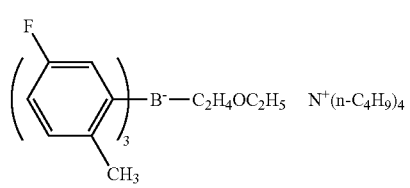
A-31
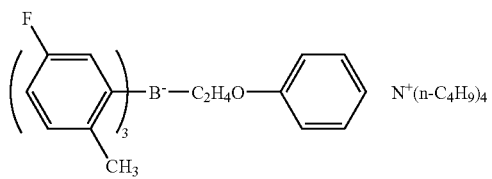
A-32
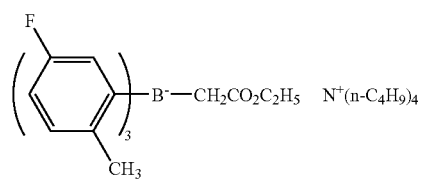
A-33
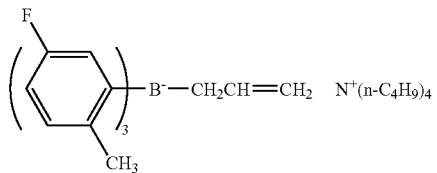
A-34
-continued
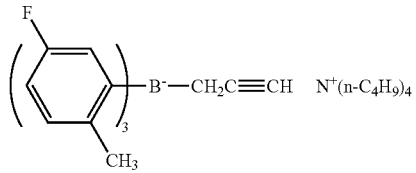
A-35
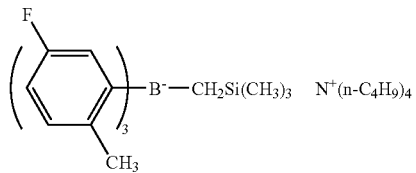
A-36
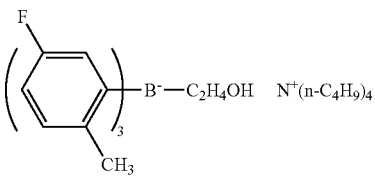
A-37
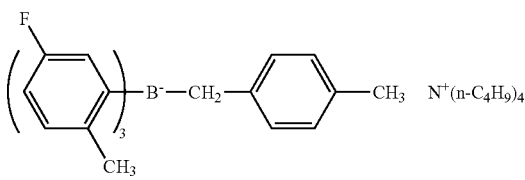
A-38
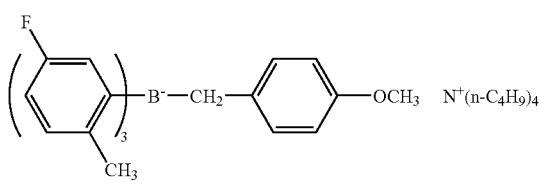
A-39
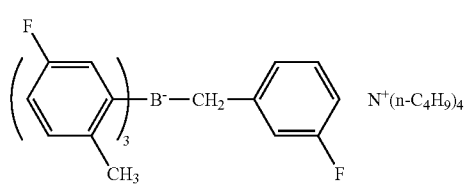
A-40
* * * * *